(12) United States Patent
Pechter et al.

(10) Patent No.: US 10,404,028 B2
(45) Date of Patent: Sep. 3, 2019

(54) SYSTEM FOR AUTOMATIC ROBOTIC CABLE CONNECTOR ASSEMBLY USING A CARTRIDGE

(71) Applicant: Frisimos, Ltd., Raanana (IL)

(72) Inventors: Tal Pechter, Ramat Hasharon (IL); Hanan Ben Ron, Givataim (IL)

(73) Assignee: Frisimos, Ltd., Ra'anana (IL)

( * ) Notice: Subject to any disclaimer, the term of this patent is extended or adjusted under 35 U.S.C. 154(b) by 0 days.

(21) Appl. No.: 15/803,528

(22) Filed: Nov. 3, 2017

(65) Prior Publication Data

US 2018/0062340 A1    Mar. 1, 2018

Related U.S. Application Data

(60) Continuation-in-part of application No. 15/595,678, filed on May 15, 2017, now Pat. No. 9,837,778.
(Continued)

(51) Int. Cl.
*H01R 43/28* (2006.01)
*H01R 43/05* (2006.01)
(Continued)

(52) U.S. Cl.
CPC .............. *H01R 43/28* (2013.01); *B25J 11/00* (2013.01); *H01R 43/0249* (2013.01); *H01R 43/05* (2013.01)

(58) Field of Classification Search
CPC ........ B25J 11/00; H01R 43/01; H01R 43/048; H01R 43/05; H01R 43/055; H01R 43/0249; H01R 43/28
See application file for complete search history.

(56) References Cited

U.S. PATENT DOCUMENTS 3,149,390 A    9/1964  McCoy
3,153,358 A   10/1964  Havens
(Continued)

FOREIGN PATENT DOCUMENTS

CA    1329981    *  6/1994
CN    2454093 Y    10/2001
(Continued)

OTHER PUBLICATIONS

Video entitled "Automated cable cutting machine (Genoa MkII—2mm)" listed as published on Jun. 6, 2011, is at URL <https://youtube.com/watch?v=xfaHkcp6gws?>.
(Continued)

*Primary Examiner* — Carl J Arbes
(74) *Attorney, Agent, or Firm* — Lempia Summerfield Katz LLC

(57) ABSTRACT

An automatic-robotic-system-for-cable assembly system and method is provided. The method and system are configured to use a cartridge which holds one or both ends of the cable. The cartridge moves along an automatic cable assembly line, with the line segmented into different stages, at which a process is performed by a specific machine. Different machines, such as actuators or modular machines, perform operations on the cartridge at the different stages. In preparation for or as part of the operations, the actuators or modular machines may apply one or more forces to the cartridge, causing one or more of the following to occur: moving an end of the cartridge to a modular machine, rotating an end of the cable, tipping the ends of the cable, etc. In this way, use of the cartridge enables the automatic assembly of the cables held in the cartridge.

21 Claims, 39 Drawing Sheets

Related U.S. Application Data which is a division of application No. 14/335,474, filed on Jul. 18, 2014, now Pat. No. 9,673,587.

(60) Provisional application No. 61/857,056, filed on Jul. 22, 2013.

(51) Int. Cl.
*H01R 43/02* (2006.01)
*B25J 11/00* (2006.01)

(56) References Cited

U.S. PATENT DOCUMENTS

| | | | |
|---|---|---|---|
| 3,768,143 A | 10/1973 | Holmes, Jr. | |
| 3,953,706 A | 4/1976 | Harris et al. | |
| 4,653,159 A | 3/1987 | Henderson | |
| 4,683,636 A | 8/1987 | Henderson | |
| 4,704,925 A | 11/1987 | Sutton | |
| 4,733,463 A | 3/1988 | Kolanowski et al. | |
| 4,916,811 A | 4/1990 | Uehara et al. | |
| 4,977,934 A | 12/1990 | Anderson et al. | |
| 5,994,646 A | 11/1999 | Broeksteeg et al. | |
| 6,003,341 A | 12/1999 | Bloom | |
| 6,341,242 B1 | 1/2002 | Mahmood et al. | |
| 6,631,554 B1 | 10/2003 | Sato et al. | |
| 6,895,654 B2 | 5/2005 | Strandberg et al. | |
| 6,964,288 B2 | 11/2005 | Christopher et al. | |
| 8,052,836 B2 | 11/2011 | Cale et al. | |
| 8,302,295 B2 | 11/2012 | Tanaka | |
| 8,406,598 B2 | 3/2013 | Christopher et al. | |
| 8,772,671 B2 | 7/2014 | Broude et al. | |
| 9,673,587 B2 | 6/2017 | Pechter et al. | |
| 9,837,778 B2 | 12/2017 | Pechter et al. | |
| 2005/0006345 A1 | 1/2005 | Thomas et al. | |
| 2006/0065640 A1 | 3/2006 | Lizotte et al. | |
| 2006/0084957 A1 | 4/2006 | Delfyett et al. | |
| 2010/0282487 A1 | 11/2010 | Tanaka | |
| 2011/0127697 A1 | 6/2011 | Milne | |
| 2014/0174267 A1 | 6/2014 | Stepan et al. | |
| 2016/0285221 A1 | 9/2016 | Pechter et al. | |

FOREIGN PATENT DOCUMENTS

| | | |
|---|---|---|
| EP | 0117273 A1 | 9/1984 |
| JP | H02197206 A | 8/1990 |
| JP | 7065652 A | 3/1995 |
| WO | WO 2015/125129 A1 | 8/2015 |
| WO | WO 2017/037691 A1 | 3/2017 |

OTHER PUBLICATIONS

Frisimos: "Fully Automated Cable Assembly Line—Google Search", XP055555786, Jul. 28, 2017*, at the following URL address: http://frisimos.com/wp-content/uploads/videos/FRISMOS%20FINAL.mp4 * The Search report and Provisional Opinion dated Feb. 20, 2019 states that the date of the video is Jul. 28, 2017.

Search report and Provisional Opinion accompanying the partial search result in PCT Application No. PCT/US2018/058861 dated Feb. 20, 2019. 15 pages.

* cited by examiner

SYSTEM FOR AUTOMATIC ROBOTIC CABLE CONNECTOR ASSEMBLY USING A CARTRIDGE

REFERENCE TO RELATED APPLICATIONS

This application is a continuation-in-part of U.S. application Ser. No. 15/595,678, filed on May 15, 2017 (published as US Patent Application Publication No. 2017-0250514A1), which is a divisional of U.S. application Ser. No. 14/335,474, filed on Jul. 18, 2014 (issued as U.S. Pat. No. 9,673,587), which claims the benefit of U.S. Provisional Application No. 61/857,056, filed on Jul. 22, 2013. Each of U.S. application Ser. No. 15/595,678 (published as US Published Application No. 2017-0250514A1), U.S. application Ser. No. 14/335,474 (issued as U.S. Pat. No. 9,673,587) and U.S. Provisional Application No. 61/857,056 are incorporated by reference herein in their entirety.

TECHNICAL FIELD

The present disclosure generally relates to cable and connector industry, and more particularly the disclosure relates to a system and method of assembly connectors and cables.

BACKGROUND

Electronic devices may communicate with one another. Connectivity amongst the different electronic devices may be facilitated by using physical connectors (such as cables). The connectors may have various parameters such as: size, labeling, interface parameters, structure, etc. Interface parameters may include: number of connectivity pads (e.g., pins), the layout of the connectivity pads and their physical size, etc.

Further, there are many different types of connectors. Examples of different standard connector types include, but are not limited to: an eight position-eight conductor (8P8C) modular connector with eight positions, which may be used in Ethernet® communications; a D-subminiature electrical connector commonly used for the RS-232 serial port on: modems, computers, telecommunications, test and measurement instruments; an HDMI (High-Definition Multimedia Interface) connector compact audio/video interface for transferring uncompressed video data and compressed/uncompressed digital audio data from a HDMI-compliant device ("the source device") to a compatible computer monitor, video projector, digital television, or digital audio device; a Universal Serial Bus (USB) connector (e.g., USB 2.0 has a 4-pin connector; USB 3.0 has 9 pins surrounded by a shield); a Power connector which may include a safety ground connection as well as the power conductors for different household equipment; a RF Connector used at radio frequencies having constant impedance of its transmission line; a R-TNC (Reverse threaded Neill-Concelman) connector used for Wi-Fi antennas; a BNC connector for used in radio and test equipment; DC connector which may supply direct current (DC) power; Hybrid connectors which may have housings with inserts that allow intermixing of many connector types, such as those mentioned above; optical fiber connectors; and many more different types of connectors.

Each field/system/device may have a standard or custom electrical cable that has different parameters. Example of electrical cable's parameters may include any one, any combination or all of: length; cable diameter; number of inner-wires; inner-wire coloring; inner-wire diameter; cable color; labeling; insulation/shielding; and winding/twisting.

A cable may comprise two or more wires running side by side and bonded, twisted, or braided together to form a single assembly. Any current-carrying conductor, including a cable, radiates an electromagnetic field. Likewise, any conductor or cable will pick up energy from any existing electromagnetic field around it, and in the first case, may result in unwanted transmission of energy that may adversely affect nearby equipment or other parts of the same piece of equipment; and in the second case, unwanted pickup of noise that may mask the desired signal being carried by the cable.

There are particular cable designs that minimize electromagnetic pickup and transmission. Three of the principal design techniques are shielding, coaxial geometry, and twisted-pair geometry, for example. Shielding makes use of the electrical principle of the Faraday cage. The cable is encased for its entire length in foil or wire mesh. In some cables a grounded shield on cables operating at 2.5 kV or more gathers leakage current and capacitive current.

Coaxial design may help to further reduce low-frequency magnetic transmission and pickup. In this design, an inner conductor is surrounded by a tubular insulating layer, surrounded by a tubular conducting shield. Many coaxial cables also have an insulating outer sheath or jacket. The foil or mesh shield has a circular cross section and the inner conductor is exactly at its center. This causes the voltages induced by a magnetic field between the shield and the core conductor to consist of two nearly equal magnitudes which cancel each other.

Twisted pair cabling is a type of wiring in which two conductors of a single circuit are twisted together for the purposes of canceling out electromagnetic interference (EMI) from external sources. A twist rate (also called pitch of the twist, usually defined in twists per meter) makes up part of the specification for a given type of cable. Where nearby pairs have equal twist rates, the same conductors of the different pairs may repeatedly lie next to each other, partially undoing the benefits of differential mode. For this reason, it is commonly specified that, at least for cables containing small numbers of pairs, the twist rates must differ.

Twisted pair cables may be shielded in an attempt to prevent electromagnetic interference. Because the shielding is made of metal, it may also serve as a ground. Typically, a shielded or a screened twisted pair cable has a special grounding wire added called a drain wire which is electrically connected to the shield or screen.

This shielding may be applied to individual pairs, or to the collection of pairs. When shielding is applied to the collection of pairs, this is referred to as screening. Shielding provides an electric conductive barrier to attenuate electromagnetic waves external to the shield and provides conduction path by which induced currents can be circulated and returned to the source, via ground reference connection.

A few examples of different field electrical cables can include: Category 1 cable (Cat 1) or voice-grade copper, which is a grade of unshielded twisted pair cabling designed for telephone communications; Cat6 (Category 6 cable), which is a standardized cable for Gigabit Ethernet and other network physical layers; an HDMI cable of about 5 meters (16 ft.), which can be manufactured to Category 1 specifications by using 28 AWG (0.081 $mm^2$) conductors or by 24 AWG (0.205 $mm^2$) conductors, an HDMI cable can reach lengths of up to 15 meters (49 ft.).

Individual USB cables may run as long as 5 meters for 12 Mbps connections and 3 meters for 1.5 Mbps. With hubs, devices can be up to 30 meters away from the host, the USB 2.0 type cable has two wires that supply the power to the peripherals (−/+)5 volts (red color) and ground (brown) and a twisted pair (yellow and blue) of wires to carry the data. On the power wires, a computer can supply up to 500 milliamps of power at 5 volts; etc.

Although some cables and connectors have standard specification (parameters), others may have a custom tailored-made specification. Original equipment manufacturers (OEM) as well as automotive and defense industries often require custom cables and/or connectors for their equipment, for example. Tailoring may include any one, any combination, or all of the following different variables: lengths, insulation coloring, labels, sizes, diameter, etc. Further, the cable harnesses may be tailored. For example, a cable harness may have two or more connectors, connected by any topology and connection scheme according to a customer demand.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1:
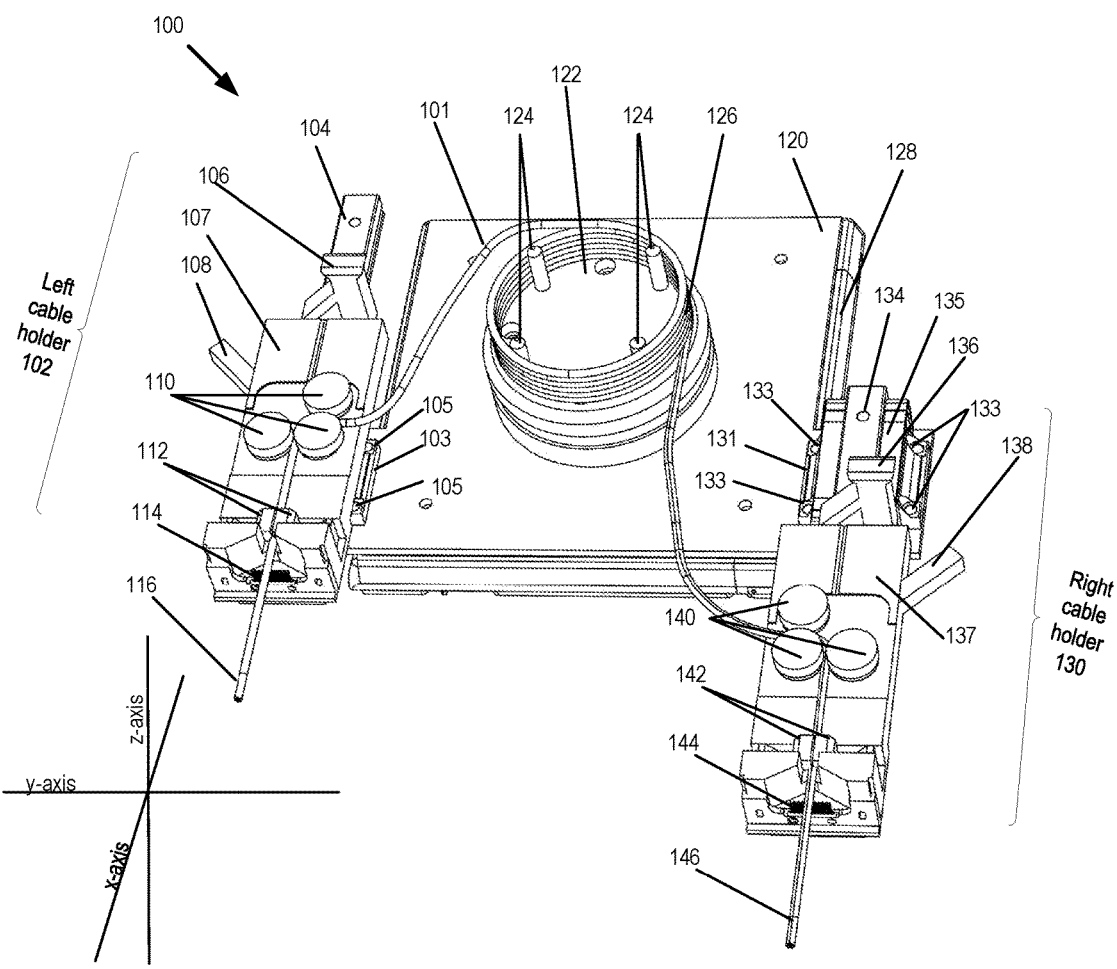
FIG. 1 is a perspective view of the cartridge that holds the cable.

The current process of assembling electrical cables is dependent on human work. Specifically, the current process is based on a series of serial activities, transforming the raw material (such as raw cable or connectors), into the final assembled cable. Typically, each activity is considered a stage in the process, and is performed using some kind of tool, such as scissors, a screw, or more advanced tool such as cable cutting machine, cable jacket striping machine and others. In this regard, the current process is heavily dependent on human intervention.

As discussed in more detail below, an automatic cable assembly process and system is disclosed. In one implementation, a cartridge is used in the automatic cable assembly process and system whereby the cartridge is moved along an automatic cable assembly line. The automatic assembly line is segmented into different stages, at which a process is performed by a specific machine. In particular, a particular machine may be positioned at a particular stage of the automatic assembly line. When the cartridge is moved from a previous stage to the particular stage of the automatic assembly line, the particular machine performs the desired task on the cable, and thereafter releases the cartridge (and the cable) to move to the next stage (in order to perform the next process). In this regard, the cartridge may comprise a dedicated apparatus for delivering the cable from stage to stage in the automatic assembly line.

As discussed in more detail below, the automatic cable assembly system may include any one, any combination, or all of: the cartridge; the machines (e.g., the modular machines discussed below); the conveyor system for moving the cartridge from stage to stage (e.g., system for moving the cartridge from stage to stage, such as for a pallet based system or an indexed line system); control electronics (e.g., a central controller in combination with bar code readers/RFID readers); and cartridge manipulation when at a stage (e.g., one or more actuators for manipulating the cartridge at a stage in the automatic assembly line).

The various aspects of the automatic cable assembly process and system are configured to perform the various stages of the automatic assembly line. Functions at stages in the automatic assembly line include any one, any combination, or all of the following:

1. cut the cable to measure.
2. roll the cable and leave one or both ends free for subsequent processing.
3. place ferrite bead (or other substance) on the cable end.
4. strip the cable outer isolation (e.g., strip the jacket of the cable).
5. strip the cable outer braded shield (if the cable outer braded shield is present for the specific type of cable).
6. strip the cable outer aluminum foil shield (if the cable outer aluminum foil shield is present for the specific type of cable).
7. sort the inner cable items (various types of wires may be included in the cable, including, but not limited to: separate wires; twisted wires; shielded wires or shielded pairs; drain wires; etc.). As discussed in more detail below, the system may perform the sorting using a comb. In one implementation, one specific modular machine performs the untwisting of twisted pairs, and another specific modular machine performs the removal of the shield from twisted pair. In an alternate implementation, a single modular machine performs the untwisting of twisted pairs, and performs the removal of the shield from twisted pair.
8. remove inner MYLAR material which covers part of the wires or shielded pairs (if the MYLAR material is present in the cable).
9. strip the isolation of the wires.
10. after sorting, strip the shield (for a cable of shielded wires and shielded pairs).
11. strip the isolation from the wires, so now the wires' copper ends are exposed.
12. coat the wires' copper ends with tin (or other type of material).
13. solder the coated wires ends to the connector pads (the connectors may be fed to the soldering machine separately).
14. mechanically assemble the connectors cases on the connectors.
15. perform electrical testing on the cable (if desired). In one implementation, the modular machine that performs the electrical testing may be connected to both sides of the cable in order to perform the electrical test while electrically contacting both sides of the cable.

As discussed in more detail below, the cable under construction may include the same connectors at each end, or may include two different ends. For example, in a USB cable, one side of the cable can be a first type of USB connector (e.g., USB-A connector) and the other side can be a second type of USB connector (e.g., micro-USB connector).

Further, the cartridge may hold the cable during the assembly process and enable the one or more modular machine to conduct the desired operations on one or both cable ends. As discussed below, the cartridge may include any one, any combination or all of the following functions and features:

1. the cartridge is configured to move from station to station on an automated line. Different types of automated lines are contemplated. As one example, the cartridge may be mounted or attached to a pallet, in the case where the automated line is a pallet line. As another example, the cartridge may be mounted or attached to a rotating chain, in the case where the automated line is an indexed line.
2. accept the cable from the modular machine that cuts the cable to measure.
3. roll the cable (e.g., as discussed further below, the cartridge includes a structure configured to hold the rolled cable).
4. after the rolling, place the cable so that both ends of the cable face horizontally to the cartridge front.
5. move the cable ends to front and back (e.g., move the cable ends longitudinally).
6. hold the two combs, one for each cable end.
7. move the cable and comb to front and back.
8. horizontally rotate the cable ends (e.g., +/−45°, +/−90°, +/−180°) on the longitudinal axis degrees if needed (e.g., longitudinally rotate one or both of the cable ends).
9. vertically rotate the cable ends, so that the cable ends will face down, for dipping the wire copper ends into a bath (e.g., a tin bath). In one implementation, the cartridge may include a hinge so that it can be rotated about the hinge in order to dip the cable ends into the bath.

In one implementation, a cartridge is used in order to move the cable through different stages (e.g., different stations) in the automatic cable assembly system. Specifically, the cartridge may include mechanical structures (e.g., passive force devices, such as springs and other elastic means) to hold the cable and/or the cable ends.

Further, the cartridge may be manipulated by an outside force in order to move a part of the cartridge (which is holding an end of the cable) and/or move the cable end. For example, the motive force and control may be resident outside of the cartridge (e.g., in any one, some, or all of: the conveyor, the actuators or the modular machines). Thus, in one implementation, the cartridge does not contain any devices that generate a force (e.g., motors, pistons, rotating devices, etc.) or electronics (e.g., control electronics). Instead, other devices, such as actuators, a central controller, and/or modular machines may perform one or both of the following functions: (1) determination as to what motive force to generate that is to be applied to the cartridge; and/or (2) control of the device that generates the force to be applied to the cartridge. As discussed in further detail below, various devices, such as any one, any combination, or all of the central controller, actuators, or modular machines may perform functions (1) and/or (2). For example, the central controller may determine the protocols in order to process the cable and command various devices within the system, such as the modular machine(s) and/or actuators, in order to perform the protocols. As another example, the actuator and/or modular machine may determine to perform certain operations (e.g., be pre-programmed or dynamically determine to perform the certain operations), as discussed further below.

As discussed in further detail below, the cable may be moved in several ways (e.g., pushing the cable end frontward (e.g., toward a modular machine) or backward (e.g., away from the modular machine); rotate a part of the cable, such as the cable end (e.g., if the cable is to be rotated, a motor on the conveyor may be connected to the cartridge so that when the cartridge reaches a specific stage, the motor on the conveyor rotates the specific part in the cartridge, causing the rotation of the cable, as discussed further below). Thus, the cable housed in the cartridge may be moved in a variety of directions, such as in the x-direction, in the y-direction, in the z-direction, in an axial direction (rotated along a longitudinal axis), etc. Further, the movement of the cable when housed in the cartridge may be relative to the modular machine. As discussed further below, the cable when housed in the cartridge may be moved toward the modular machine (which is stationary) and/or may be moved away the modular machine (which is stationary). The cable when housed in the cartridge may likewise be rotated relative to the modular machine (which is stationary). Further, the cable when housed in the cartridge may be titled toward and/or tilted away from the modular machine (which is stationary).

In an alternate implementation, the cartridge includes devices that generate a force (e.g., motors, pistons, rotating devices, etc.) and/or electronics (e.g., control electronics). As discussed in further detail below, the cartridge may move in one of several ways. The motive force and/or control, instead of being resident outside of the cartridge, may be resident within the cartridge. For example, the functionality of the actuators in moving the cable held by the cartridge may instead be resident in the cartridge itself. Thus, in this implementation, the cartridge may receive a signal indicative of a command (e.g., push the cable end frontward a particular distance (e.g., 5 cm); move the cable end backward a particular distance (e.g., 5 cm); rotate a first end or a second end of the cable (e.g., rotate clockwise or counterclockwise a predetermined number of degrees). Responsive to receiving the command, the cartridge may control one or more motors, pistons, or the like resident on the cartridge to perform the requested movement.

Embodiments

The following embodiments describe a cartridge for holding a cable while processing. The cartridge is first described and thereafter, the interaction of the cartridge with other parts of the system (such as the conveyor, modular machine(s) and actuator(s)) is described.

FIG. 1 is a perspective view of the cartridge 100 that holds the cable 101. As shown, the cable 101 is coiled around cable coiler 122. Cable coiler 122 is circular in shape and includes cable pillars 124. As shown in FIG. 1, there are four cable pillars 124. Fewer or greater numbers of cable pillars 124 are contemplated. Further, other shapes for cable coiler 122 are contemplated, including oblong and elliptical. The cable coiler 122 may be raised from base 120. In one implementation, the cable coiler 122 may be raised such that the height from base 120 may be the same (or substantially the same) as the height of left cable holder movable portion 107 and right cable holder movable portion 137. Alternatively, the cable coiler 122 is higher than left cable holder movable portion 107 and right cable holder movable portion 137. In still an alternate implementation, the cable coiler 122 is lower than left cable holder movable portion 107 and right cable holder movable portion 137.

The cable 101 may be introduced to the cartridge 100 in one of several ways. In one way, an external device is configured to roll the cable and place it around cable coiler 122 of cartridge 100. In particular, a machine, such as the cable coiler machine, may be configured to coil at least a part of the cable 101 around cable coiler 122, as discussed further below. After processing by the modular machines (discussed below), another device is configured to extract the cable from cartridge 100. In another way, the cartridge is the device that rolls the cable. In this way, the cable end may be pushed towards the cartridge, with the cartridge simultaneously rolling, thereby resulting in the cable being rolled onto the cartridge. Structures on the cartridge, not illustrated in FIG. 1, may be configured to roll the cable onto cable coiler 122.

As shown in FIG. 1, cartridge 100 includes base 120, left cable holder 102 and right cable holder 130. Thus, in one implementation, the cartridge 100 may include one or more arms, with left cable holder 102 acting as one arm of the cartridge 100 and right cable holder 130 acting as one arm of the cartridge 100. Left cable holder 102 may be affixed to base 120 in one of several ways. In one way, left cable holder 102 may include left cable base 103, which is connected, bolted or affixed to base 120 via one or more connectors 105 (e.g., one or more bolts, screws or the like). Specifically, base 120 may include a main section (upon which cable coiler 122 sits), which may be generally rectangular (or square) and two side sections, which may comprise a left wing (upon which left cable base 103 is connected) and a right wing (upon which right cable base 131 is connected). Likewise, right cable holder 130 may include a right cable base 131, which is connected, bolted or affixed to base 120 via one or more connectors 133 (e.g., one or more screws or the like). As discussed further below, a part of left cable holder 102 and a part of right cable holder 130 are configured to move respective to the modular machine(s) (such as toward and/or away from the modular machine(s)) while left cable base 103 and the right cable base 131, respectively, remain stationary.

Further, as shown in FIG. 1, left cable holder 102 is configured to hold one end 116 of the cable 101, and right cable holder 130 is configured to hold another end 146 of the cable 101. The designation of "left" and "right" in terms of cable holders are merely for descriptive purposes. Thus, FIG. 1 illustrates that both ends of cable 101 are held in a respective cable holder. Alternatively, only one end of the cable 101 may be held within a cable holder.

The cable 101 may be held in the left cable holder 102 or right cable holder 130 in one or more ways. In one way, the cable 101 may be held by pincers 112, 142, which may pinch the cable. In one implementation, the pincers 112, 142 are spring loaded toward the closed position, and may be opened using force, as discussed further below. In another way, the cable may be held by one or more rollers or spindles. For example, FIG. 1 illustrates rollers 110 of left cable holder 102 and rollers 140 of right cable holder 130. Thus, rollers 110 are an example of cartridge rollers resident on the cartridge. Specifically, FIG. 3 illustrates three rollers 110 and three rollers 140. Other numbers of rollers are contemplated. In one implementation, rollers 110, 140 are spring loaded in order to apply pressure to the cable 101, thus holding a part of cable 101 in place. As discussed in more below, lever 108 may move rollers 110, thereby removing the pressure to cable 101. Likewise, pressure applied to lever 138 may move rollers 140, thereby removing the pressure to cable 101.

Figure 5A:
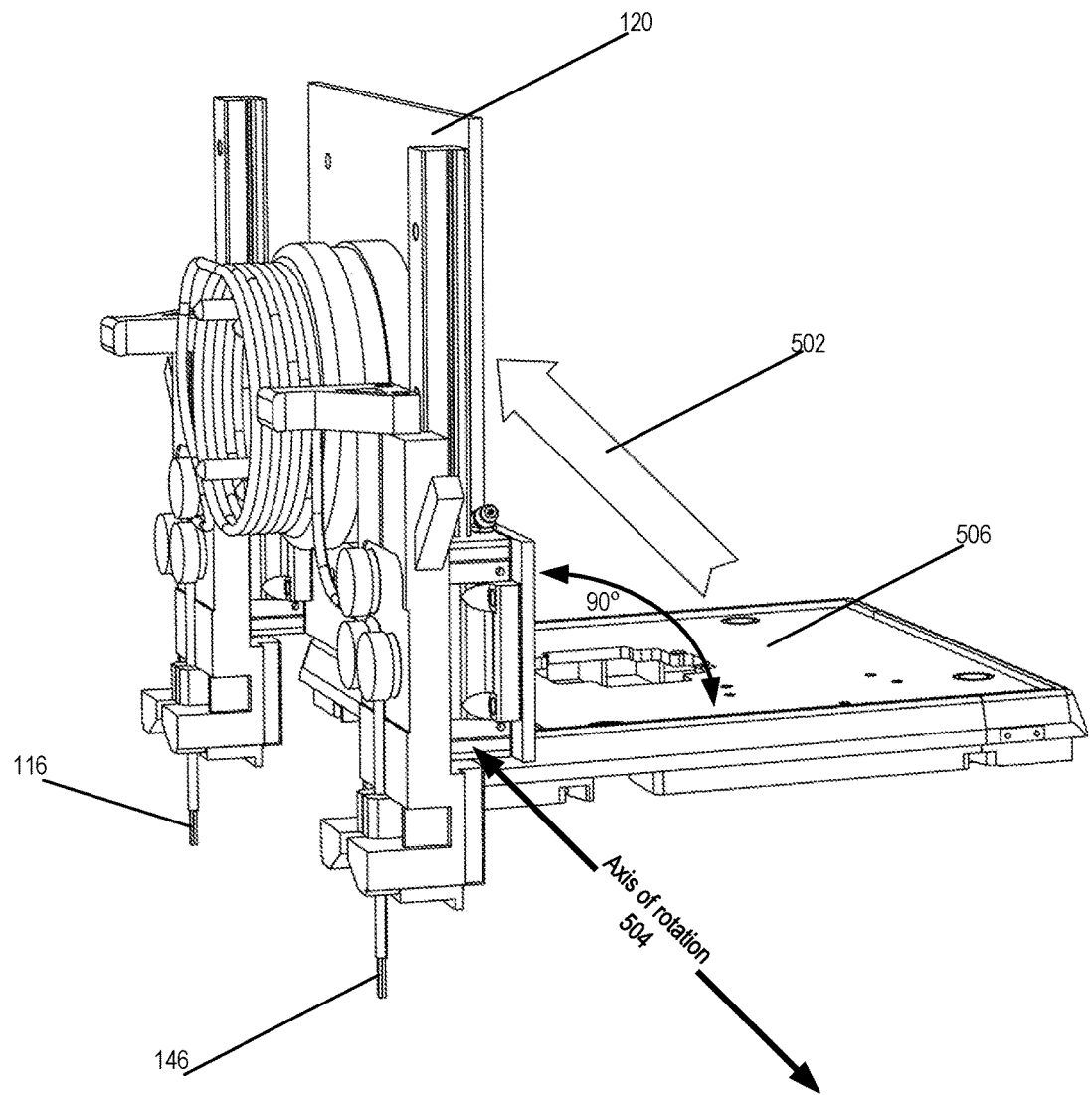
FIG. 5A is a perspective view of the cartridge, with a part of the cartridge moving about a hinge so that the ends of the cable can be dipped into a bath.
Figure 5B:
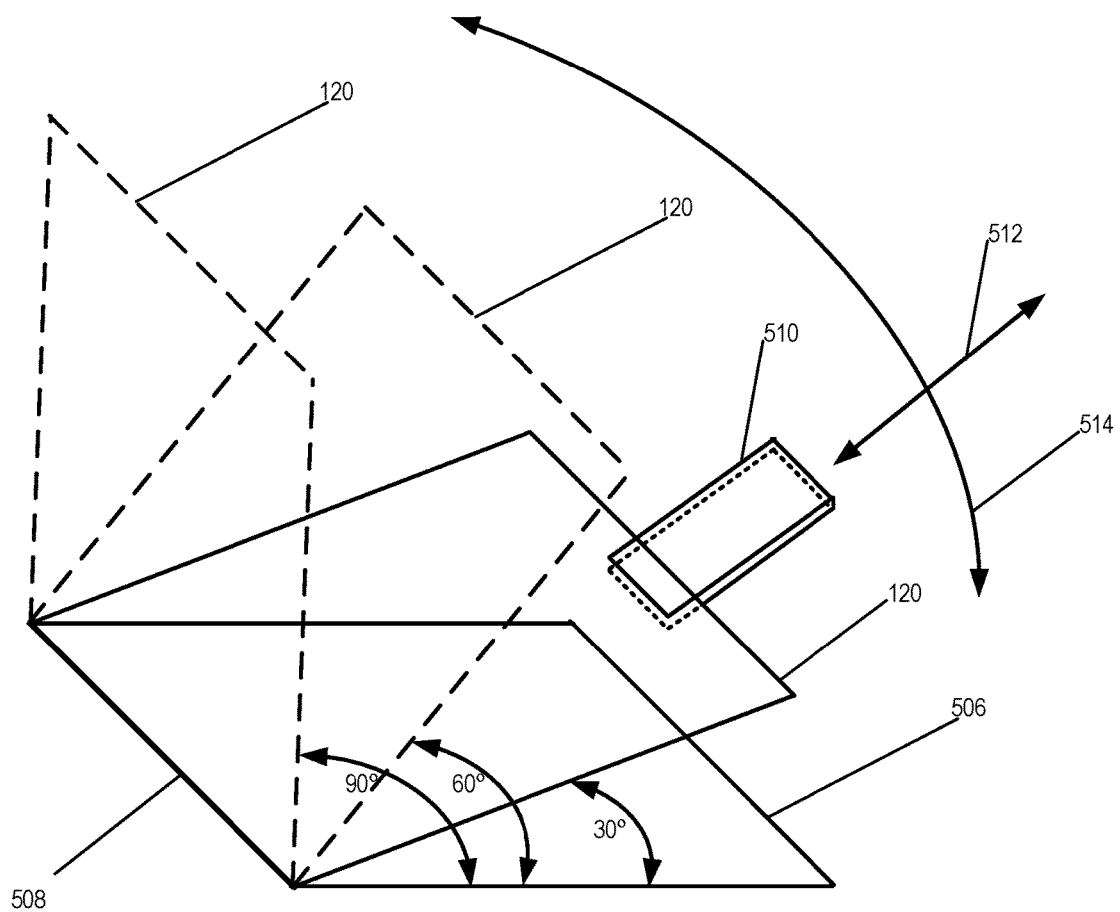
FIG. 5B illustrates the hinge of the cartridge and a robotic arm configured to move the part of the cartridge about the hinge.
Figure 6A:
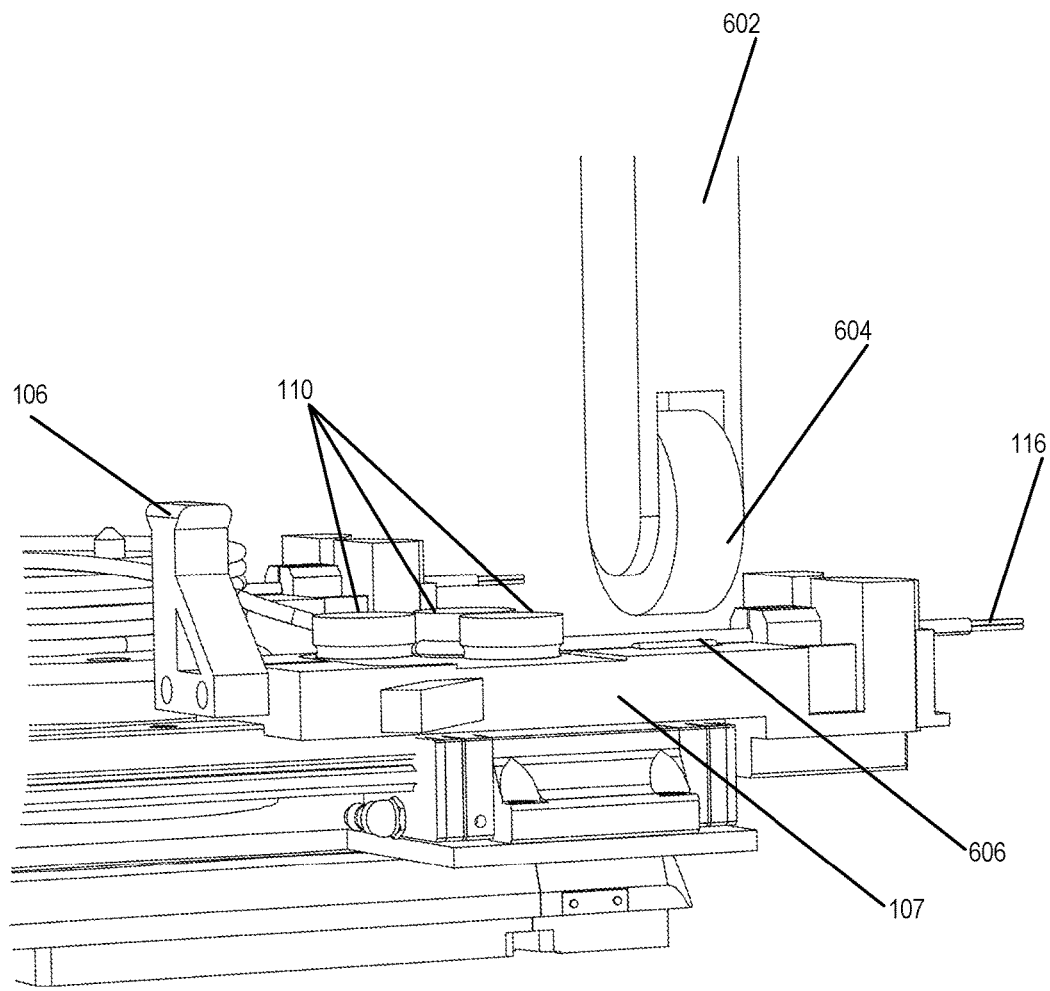
FIG. 6A is a perspective view of the left cable holder of the cartridge, with the rotating roller on the tool of the actuator positioned above a part of the cable.
Figure 6B:
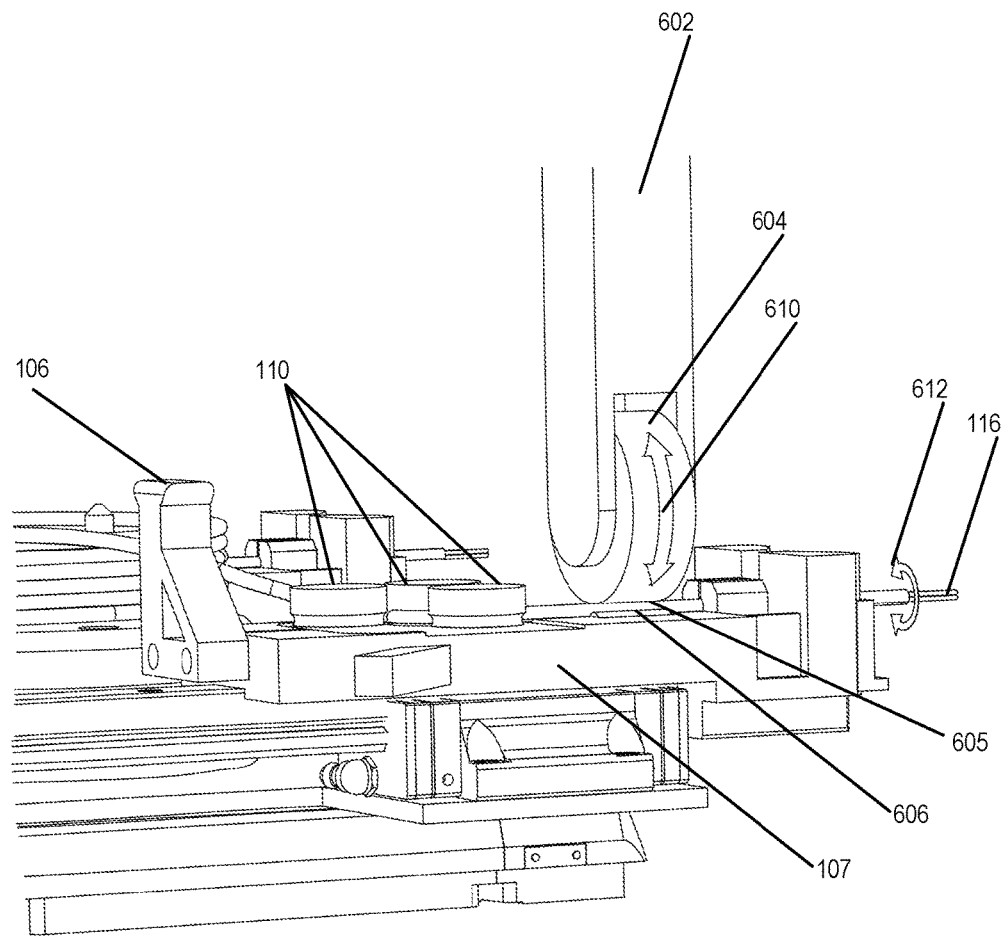
FIG. 6B is a first perspective view (from the back) of the left cable holder of the cartridge, with the rotating roller on the tool of the actuator contacting a part of the cable, thereby rotating the end of the cable.
Figure 6C:
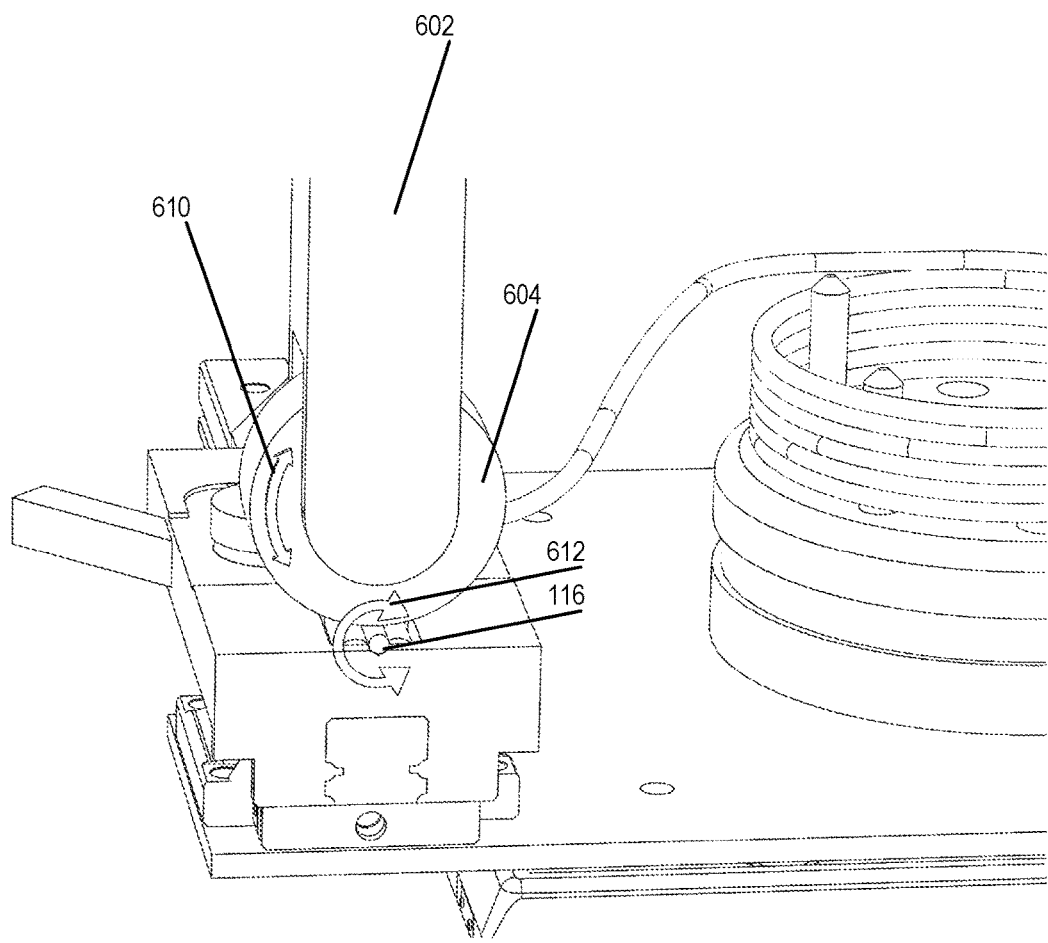
FIG. 6C is a second perspective view (from the opposing perspective of FIG. 6B) of the left cable holder of the cartridge, with the rotating roller on the tool of the actuator contacting a part of the cable, thereby rotating the end of the cable.

As discussed in more detail below, a part of the cable (such as an end of the cable) may be moved relative to a modular machine (which is stationary). FIG. 1 illustrates an x-axis, y-axis, and z-axis. These axes are merely for illustration purposes in order to describe movement. There are several ways in which the end of the cable may be moved relative to the modular machine. In one way, a part of the cartridge (such as a part of left cable holder 102 or a part of right cable holder 130) that holds the end of the cable is moved relative to the modular machine. In that regard, the movement of the part of the cartridge (with the end of the cable being affixed thereto) results in the movement of the end of the cable as well. As one example, this is illustrated in FIG. 3B in which a part of the left cable holder 102 or right cable holder 130 (each of which holds a respective end of the cable) moves toward or away from the modular machine (e.g., along the x-axis as illustrated in FIG. 1), as discussed further below. As another example, this is illustrated in FIGS. 5A-B in which a part of the cartridge 100, which holds one or both ends of the cable, moves toward or away from the modular machine, such as tilting toward or away from a bath of a modular machine (e.g., in the plane defined by the x-axis and the z-axis), as discussed further below. As still another example, this is illustrated in FIGS. 6A-C in which an end of the cable is rotated relative to the modular machine, as discussed further below (e.g., rotated about the x-axis as illustrated in FIG. 1).

In another way, an end of the cable may move toward or away from the modular machine without a part (or any) of the cartridge 100 moving toward or away from the modular machine. As one example, the cartridge may move (such as by pushing, spooling, or the like) an end of the cable toward or away from the modular machine (e.g., along the x-axis as illustrated in FIG. 1). This is illustrated, for example, in FIGS. 4A-B, as discussed in more detail below.

Thus, the left cable holder 102 and the right cable holder 130 include structures to perform one, some, or all of the movements described herein. For example, in one implementation, the left cable holder 102 and the right cable holder 130 include structures to move a part of left cable holder 102 or a part of right cable holder 130 that holds a respective end of the cable 101 so that the respective end of the cable 101 moves relative to the modular machine. For example, left cable holder 102 includes left cable base 103 and left cable holder movable portion 107. Left cable holder movable portion 107 is configured to move relative to left cable base 103. As one example, left cable holder movable portion 107 is configured to slide relative to left cable base 103 (which in this implementation is stationary). In particular, left cable holder movable portion 107 has affixed thereto a sliding member 104 that is configured to slide within a mating portion resident in left cable base 103. As shown in FIG. 1, the left cable holder movable portion 107 of left cable holder 102 is slid backward relative to modular machine (not shown) whereas the right cable holder movable portion 137 of right cable holder 130 is slid forward relative to modular machine. Likewise, right cable holder movable portion 137 has affixed thereto a sliding member 134 that is configured to slide within a mating portion resident in right cable base 131. Manners, other than sliding, in which to move left cable holder movable portion 107 of left cable holder 102 and right cable holder movable portion 137 of right cable holder 130 are contemplated.

As discussed further below, the left cable holder movable portion 107 of left cable holder 102 and right cable holder movable portion 137 of right cable holder 130 may be moved in one of several ways. In one way, a force external to cartridge may move a part of left cable holder 102 or a part of right cable holder 130. For example, as shown in FIG. 1, grip 106 is connected to left cable holder movable portion 107 of left cable holder 102 and grip 136 is connected to right cable holder movable portion 137 of right cable holder 130. As discussed further below, an external force may move grip 106 (such as by using a piston to move grip 106 in the x-direction either toward or away from modular machine). The piston is one example of a cable end movement device. In this regard, grip 106, 136 is an example of a receptor point on cartridge 100 in which to receive an external force. Other types of receptors are contemplated, such as holes, brackets, or other connection points that are configured to receive the external force. Further, in one implementation, left cable holder 102 and right cable holder 130 are biased (such as to the retracted position) without the application of the external force. For example, left cable holder 102 and right cable holder 130 are each spring loaded toward a predetermined position (e.g., the retracted position), and may be moved (e.g., moved toward the modular machine) using force. In an alternate implementation, left cable holder 102 and right cable holder 130 are not biased toward either the retracted or extended position.

Further, FIG. 1 illustrates that the cartridge 100 is holding the cable, such as via rollers 110, 140, and pincers 112, 142. This may comprise the configuration of cartridge 100 during an idle state, such as when the cartridge is transitioning between stations (such as between modular machine 912 and modular machine 916. Further, in the idle state, right cable holder 130 is retracted (similar to the position of left cable holder 102 in FIG. 1) so that both right and left arms of cartridge 100 are retracted during the idle state.

Figure 2A:
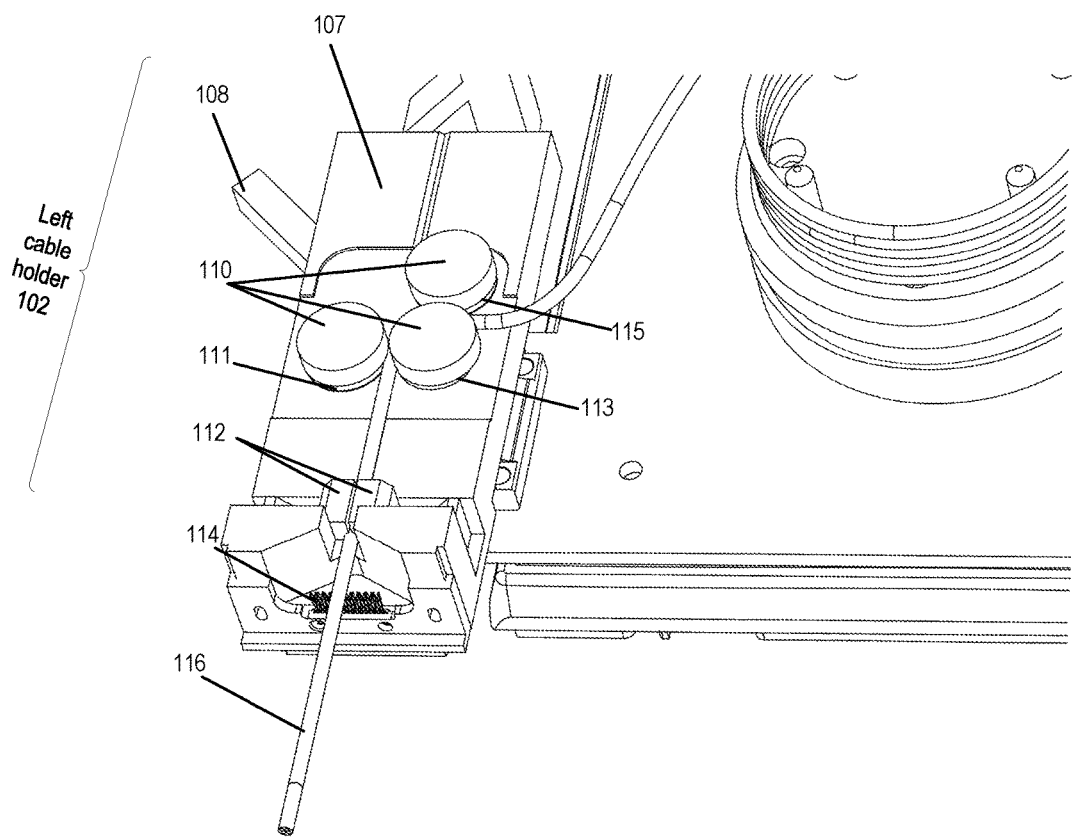
FIG. 2A is a perspective view of the left cable holder of the cartridge, with the cable holders (including rollers and pincers) holding the cable.
Figure 2B:
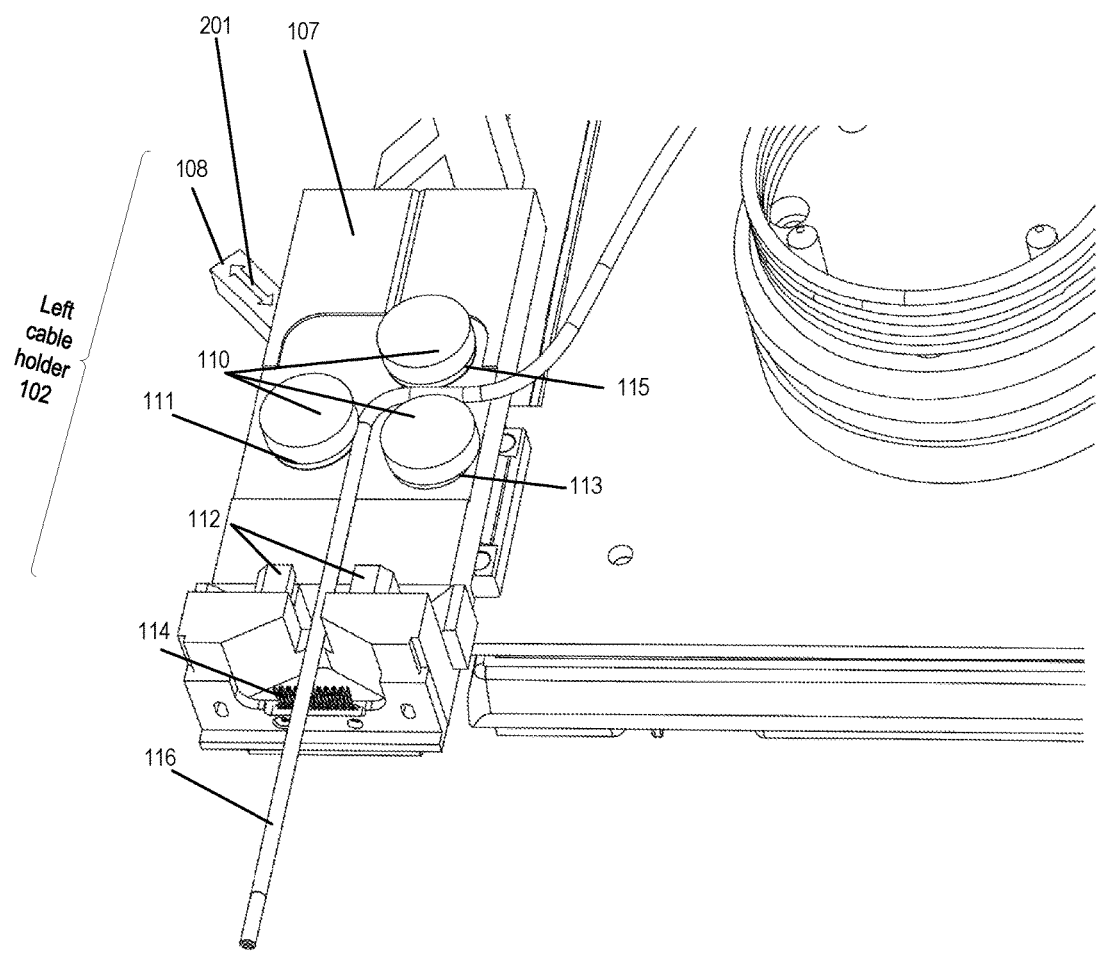
FIG. 2B is a perspective view of the left cable holder of the cartridge, with the cable holders (including rollers and pincers) released so as not to hold the cable.

FIG. 2A is a perspective view of the left cable holder 102 of the cartridge 100, with the cable holders (including rollers 110 and pincers 112) holding the cable 101. FIG. 2B is a perspective view of the left cable holder 102 of the cartridge 100, with the cable holders (including rollers 110 and pincers 112) released so as not to hold the cable. As shown in FIGS. 1 and 2A-B, rollers 110 include a groove 111, 113, 115 shaped to mate with cable 101 so that the cable 101 may be held thereby. Thus, in one implementation, each roller 110 includes a respective groove 111, 113, 115. Alternatively, fewer than all of the rollers 110 includes a respective groove. For example, in one implementation, rollers 110 includes groove 113 and 115, but not 111. In still an alternate implementation, none of rollers 110 includes a groove. Similar to left cable holder 102, right cable holder 130 may include grooves on one, some or all of rollers 140 in order to grip or hold the cable 101.

As shown, lever 108 may be pushed, such as depicted by arrow 201. For example, a motive force may push lever 108 inward, thereby releasing the rollers 110, as illustrated in FIG. 2B. Thus, the motive force may be applied by a cable release device. In this way, that part of the cable 101, held previously by rollers 110 may move. Likewise, FIG. 2B depicts pincers 112 in the released position, as discussed further with respect to FIGS. 2C-D.

Figure 2C:
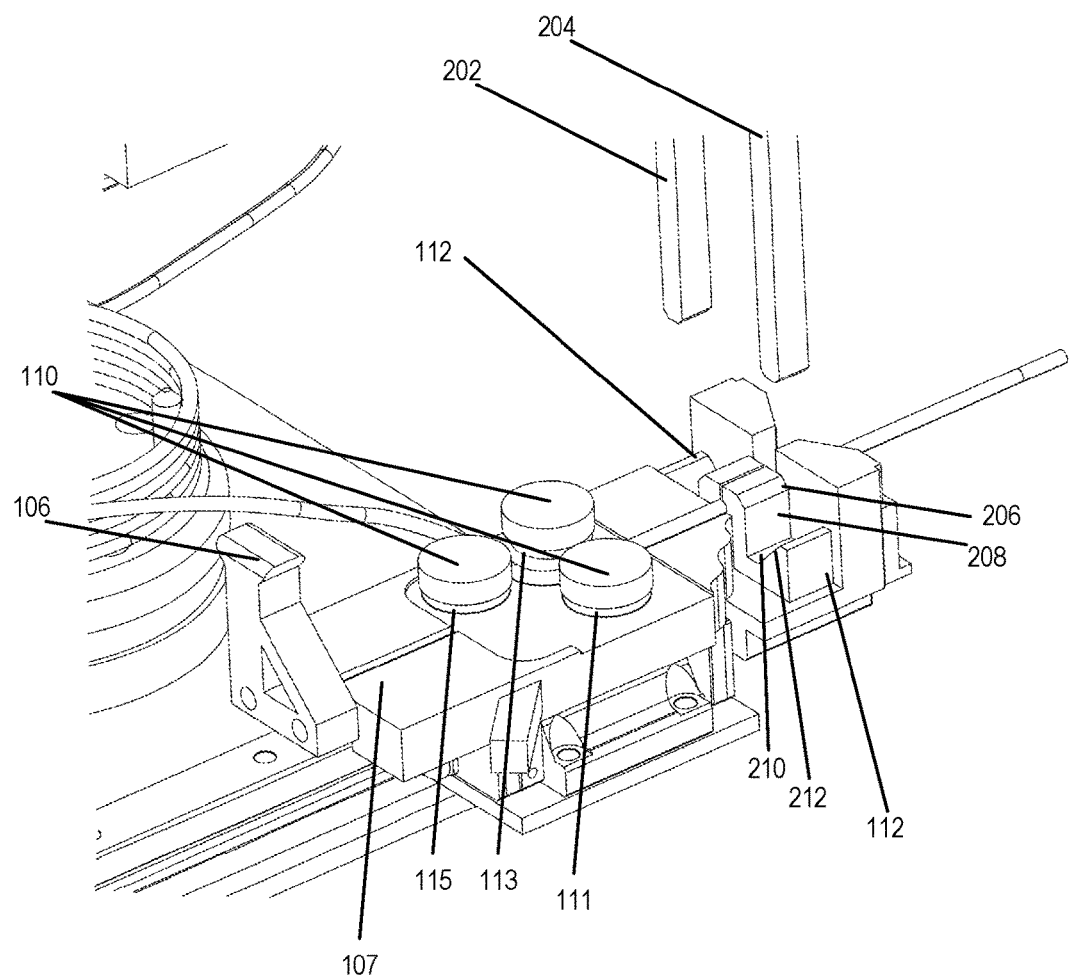
FIG. 2C is a perspective view of the left cable holder of the cartridge, with a tool shown prior to prying the pincers apart in order to release the cable.
Figure 2D:
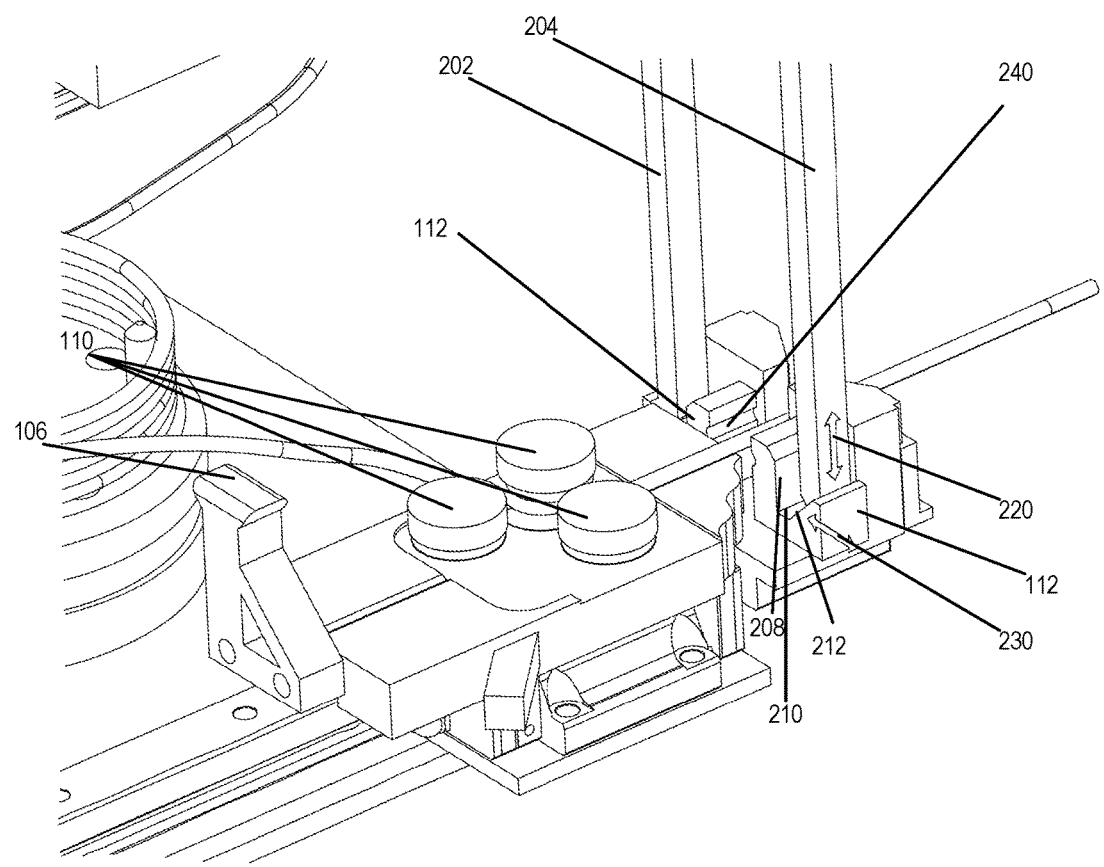
FIG. 2D is a perspective view of the left cable holder of the cartridge, with a tool shown prying the pincers apart in order to release the cable.

FIG. 2C is a perspective view of the left cable holder 102 of the cartridge 100, with a tool 202, 204 shown prior to prying the pincers 112 apart in order to release the cable 101. Thus, tool 202, 204 is another example of a cable release device configured to release a part of the cable held by the cartridge. Pincers 112 may be shaped in order to receive tool 202, 204. As shown in FIGS. 2C-D, tool 202, 204 comprise two rigid sticks shaped to mate with pincers 112. Specifically, pincers include a well that has a bottom 210, a first side 212, a second side 208 and a sloping upper part 206. First side 212 is sloped away (such as at 45°), second side 208 is vertical, and sloping upper part 206 angled at 45° in the opposite direction. In this way, tool 204 may rest in the well of pincer 112. FIG. 2D is a perspective view of the left cable holder 102 of the cartridge 100, with tool 202, 204 shown prying the pincers 112 apart in order to release the cable. Specifically, tool 202, 204 may be moved downward, as shown by arrow 230 in order to engage within the well of pincers 112. Further, the tool may move outward, along arrow 230 in order to pry apart pincers 112. In one implementation, pincers include a groove 240 shaped to mate with cable 101 so that cable may be held by pincers 112 without damaging cable 101. This is illustrated in FIG. 2D when the pincers 112 are pulled apart. As discussed further below, tools, such as tool 202, 204, may be resident on an actuator (such as actuator 350, 906, 914).

Figure 3A:
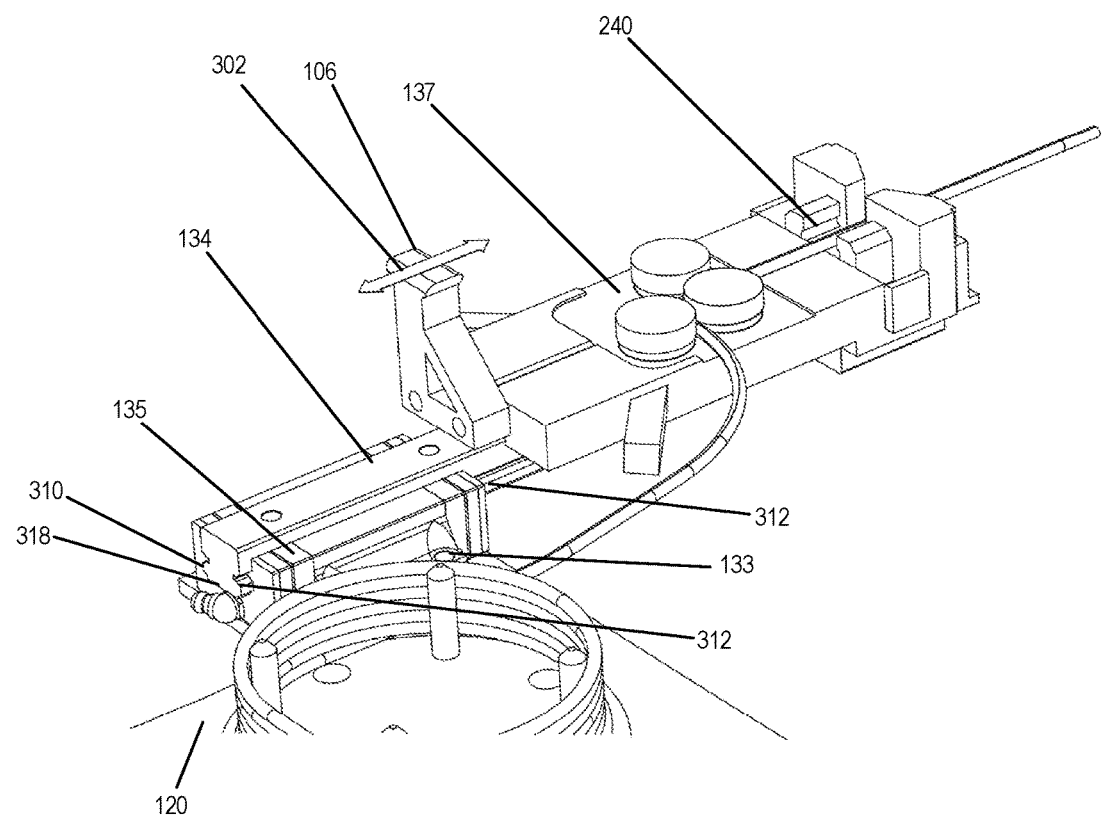
FIG. 3A is a perspective view of the right cable holder of the cartridge, with an arrow indicating movement of the arm.
Figure 3B:
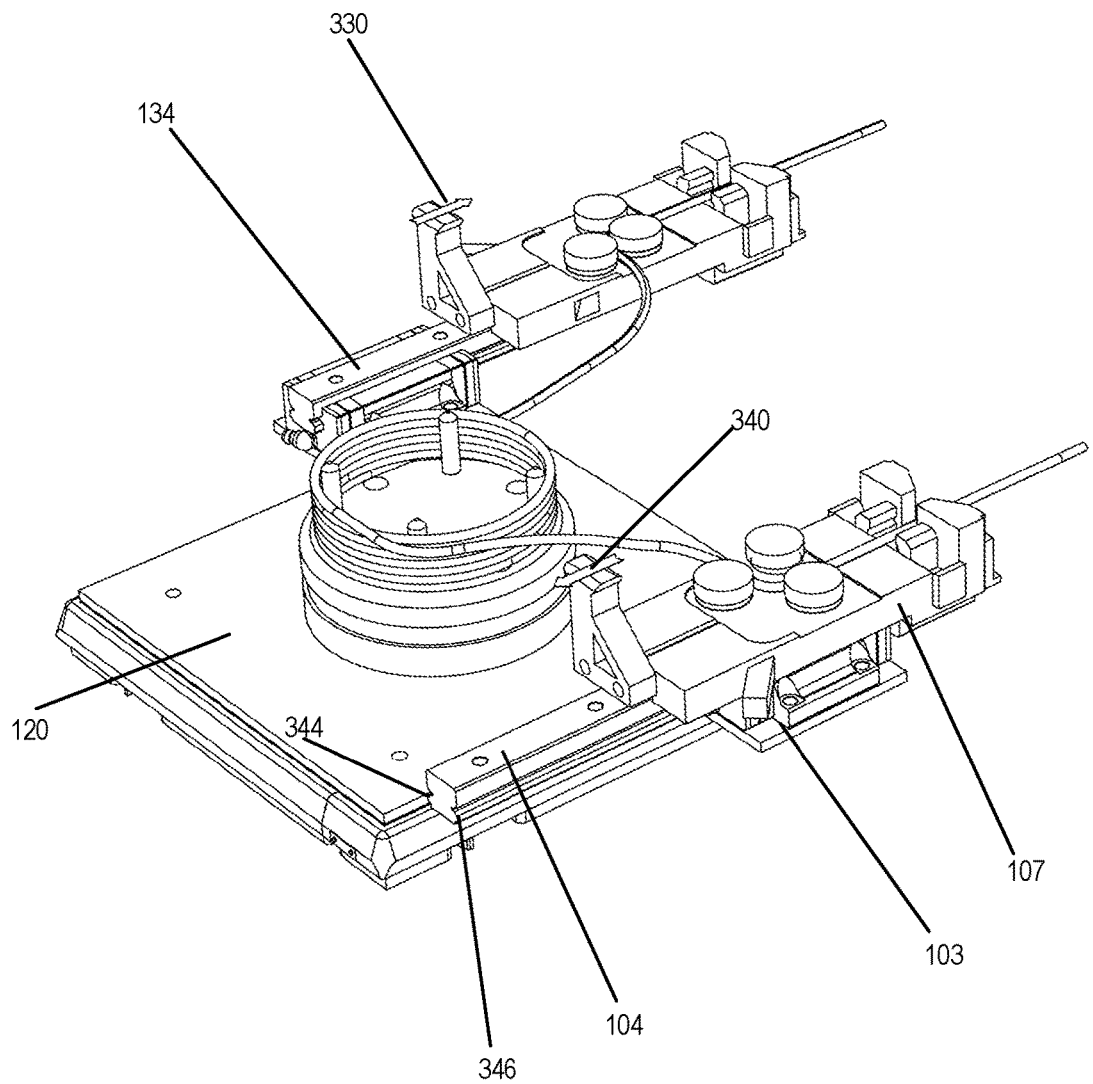
FIG. 3B is a perspective view of the cartridge, with a first arrow indicating forward movement of the right cable holder and a second arrow indicating backward movement of the left cable holder.

FIG. 3A is a perspective view of the right cable holder 130 of the cartridge 100, with an arrow 302 indicating movement of the right cable holder movable portion 137. Base 131 includes an upper base portion 135 which includes a channel 318 in which sliding member 134 slides. In particular, sliding member 134 includes one or more sides 310, 312, which slide within channel 318. Likewise, left cable base 103 includes an upper base portion which includes a channel (not shown) in which sliding member 104 slides. In particular, sliding member 104 may include one or more sides 344, 346 which slide within the channel of left cable base 103.

FIG. 3B is a perspective view of the cartridge 100, with a first arrow 330 indicating forward movement of the right cable holder 130 and a second arrow 340 indicating backward movement of the left cable holder 102. In this regard, the different arms of the cartridge 100 may be controlled in different manners (such as independently and/or in different directions) based on force applied to the different grips 106, 136.

Figure 3C:
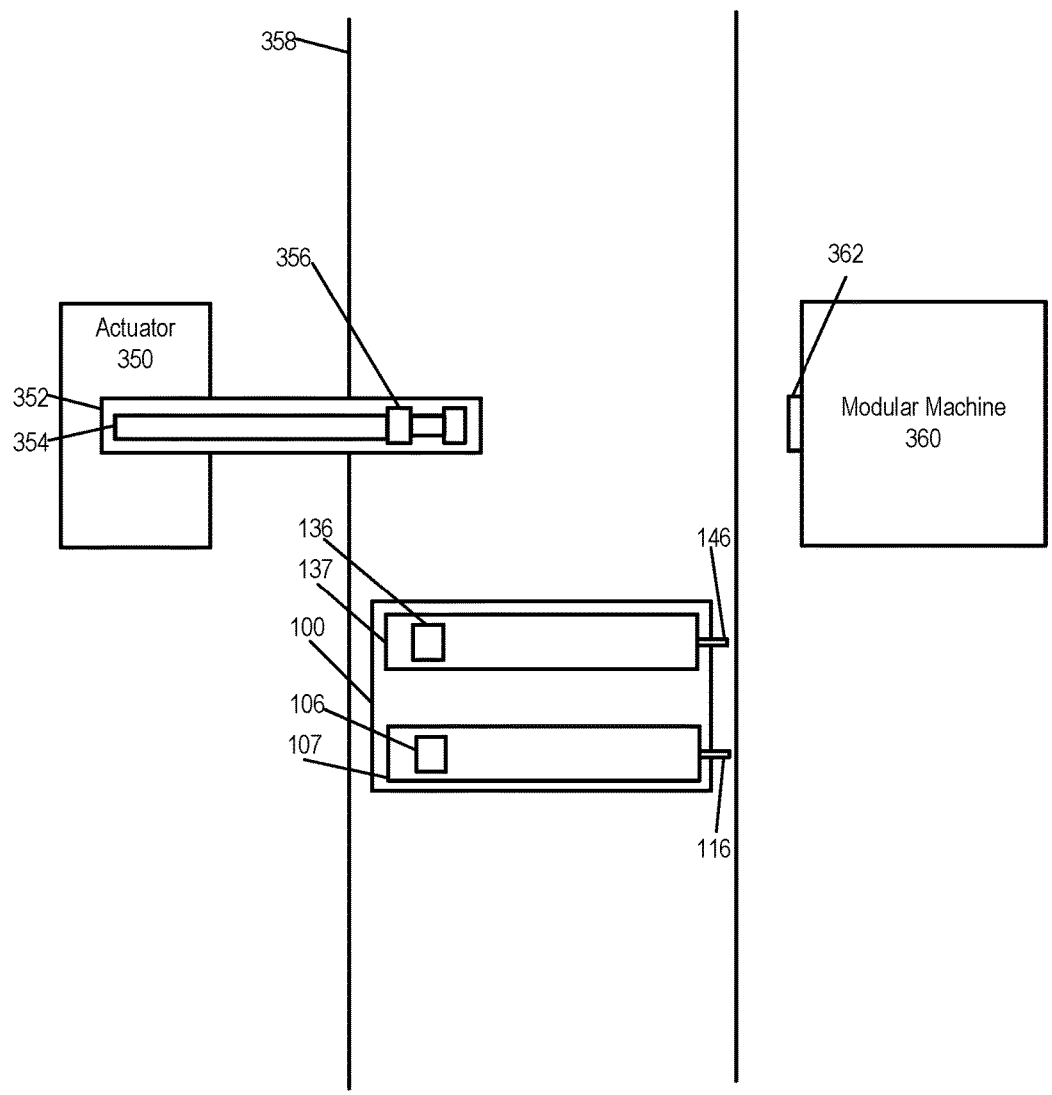
FIGS. 3C-J are a top view of a series of movements of a cartridge relative to an actuator and a modular machine.
Figure 3D:
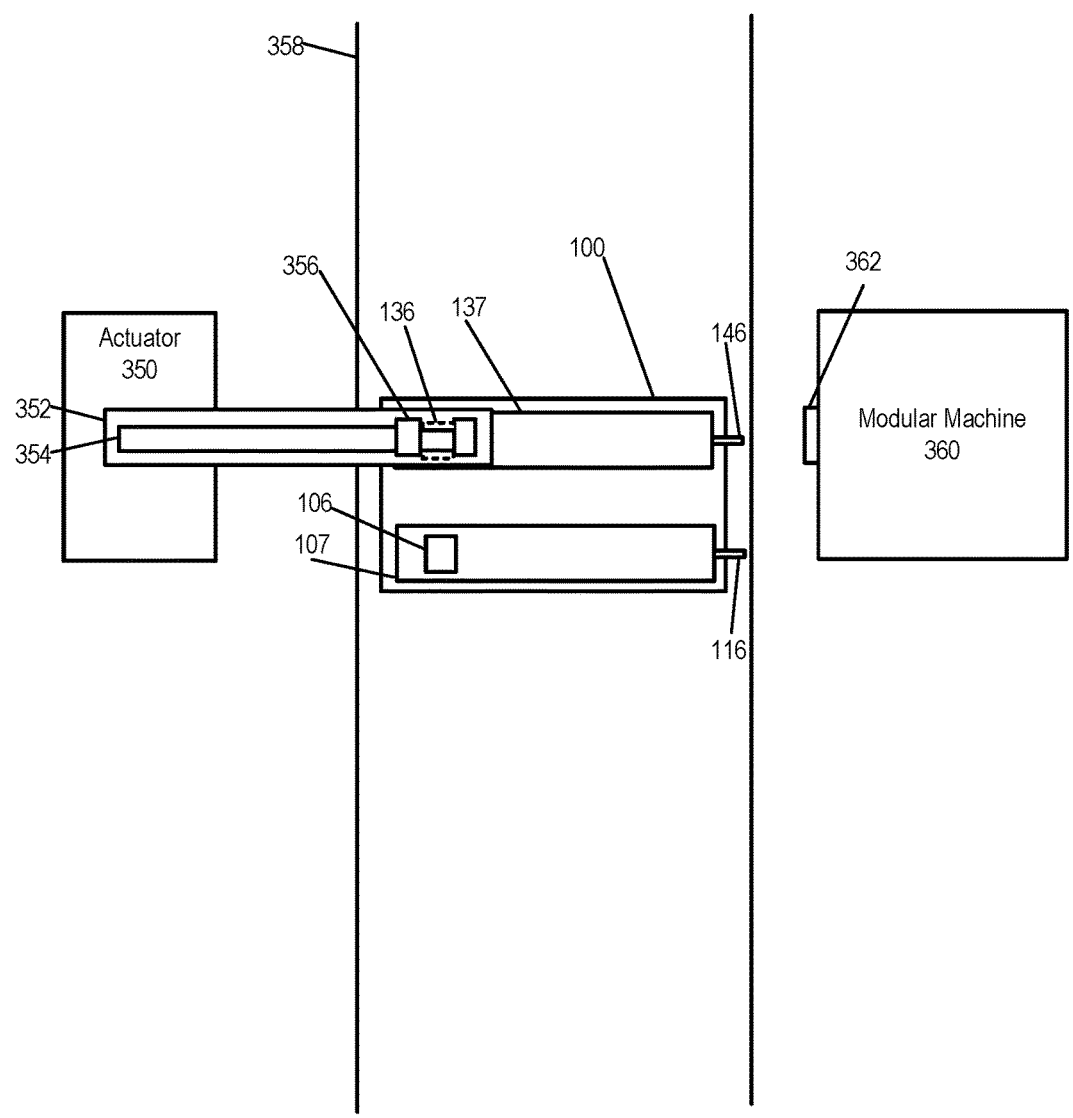
Figure 3E:
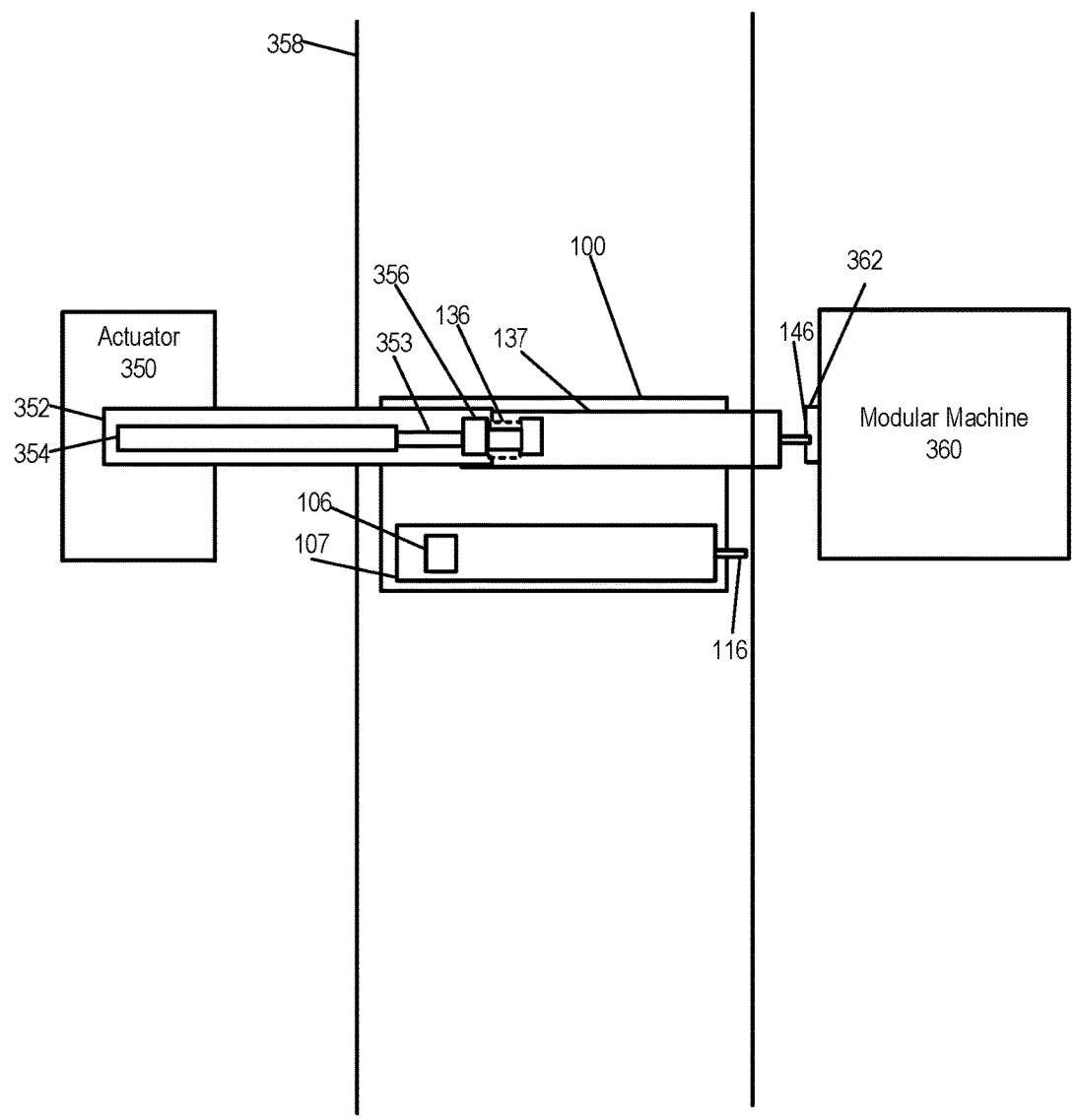

FIGS. 3C-J are a top view of a series of movements of a cartridge relative to an actuator and a modular machine. In particular, the series of movements depicted in FIGS. 3C-J are one example of processing at a station. FIG. 3C is a top view of the cartridge 100 prior to entry into the station. Cartridge 100 moves along conveyor 358 until cartridge 100 is underneath a part of actuator. This is illustrated in FIG. 3D, which is a top view of the cartridge 100 upon entry into the station. As shown, actuator 350 includes a motive force device, such as piston 352. Piston 352 includes various components including grip interface 356. Grip interface 356 is illustrated as dumbbell-shaped. Other shapes are contemplated which can interface with or connect with grip 106, 136. In practice, grip interface 356 is stationary and grip 136 moves underneath grip interface 356 via conveyor 358 (with grip 136 shown in dashed lines to indicate being underneath grip interface 356). A side view is illustrated in FIG. 3K. Alternatively, actuator 350 moves grip interface 356 to interface with grip 136.

As discussed in further detail below, actuator 350 and/or modular machine 360 may be notified of the location of cartridge 100 at the station in one of several ways. In one way, a sensor may be used in combination with a stopper to stop cartridge 100 at the station. After actuator 350 is notified that cartridge 100 is at the station, actuator 350 may actuate piston 354 (shown as extending with extension piece 353), thereby moving right cable holder movable portion 137 toward modular machine 360. Since end 146 of the cable 101 is held in moving right cable holder movable portion 137, end 146 moves as well. This is illustrated in FIG. 3E, in which end 146 of the cable 101 is inserted into opening 362 of modular machine 360. Alternatively, end 146 may be inserted in front of opening 362. Opening 362 is shown as raised on modular machine 360. Alternatively, opening 362 may be flush with modular machine 360. In another alternative, opening 362 may be inset to modular machine 360.

Figure 3F:
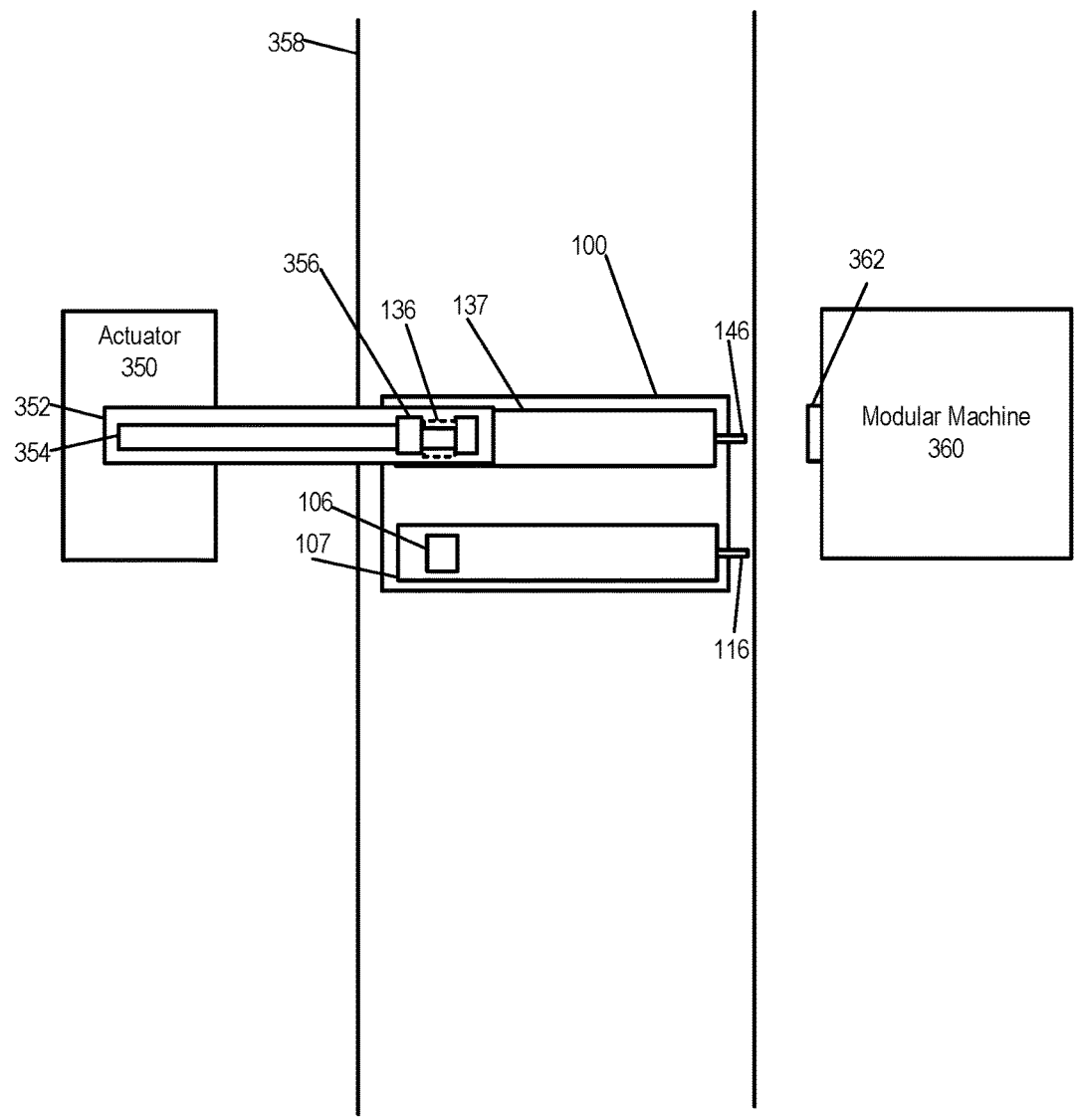
Figure 3G:
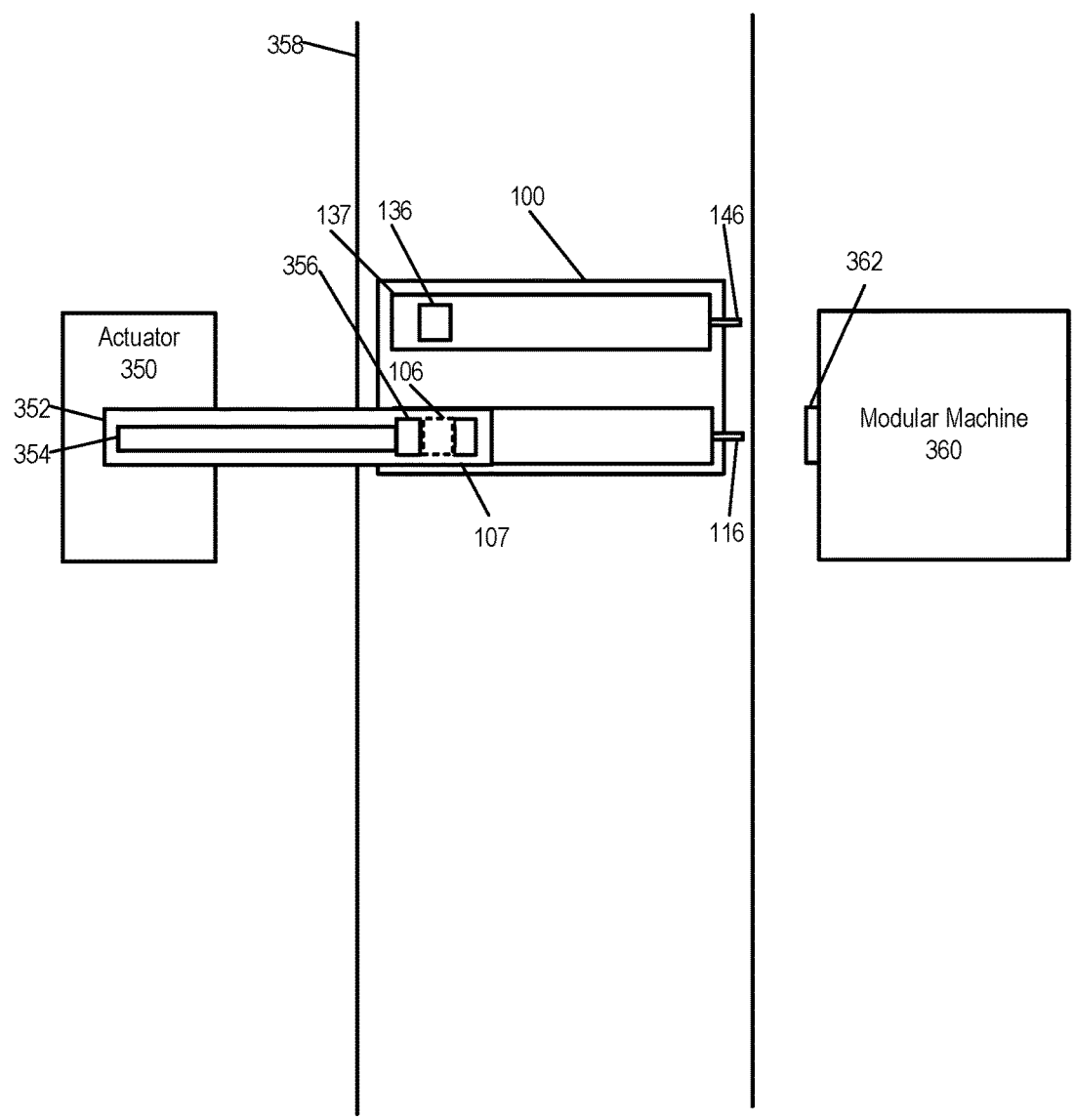
Figure 3H:
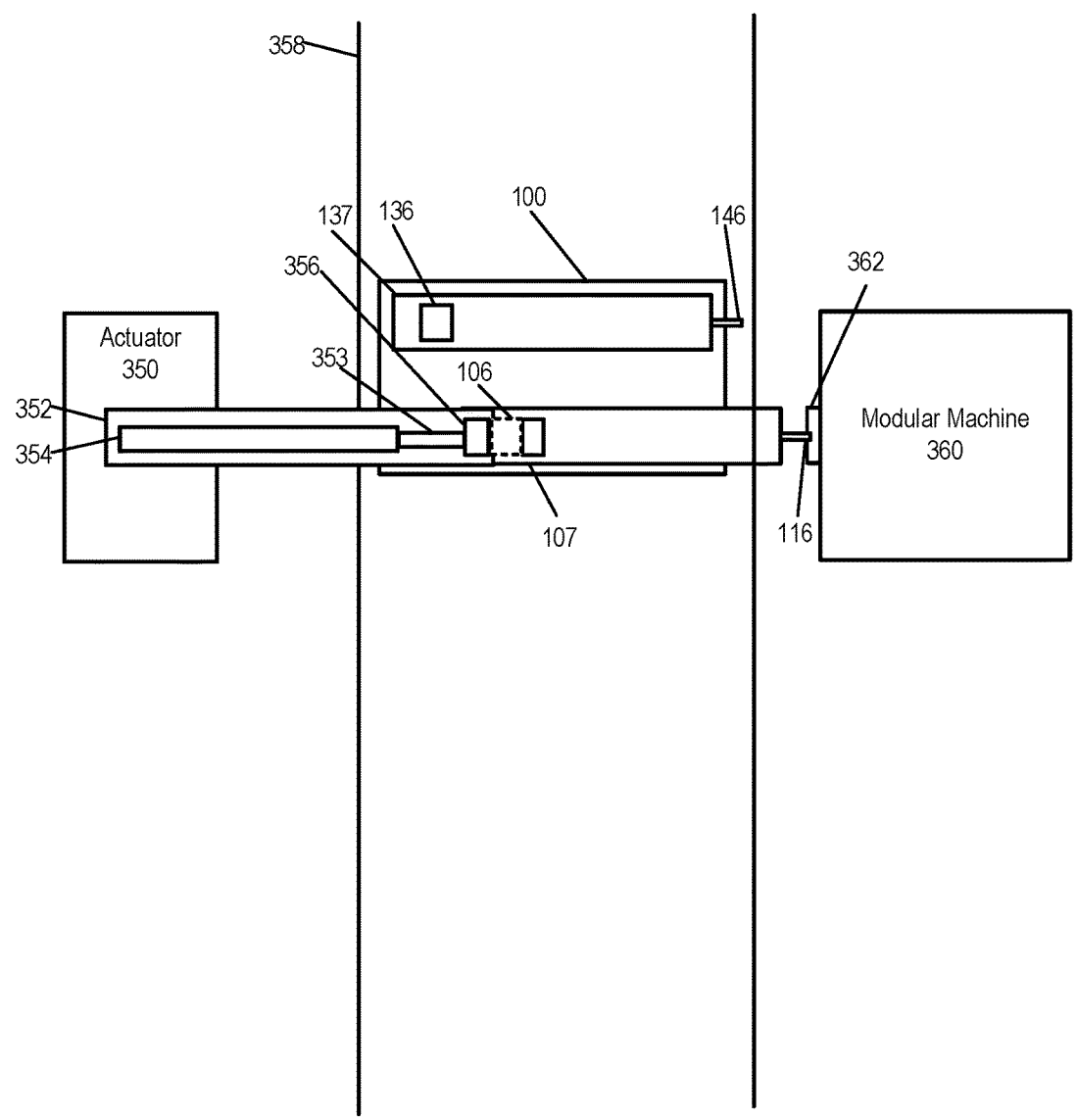
Figure 3I:
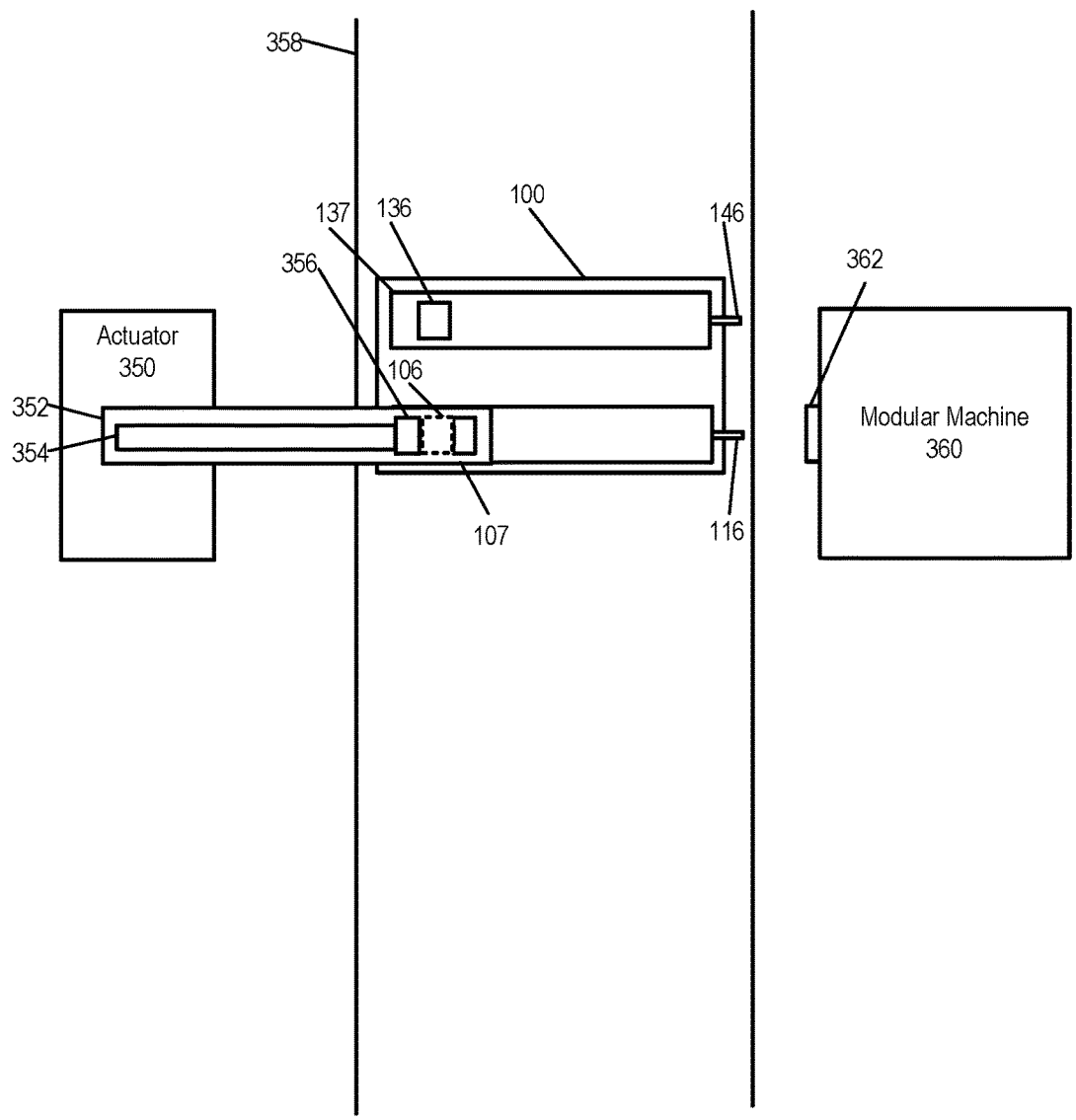
Figure 3J:
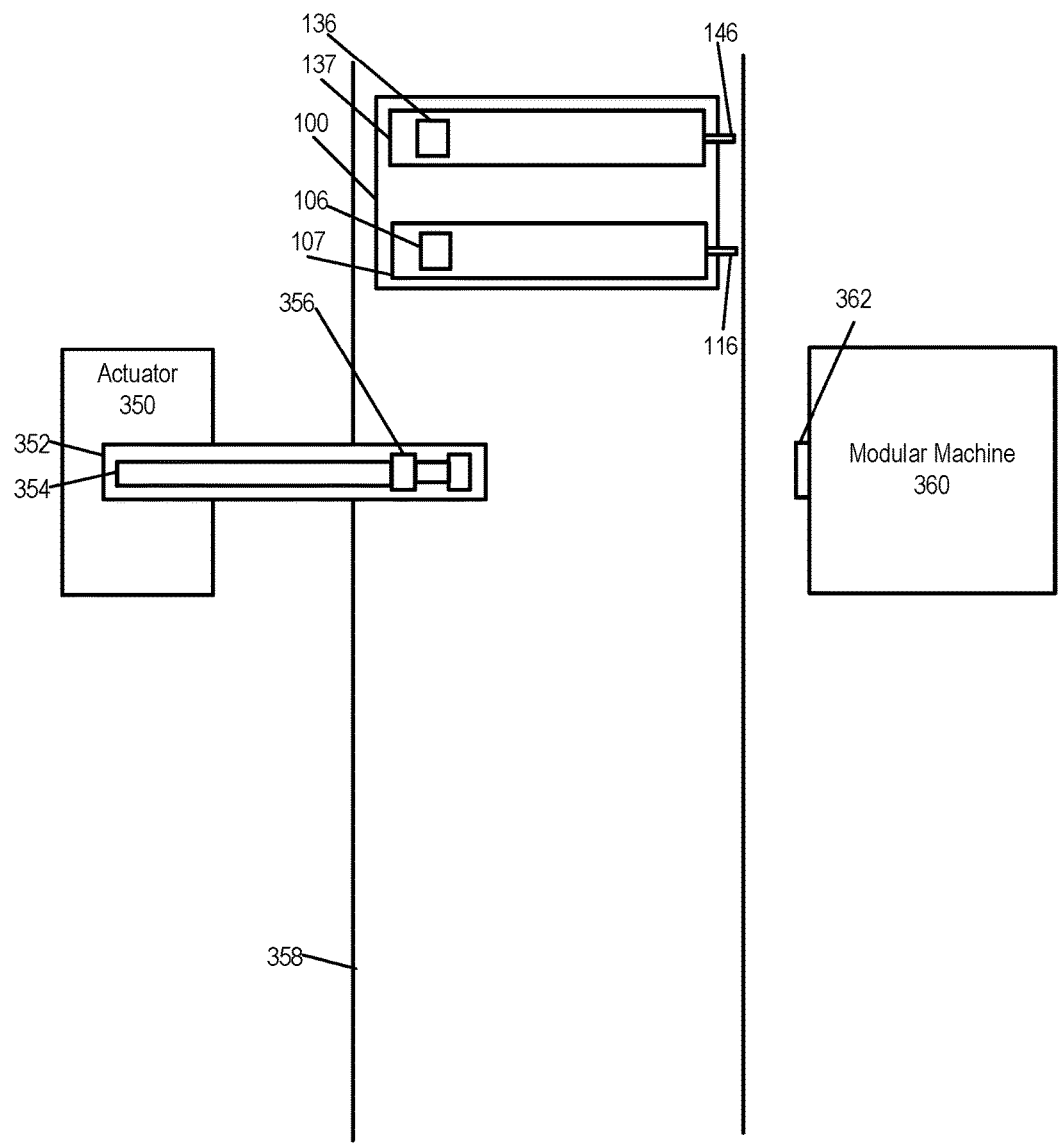
Figure 3K:
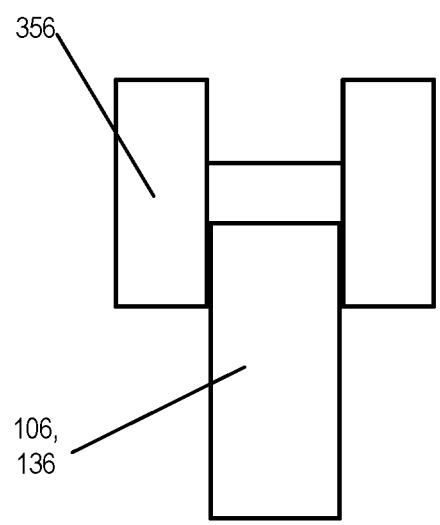
FIG. 3K is a side view of the grip of the cartridge and the grip interface of the piston.

After the modular machine 360 performs its operation on end 146, modular machine 360 may send a signal to actuator 350 to retract piston 252, which is shown in FIG. 3F. In this way, the modular machine may send a command so that the end 116 of the cable 101 is retracted to an exterior of the modular machine 360. After which, actuator 350 may control the movement of cartridge 100 so that cartridge 100 moves further along conveyor 358 so that grip 106 of left cable holder movable portion 107 moves underneath grip interface 356, as illustrated in FIG. 3G. As one example, in a pallet-based conveyor system, the actuator 350 may reengage the pallet connected to cartridge 100 (e.g., which may comprise platform 506, discussed below). In this way, the cartridge 100 may move along conveyor 358 until pallet connected to cartridge 100 hits a stopper and is positioned as shown in FIG. 3G. After which, actuator 350 may actuate piston 354 (shown as extending with extension piece 353), thereby moving left cable holder movable portion 107 toward modular machine 360. Since end 116 of the cable 101 is held in moving left cable holder movable portion 107, end 116 moves as well. This is illustrated in FIG. 3H, in which end 116 of the cable 101 is inserted into opening 362 of modular machine 360. Alternatively, end 116 may be inserted in front of opening 362. After the modular machine 360 performs its operation on end 116, modular machine 360 may send a signal to actuator 350 to retract piston 252, which is shown in FIG. 3I. After which, cartridge 100 moves further along conveyor 358 in order to move to the next station, as shown in FIG. 3J.

Figure 4A:
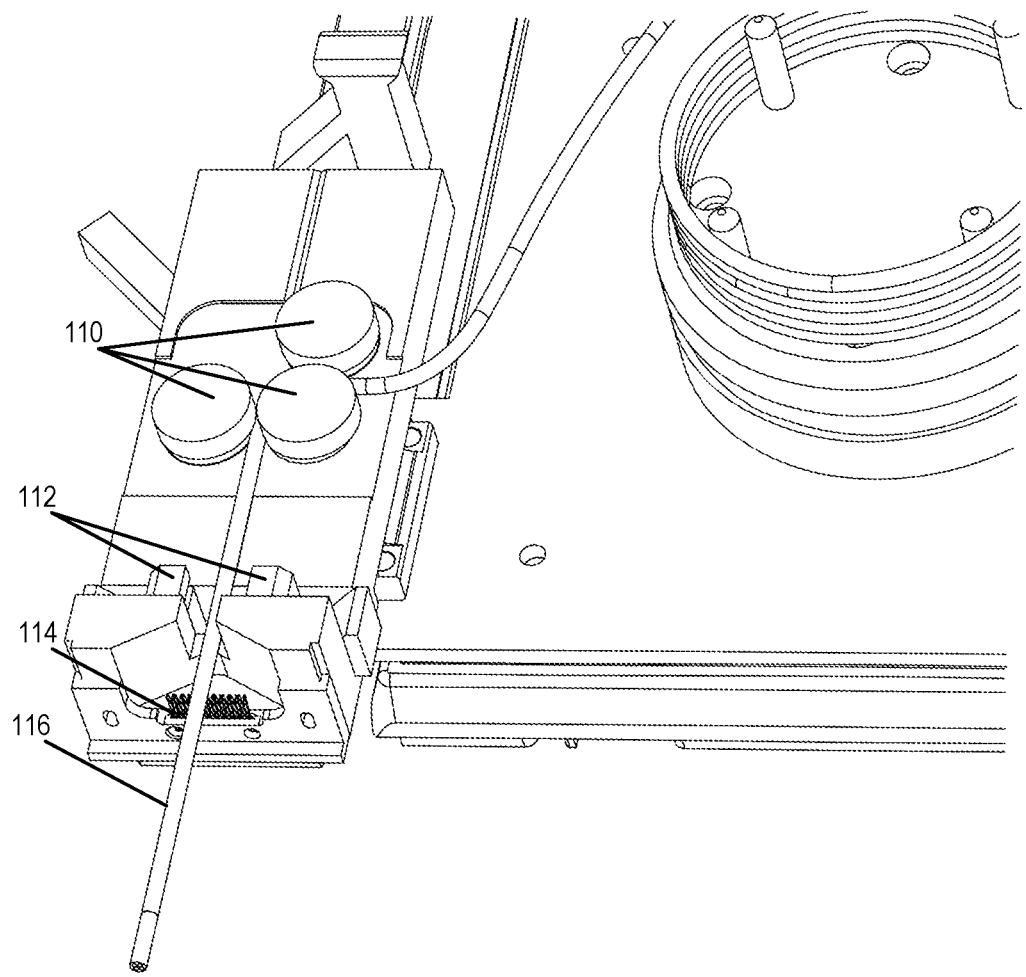
FIG. 4A is a perspective view of the left cable holder of the cartridge, with the pincers in the released position prior to moving the cable forward or backward (e.g., extending or retracting the cable).
Figure 4B:
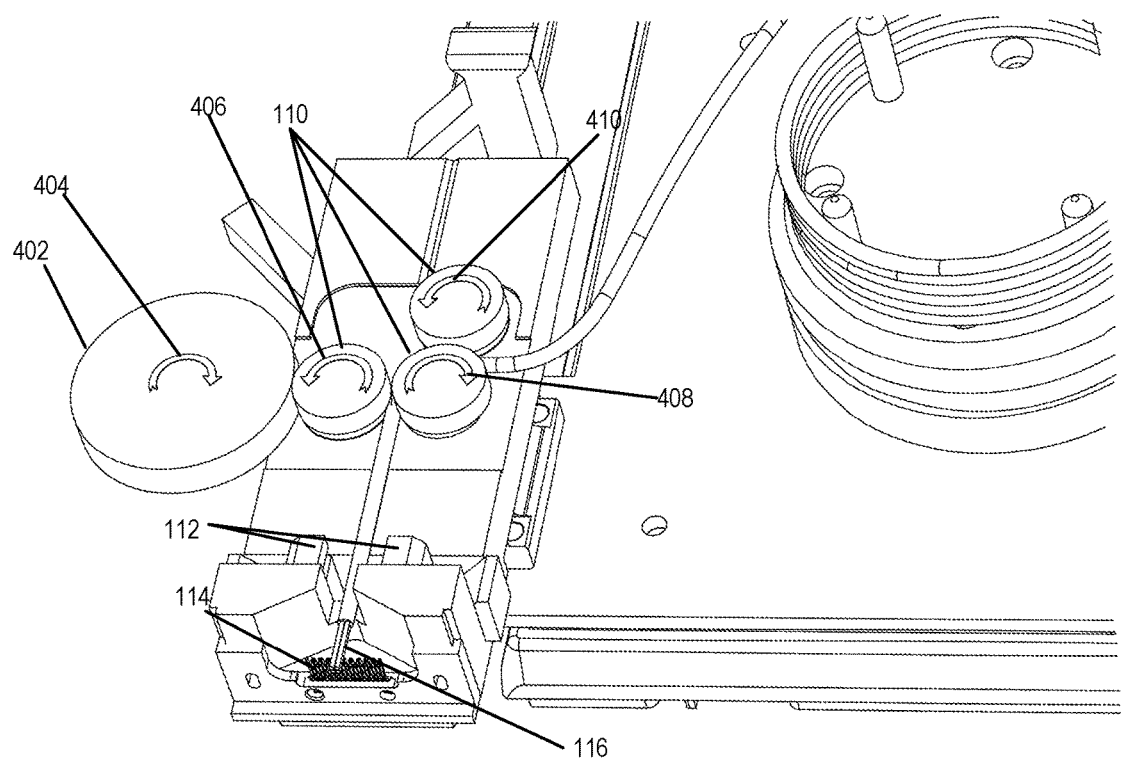
FIG. 4B is a perspective view of the left cable holder of the cartridge, with the pincer in the released position and with a roller on the actuator moving the rollers on the cartridge to retract the cable.

FIG. 4A is a perspective view of the left cable holder 102 of the cartridge 100, with the pincers 112 in the released position prior to moving the cable 101 forward or backward (e.g., extending or retracting the cable). FIG. 4B is a perspective view of the left cable holder 102 of the cartridge 100, with the pincers 112 in the released position and with a motorized roller 402 on the actuator moving the rollers 110 on the cartridge 100 to retract the end 116 of the cable 101. In one implementation, the cartridge 100 does not include any motors or active moving elements. Rather, in this implementation, the cartridge 100 includes only passive elements. Thus, an external device, such as the actuator or the modular machine(s), provides the motive force to move the passive elements of the cartridge 100. As one example, the actuator may include motorized roller 402 that engages with one of the rollers 110 in order to transmit motion to the rollers 110. In particular, motorized roller 402 is shown moving in a direction indicated by arrow 404. This direction is transmitted to rollers 110, with directions indicated by arrows 406, 408, 410 as shown. The clockwise direction of arrow 404 results in the end 116 of cable 101 retracting toward cartridge 100. Conversely, a counter-clockwise direction of arrow 404 results in the end 116 of cable 101 extending away from cartridge 100. Thus, motorized roller 402 provides one example of a device that may interact with a part of the cartridge 100 in order to provide the desired movement.

In one implementation, the motorized roller 402 may be brought into contact with one of the rollers 110. Alternatively, the one of the rollers 110 may be brought into contact with the motorized roller. In a first specific implementation, the motorized roller 402 may begin rotating after contact with the one of the rollers 110. In a second specific implementation, the motorized roller 402 may be rotating prior to contact with the one of the rollers 110. Likewise, a motorized roller 402 may contact one of the rollers 140 of right cable holder 130 in order to extend or retract cable end 146.

In an alternate implementation, the cartridge includes one or more motors in order to move the rollers 110. Responsive to receiving a signal to move the rollers, the cartridge may active the one or more motors in order to move the rollers.

FIG. 4B illustrates one way in which to extend or retract an end of the cable using multiple rollers. In an alternate implementation, the end of the cable may be extended or retracted by using two sets of grippers (without a roller). In particular, a first gripper is used to keep the cable stationary and a second gripper is used to move the cable. When it is desired to keep the cable taut, the first gripper is configured to maintain the hold of the cable. When the cable is to be moved, the first gripper is released, and the second gripper pulls or pushes the cable to move the cable forward/back. After the cable has been moved to the desired location, the first gripper (and optionally the second gripper) is re-engaged. In yet another implementation, the end of the cable may be extended or retracted using two rollers and one or more rubber chains, with the rubber chains pushing or pulling the cable between them.

FIG. 5A is a perspective view of the cartridge 100, with a part of the cartridge moving about a hinge so that one or both of the ends 116, 146 of the cable 101 can be dipped into a bath (not shown). In particular, a first structure is configured to hold one or both ends 116, 146 of cable 101, a second structure is configured to remain stationary (e.g., platform 506), and a hinge connected between the first structure and the second structure so that the first structure can rotate about an axis of rotation 504. In particular, a force (illustrated by arrow 502) may be applied such that the first structure forms an angle with the second structure of at least 30°, at least 45°, at least 75°, or at least 90°. As shown in FIG. 5A, an angle of 90° is formed between the first structure and the second structure.

In one implementation, the first structure may comprise the base 120, the left cable holder 102 and right cable holder 130. Further, the second structure may comprise platform 506, with the hinge connecting the base 120 to the platform 506. As discussed below, the platform 506 may be connected to a conveyor in order to move the cartridge from one modular machine to another. In another implementation, the first structure may include a first base supporting the left cable holder (holding the end 116 of the cable), a second base supporting the right cable holder (holding other end 146 of the cable). Further, a first hinge may connect the first base to the platform and a second hinge may connect the second base to the platform. In this implementation, two forces may be applied in order to tip each end, with a first force applied to the first base in order to tip the end 116 of the cable, and a first force applied to the second base in order to tip the other end 146 of the cable.

Thus, in the event that the modular machine includes a bath, such as a tin bath, a coating may be applied to one or both ends 116, 146 of the cable 101. For example, if both ends 116, 146 are to be coated in the bath, each end 116, 146 are extended (such as discussed above with respect to FIG. 4B. As another example, if only one end is to be coated in the bath, one end is extended, such as end 116, and another end, such as end 146, is retracted. In practice, the cartridge 100 may be tipped along a hinge by applying one or more external forces (illustrated by arrow 502). Responsive to application of the external force(s), such as by an actuator, the base 120 (and all structures attached to the base 120) are rotated along the axis of rotation 504 as defined by the hinge while platform 506 remains stationary. In this way, one or both the ends 116, 146 of cable 101 may be coated with tin or another substance.

Alternatively, instead of tipping the cartridge about a hinge, one or both the ends 116, 146 of cable 101 may be extended (and in the horizontal position, such as illustrated in FIG. 1) and tin may be dripped onto the one or both ends 116, 146 of cable 101.

FIG. 5B illustrates the hinge 508 of the cartridge and a robotic arm 510 configured to move the part of the cartridge, such as base 120, about the hinge 508. The robotic arm 510 may be inserted into base 120 when base is in the horizontal position. In particular, a device, such as actuator and/or modular machine) may command the robotic arm 510 to be inserted into base 120. This motion of insertion is shown by arrow 512. Robotic arm 510 may include an upper part and a lower part in order to sandwich a part of base 120. After insertion, robotic arm 510 may move upward and downward, such as shown by arrow 514. The movement may create different angles between platform 506 and base 120, such as 30°, 60°, 90° or more than 90°. Thus, robotic arm 510 may lift base 120 and also rotate base 120 along hinge 508. Alternatively, base 120 may be moved by a rotating gripper, with the rotation axis of the gripper being selected to perform the rotation of base 120 as shown.

FIG. 6A is a perspective view of the left cable holder 102 of the cartridge 100, with the rotating roller 604 on tool 602 of the actuator positioned above a part of the cable 101. Tool 602 may be moved or positioned via a movement roller device (such as a motor) that may be resident in the actuator (such as actuator 350). In this way, movement roller device may move tool 602 into contact with portion 605 of the cable 101, as discussed below.

As discussed above, the cable 101 may be moved in one of several ways. In one way, the cable 101 may be rotated about an axis, such as a longitudinal axis or the x-axis as defined in FIG. 1. The rotational movement of the cable 101 may be in preparation for, or in advance of, a modular machine performing an operation on the cable (such as gripping one or more of the wires in the cable, such as aligning the cable position to the connector orientation, as discussed in further detail below). In one implementation, prior to performing the rotational movement of the cable 101, actuator may release rollers 110, such as by actuator moving lever 108, thereby removing the pressure to cable 101. After which, the rotation movement of the cable 101 may be performed.

In particular, the rotating roller 604 may be placed above a portion 605 of the cable 101 that sits on a roller 606 on the left cable holder movable portion 107. Roller 606 may act as a rolling structure on which the portion 605 of the cable 101 may roll or rotate. The portion 605 of the cable 101 is proximate to the end 116 of the cable 101, such as less than 1 foot from the end 116 of the cable 101, less than ½ foot from the end 116 of the cable 101, less than ¼ foot from the end 116 of the cable 101, less than ⅛ foot from the end 116 of the cable 101, or less than 1/16 foot from the end 116 of the cable 101. FIG. 6B is a first perspective view (from the back) of the left cable holder 102 of the cartridge 100, with the rotating roller 604 of the tool 602 of the actuator contacting a part of the cable 101 thereby rotating the end 116 of the cable 101. Since the cable 101 sits on roller 606, the rotational movement (illustrated as arrow 610) of rotating roller 604 is transferred to the part of the cable 101 in contact, thereby rotating the end 116 of the cable 101 (illustrated as arrow 612). FIG. 6C is a second perspective view (from the opposing perspective of FIG. 6B) of the left cable holder 102 of the cartridge 100, with the rotating roller 604 of the tool 602 of the actuator contacting a part of the cable 101, thereby rotating the end 116 of the cable 101. The rotation of the end 116 of the cable 101 may be in the clockwise or counterclockwise direction. Further, after the end 116 of the cable 101 is rotated, actuator may re-engage rollers 110, such as by actuator moving lever 108, thereby applying pressure to cable 101. In this way, when the modular machine, which is configured to electrically connect the wires to the connector, may command the longitudinal rotation in preparation for and to align with the connector orientation.

For example, a cable may have four wires (red, black, green, and yellow). The modular machine is configured to connect each of the wires, based on color, to a particular connection pad of the connector. Because of the potential random placement of the four wires or the potential for twisting of wires, and because of the requirement of predetermined connection of wires to the respective placement pads, the rotation of the cable prior to electrical connection of the wires to the respective placement pads may aid in the electrical connection of the wires to the respective placement pads. As another example, a printed circuit board (PCB) may include multiple sides (such as two sides to the PCB). The modular machine, which may comprise a soldering machine, may first solder wires on one side of the PCB (such as the top side of the PCB) and then solder wires on another side of the PCB (such as the bottom side of the PCB). The rotation of the wires may be performed after soldering the one side of the PCB but before soldering the another side of the PCB.

Thus, FIGS. 6A-C illustrate the ability to rotate an end the cable along a longitudinal axis. The rotation of the cable (or the wires within the cable) may enable the modular machine to connect the wires to each of the connector pins, in the event that the wires may have difficulty reaching the connector pins. Specifically, in the instance that the wires are too short, the modular machine may have difficulty to grab the wires or may have difficulty for the wires to reach the connector pad in order to electrically connect the wire to the connector pad. In this way, rotating the cable in order for the cable to be in a better position may allow for easier connection of the wires to connector pins.

As discussed above, one or more wires may be held for processing (such as for connecting (e.g., electrically connecting and/or mechanically connecting) the wire). One or more structures may be used to hold the wires. As one example of a comb structure, comb 114, 144 may be used. FIG. 1 illustrates that comb 114, 144 is resident on cartridge 100. Alternatively, the comb may be resident on the modular machine and not resident on the cartridge. Another example of a structure to hold the wires is one or more hooks. For example, a device may hook down the wires one at a time. After performing an operation on the wires, the wires may be pulled in order to unhook the wires.

Comb 114, 144 may be composed of plastic, metal, wood, or the like. Further, comb 114, 144 may be configured with a plurality of teeth in order to hold a plurality of wires. For example, the come may include two teeth to hold 1 wire, three teeth to hold 2 wires, four teeth to hold 3 wires, five teeth to hold 4 wires, six teeth to hold 5 wires, etc. Thus, FIG. 1 depicts a comb 114, 144 that holds a single row of wires. Each of left cable holder 102 and right cable holder 130 includes a single comb. Alternatively, the cartridge may include multiple rows of combs.

Figure 7A:
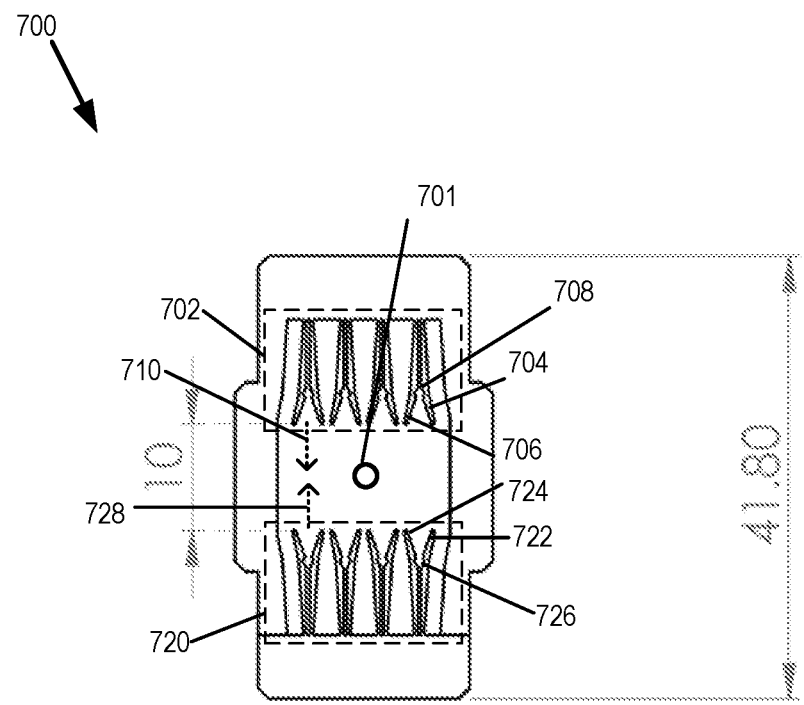
FIG. 7A illustrates a first multi-comb arrangement of a multi-level comb in which to hold wires, with the multi-level comb comprising a first comb and a second comb directly facing one another.

For example, FIG. 7A illustrates a first comb structure, which may comprise a first multi-comb arrangement of a multi-level comb 700 in which to hold wires, with the multi-level comb 700 comprising a first comb 702 and a second comb 720 directly facing one another. In particular, FIG. 7A illustrates arrow 710 as being perpendicular to one of the holders in comb 702, and arrow 728 as being perpendicular to one of the holders in comb 720. Arrow 710 points directly at arrow 728, so that each of the holders in comb 702 has an opposing and directly opposite holder in comb 720.

Figure 7B:
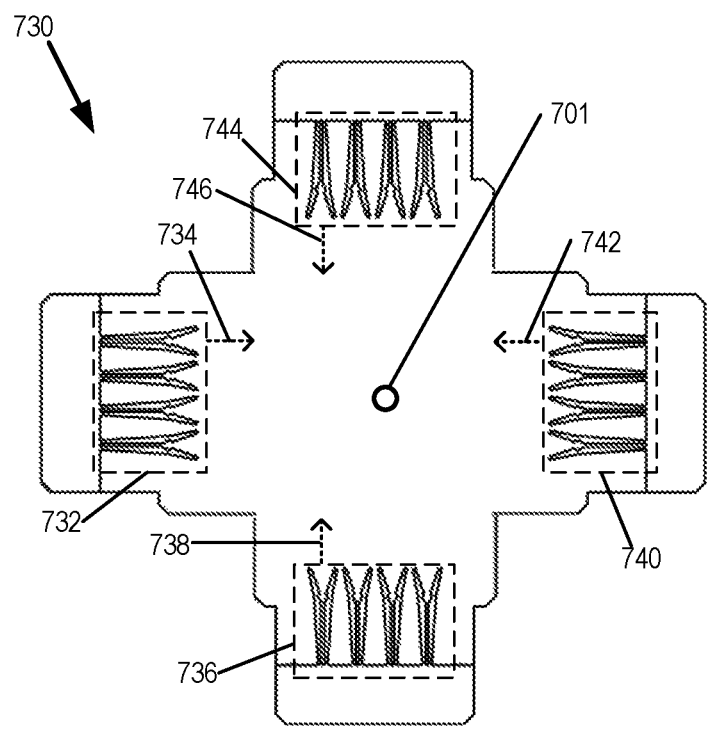
FIG. 7B illustrates a second multi-comb arrangement in which to hold wires, with a first set of two combs directly facing one another and a second set of combs directly facing one another.

In one implementation, comb 114 in FIG. 1 may be replaced with a first comb structure (as illustrated in FIG. 7A) and comb 144 in FIG. 1 may be replaced with a second comb structure (as illustrated in FIG. 7A). FIG. 7A further illustrates cable 701, which breaks or moves through a plane as defined by first comb 702 and second comb 720. In particular, cable 701 is sandwiched in between first comb 702 and second comb 720. Likewise, in FIG. 1, end 116 of cable 101 breaks or moves through the plane as defined by comb 114. In particular, comb 114 is between the platform 506 and end 116 of cable 101. As discussed above, end 116 of cable 101 may move along the x-axis, as defined in FIG. 1. Similarly, cable 701 may move along the x-axis and FIG. 7B illustrates a second multi-comb arrangement 730 in which to hold wires, with a first set of two combs 732, 740 directly facing one another and a second set of combs 736, 744 directly facing one another. In particular, FIG. 7B illustrates arrow 734 as being perpendicular to one of the holders in comb 732, and arrow 742 as being perpendicular to one of the holders in comb 740. Arrow 734 points directly at arrow 742, so that each of the holders in comb 732 has an opposing and directly opposite holder in comb 740. Likewise, FIG. 7B illustrates arrow 738 as being perpendicular to one of the holders in comb 736, and arrow 746 as being perpendicular to one of the holders in comb 744. Arrow 738 points directly at arrow 746, so that each of the holders in comb 736 has an opposing and directly opposite holder in comb 744.

In one implementation, comb 114 in FIG. 1 may be replaced with a first comb structure (as illustrated in FIG. 7B) and comb 144 in FIG. 1 may be replaced with a second comb structure (as illustrated in FIG. 7B). FIG. 7B further illustrates cable 701, which breaks a plane as defined by combs 732, 736, 740, 744.

Figure 7C:
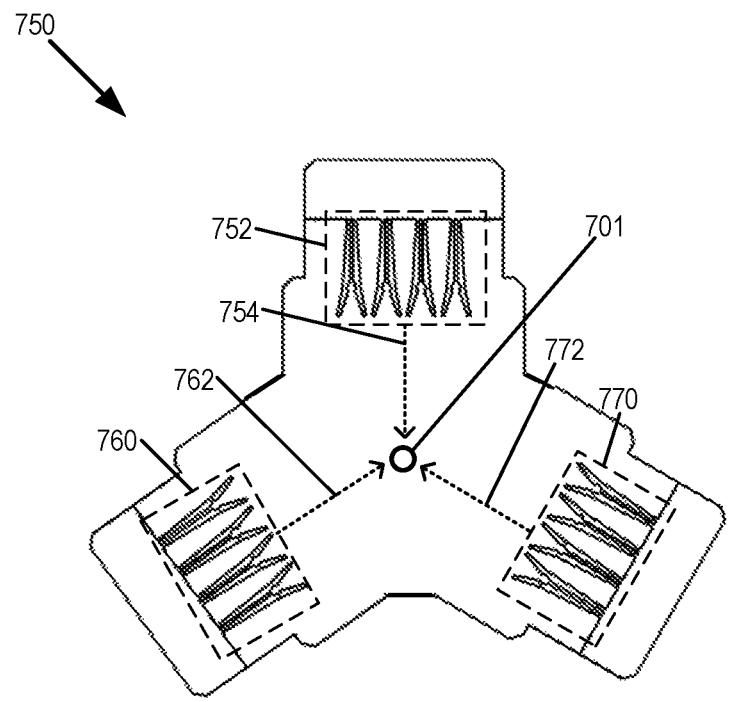
FIG. 7C illustrates a third multi-comb arrangement in which each of the combs partly (although not directly) face one another.

FIG. 7C illustrates a third multi-comb arrangement 750 in which each of the combs partly (although not directly) face one another. In particular, FIG. 7C illustrates arrow 754 as being perpendicular to a part of comb 752, arrow 762 as being perpendicular to a part of comb 760, and arrow 772 as being perpendicular to a part of comb 770. Each of arrow 754, 762 and 772 point to a common center. In this regard, each of the combs partly faces one another.

In one implementation, comb 114 in FIG. 1 may be replaced with a first comb structure (as illustrated in FIG. 7C) and comb 144 in FIG. 1 may be replaced with a second comb structure (as illustrated in FIG. 7C). FIG. 7C further illustrates cable 701, which breaks a plane as defined by combs 752, 760, 770.

In one implementation, the wires may be held in a structure that is generally V-shaped, such as illustrated in FIGS. 1 and 7A-C. Specifically, two opposing structures, such as 704, 706 and 722, 724 may generally form a V-shape. The intersection point of the V-shape, as shown in 708, 726, may comprise a region shaped to hold the wire. For example the intersection point may be generally circular, oblong, elliptical or diamond shaped. In this way, the wire may be guided by the V-shape and then held by the intersection point.

Figure 8:
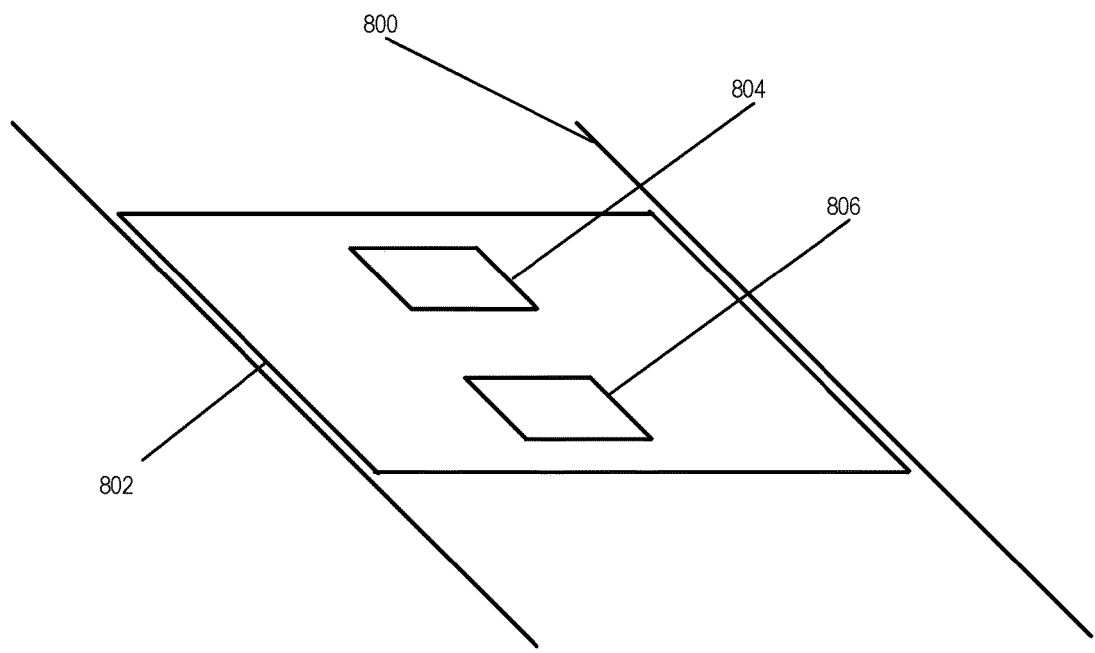
FIG. 8 illustrates the connection of the cartridge to the pallet or index conveyor system.

FIG. 8 illustrates the connection of the cartridge 802 to the pallet or index conveyor system. Specifically, cartridge 802 includes one or more connection points (illustrated as 804, 806) which may engage a part of conveyor 800. In this way, cartridge 802 may move along conveyor 800.

The cartridge includes one or more connectors in order to engage the conveyor. Further, in one implementation, the cartridge does not include any motors or any means for producing motive power. Rather, the cartridge is an entirely passive device that relies on external devices, such as actuators or modular machines, to apply force to a part of the cartridge. Thus, in this implementation, all of the control/motive force is resident outside of the cartridge, such as at the actuator or modular machine. As discussed in further detail below, each station may be configured for a predetermined operation. In addition, a respective station may have one or more required motions for various activities. As discussed above, motions may include pushing/pulling the cable, pushing/pulling a part of the cartridge (such as an arm of the cartridge), etc. The respective station may thus perform one, some or all of the motions described herein.

As discussed above, various types of conveyors may be used. In one implementation, a pallet-based conveyor system is used in which the pallet sits on a moving belt. Stoppers in the conveyor line may halt the pallet motion, thereby releasing or disengaging the pallet from the conveyor. When the pallet is to move to the next station, the pallet may re-engage the conveyor. In another implementation, an indexed-based conveyor system may be used, in which the cartridge is mechanically connected to a chain. Thus, in this implementation, all cartridges in the conveyor line move and stop simultaneously.

Figure 9:
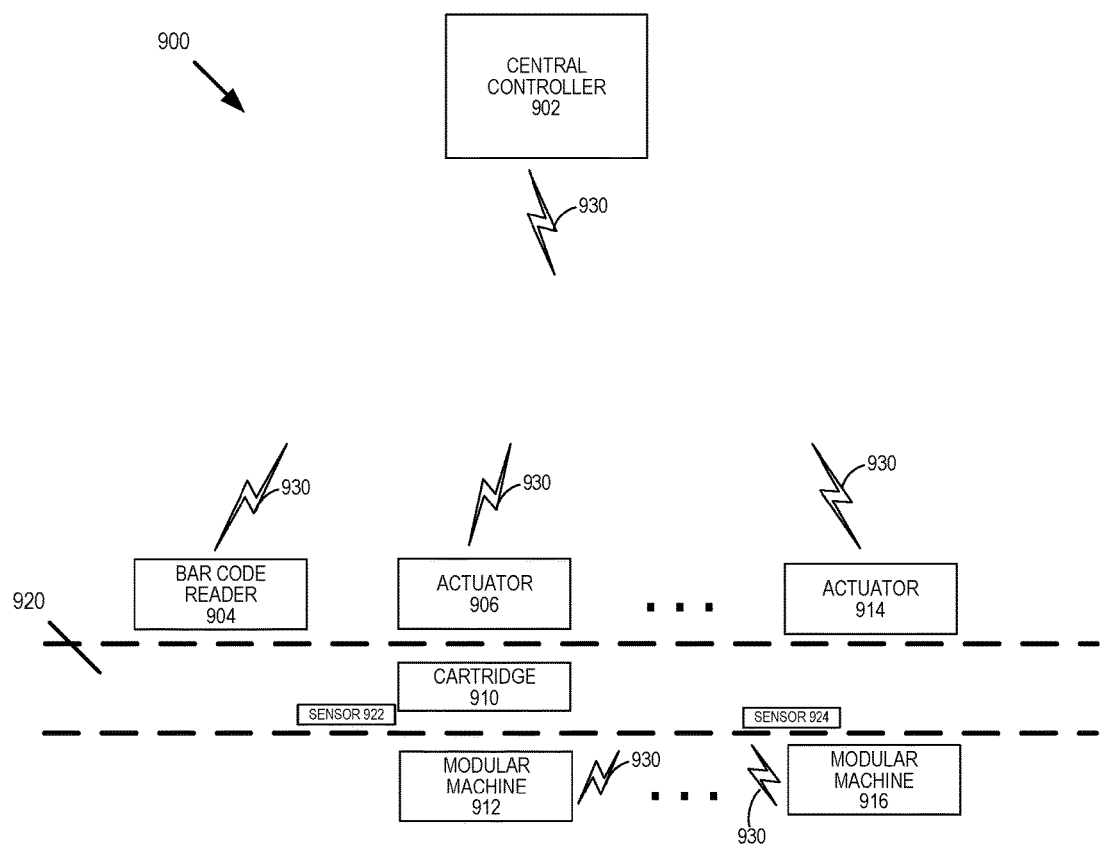
FIG. 9 illustrates a system level diagram of the central controller, the bar code reader, the actuator(s), the cartridge, and the modular machine(s).

As discussed above, the cartridge may interface with multiple machines, and potentially manipulated by the multiple machines. FIG. 9 illustrates the various machines that the cartridge interfaces with. Specifically, FIG. 9 illustrates a system level diagram 900 of the central controller 902, the bar code reader 904, the actuator(s) 906, 914, the cartridge 910, and the modular machine(s) 912, 916. The central controller 902 may be configured to control and/or communicate with various aspects of the system, such the bar code reader 904, the actuator(s) 906, 914, the cartridge 910 (via either the actuator(s) 906, 914 or via the modular machine(s) 912, 916), and the modular machine(s) 912, 916. The central controller 902 may communicate with the various devices using one or more communication methods, such as wired or wireless communication (e.g., Wi-Fi (such as 802.11, 802.17, 802.20, WiMax, 802.15.4), Bluetooth, etc.). As shown in FIG. 9, the central controller communicates via wireless communication 930.

In practice, cartridge 910 may move along conveyor 920 passing various machines, such as bar code reader 904, actuators 906, 914 and modular machines 912, 916. Conveyor 920 may be part of a pallet-based conveyor system or an indexed-based conveyor system. Bar code reader 904, as shown in FIG. 9, is positioned first along conveyor 920. Alternatively, bar code reader 904 may be placed in a different location along conveyor 920. Further, cartridge 910 may generically interface with several machines, such as bar code reader 904, actuators 906, 914 and modular machines 912, 916. In particular, cartridge 910 is designed so that linkage with the modular machines 912, 916 is minimal. For simplicity purposes, the modular machine 912, 916 may identify one or more aspects of cartridge 910, and proceed with processing. As discussed below, separate from the identifying aspects of the cartridge, the sequence in which the ends of the cable are inserted into the modular machine may determine whether the end is to the right or left part of the cartridge.

A specific modular machine 912, 916 may be configured to perform a specific operations, such as cutting & stripping, layer removal, a wire sorting, edge coating, soldering, and molding. Separate from a specific operation, the specific modular machine may perform different types of specific operations. In the example of a wire sorting modular machine, a first wire sorting operation may be for USB 2, and a second wire sorting operation may be for mini USB.

There are several ways in which to determine the specific operation that the modular machine(s) perform on the cable. In one implementation, all of the cables processed in the system are predetermined and non-changing (e.g., all cables have both ends as USB 2). In this implementation, each modular machine has a predetermined, pre-programmed, non-changing operation for the cable in each cartridge.

In another implementation, the cables processed in the system change (e.g., one cable has both ends as USB 2 and another cable has both ends as mini USB). In this implementation, the system may dynamically determine the protocol for the cable based on indicia on the cartridge (such as a bar code or RFID tag on the cartridge). In a first specific implementation, an indicia reader, an example of which is bar code reader 904, reads the indicia. The bar code reader transmits the read indicia to another device, such as central controller 902 (in order for central controller 902 to determine the protocol, as discussed below) or to each of modular machines 912, 916 (in order for the individual modular machines to determine which operation to perform).

In the implementation that the bar code reader 904 transmits the indicia to the central controller 902, responsive to receiving the read indicia, central controller 902 may determine the protocols for processing one or both ends of the cable. As one example, the read indicia may indicate that both ends of the cable are for the same type of cable (e.g., USB 2) and thus the same type of processing. As another example, the read indicia may indicate that the left end of the cable is for a first type of cable (e.g., USB 2) and the right end of the cable is for a second type of cable (e.g., mini USB). As such, the central controller 902 may determine different protocols for processing the different ends of the cable. Regardless, the central controller 902 may access a protocol (which may include an operation at one, some, or all of the stations in the system) for each end of the cable. Further, based on the accessed protocol, the central controller 902 may send commands to the modular machines 912, 916 in order to perform the designated operation at the stations designated in the protocol.

Alternatively, the modular machine(s) 912, 916 may dynamically determine the specific operation to perform on the cable (such as on the end of the cable held by left cable holder 102 and the end of the cable held by right cable holder 130). In a first specific implementation, the bar code reader 904 may transmit the read indicia to the modular machine(s) 912, 916, with the modular machines then determining the specific operation to perform on the cable. In a second specific implementation, the modular machine(s) 912, 916 itself may read an indicia on the cartridge, and determine the specific operation accordingly. Thus, the determination as to what operations the modular machines 912, 916 perform may be centralized (e.g., at the central controller 902) or de-centralized (e.g., at the modular machines 912, 916).

Cartridge 910 may move along conveyor 920, which may be configured as one or more stages or stations. For example, each modular machine/actuator combination may represent a single station. In one implementation, a sensor, such as sensor 922, 924 may indicate whether the cartridge 910 is at a particular station or stage of the conveyor 920. Specifically, sensor 922 is indicative that the cartridge 910 is at actuator 906/modular machine 912 station and sensor 924 is indicative that the cartridge 910 is at actuator 914/modular machine 916 station. Responsive to sensing the cartridge, sensor 922, 924 may send a signal to any one, any combination, or all of the actuator associated with the station, the modular machine associated with the station, and the central controller 902. For example, when sensor 922 senses cartridge 910, sensor may send a signal to actuator 906 and/or to modular machine 912. In this way, the sensor may be used in order to begin processing at the particular stage or station, such as discussed in further detail below.

In one implementation, at one, some, or all of the stations, the modular machine 912, 916 cooperates with the actuator 906, 914. In a pallet-based conveyor system, when the pallet reaches the station, a stopper is configured to stop the pallet that contains the cartridge. As one example, the stopper may initially be in stop position. When the pallet reaches the station, the pallet stops. After stopping, the actuator may bring the cable to the modular machine, the modular machine thereafter performs its designated function, and the actuator pulls the cable back, discussed in more detail below with regard to FIG. 15A. In this implementation, the connection between the line, the stopper and the modular machine are in master-slave type configuration.

In one implementation of the master-slave type configuration, the modular machine is designated as the master and is configured to control the operation, and the line stopper and the actuator are configured as slaves. In this implementation, the following occurs: the modular machine senses the stop of the pallet; thereafter, the modular machine activates the actuator for the specific action (e.g., movement of an arm of the cartridges, spooling of the end of the cable to the modular machine, longitudinal rotation, etc.); thereafter, the modular machine activates itself to perform its specific operation; after the modular machine performs the specific operation, the modular machine activates the actuator so that the actuator pulls the cable back to the line; and finally, the modular machine releases the stopper in order for the pallet to transition to the next station.

In another implementation, the line is designated as the master and is configured to control the operation, and the modular machine and the line stopper are configured as slaves. In this implementation, the following occurs: the line senses the stop of the pallet; thereafter, the modular machine activates the actuator for the specific action (e.g., movement of an arm of the cartridges, spooling of the end of the cable to the modular machine, longitudinal rotation, etc.); thereafter, the modular machine activates itself to perform its specific operation; thereafter, the modular machine activates the actuator so that the actuator pulls the cable back to the line; and finally, the line releases the stopper.

In either implementation, the protocol between the master and slave may be implemented in one of several ways. Specifically, in either implementation, a simple handshake protocol may be used between the line and the modular machine at the specific station. The master is configured to send an activation command to the slave. In response to receipt of the activation command, the slave acknowledges that it has received the activation command and, after completion of the command, sends back to the master a message for completion of the command.

Figure 10:
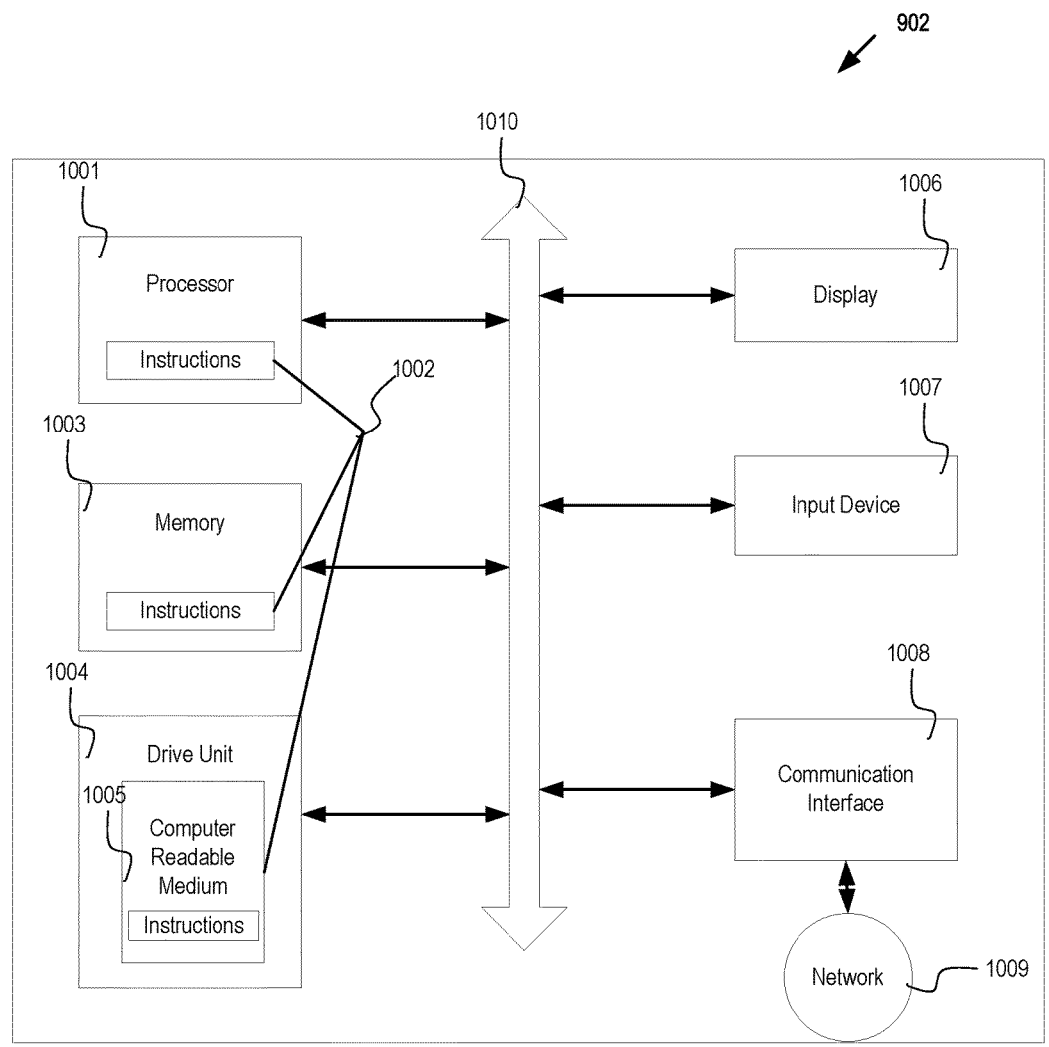
FIG. 10 illustrates a block diagram of the central controller.

FIG. 10 illustrates one example implementation of central controller 902. In one implementation, central controller 902 may comprises a computer system. For example, central controller 902 may include an ordered listing of a set of instructions 1002 that may be executed to cause the central controller 902 to perform any one or more of the methods or computer-based functions disclosed herein, such as to control the processing of assembly of the cable housed in cartridge 910. The central controller 902 may operate as a stand-alone device or may be connected, e.g., using the network 1009, to other computer systems or peripheral devices, such as to bar code reader 904, actuator(s) 906, 914, sensor(s) 922, 924, and modular machine(s) 912, 916.

In a networked deployment, the central controller 902 may operate in the capacity of a server or as a client-user computer in a server-client user network environment, or as a peer computer system in a peer-to-peer (or distributed) network environment. The central controller 902 may also be implemented as or incorporated into various devices, such as a personal computer or a mobile computing device capable of executing a set of instructions 1002 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions. As discussed herein, the instructions may be manifested in logic.

The central controller 902 may include a memory 1003 on a bus 1010 for communicating information. Code operable to cause the computer system to perform any of the acts or operations described herein may be stored in the memory 1003. The memory 1003 may be a random-access memory, read-only memory, programmable memory, hard disk drive or any other type of volatile or non-volatile memory or storage device.

The central controller 902 may include a processor 1001, such as a central processing unit (CPU) and/or a graphics processing unit (GPU), such as discussed above. The processor 1001 is one example of a controller (such as a digital controller) and may include one or more general processors, digital signal processors, application specific integrated circuits, field programmable gate arrays, digital circuits, optical circuits, analog circuits, combinations thereof, or other now known or later-developed devices for analyzing and processing data. The processor 1001 may implement the set of instructions 1002 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The central controller 902 may also include a disk or optical drive unit 1004. The disk drive unit 1004 may include a computer-readable medium 1005 in which one or more sets of instructions 1002, e.g., software, can be embedded. Further, the instructions 1002 may perform one or more of the operations as described herein. The instructions 1002 may reside completely, or at least partially, within the memory 1003 and/or within the processor 1001 during execution by the central controller 902. Accordingly, the databases may be stored in the memory 1003 and/or the disk unit 1004.

The memory 1003 and the processor 1001 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the central controller 902 may include an input device 1007, such as a keyboard or mouse, configured for a user to interact with any of the components of central controller 902. In this way, an operator may control the processing of the cable in the cartridge 910. It may further include a display 1006, such as a liquid crystal display (LCD), a cathode ray tube (CRT), or any other display suitable for conveying information. The display may act as an interface for the user to see the functioning of the processor 1001, or specifically as an interface with the software stored in the memory 1003 or the drive unit 1004. As discussed above, the customer-controlled device may include a display and an input device, such as input device 1007.

The central controller 902 may include a communication interface 1008 that enables communications via the communications network 1009. The network 1009 may include wired networks, wireless networks, or combinations thereof. The communication interface 1008 network may enable communications via any number of communication standards, such as 802.11, 802.17, 802.20, WiMAX, 802.15.4, cellular telephone standards, or other communication standards, as discussed above. Merely because one of these standards is listed does not mean any one is preferred as any number of these standards may never actually be adopted in a commercial product.

Block diagrams of different aspects of the system may be implemented using the computer functionality disclosed in FIGS. 14-17 and the control of the cartridge as discussed above with regard to FIGS. 1-8. Further, the flow diagrams may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 11:
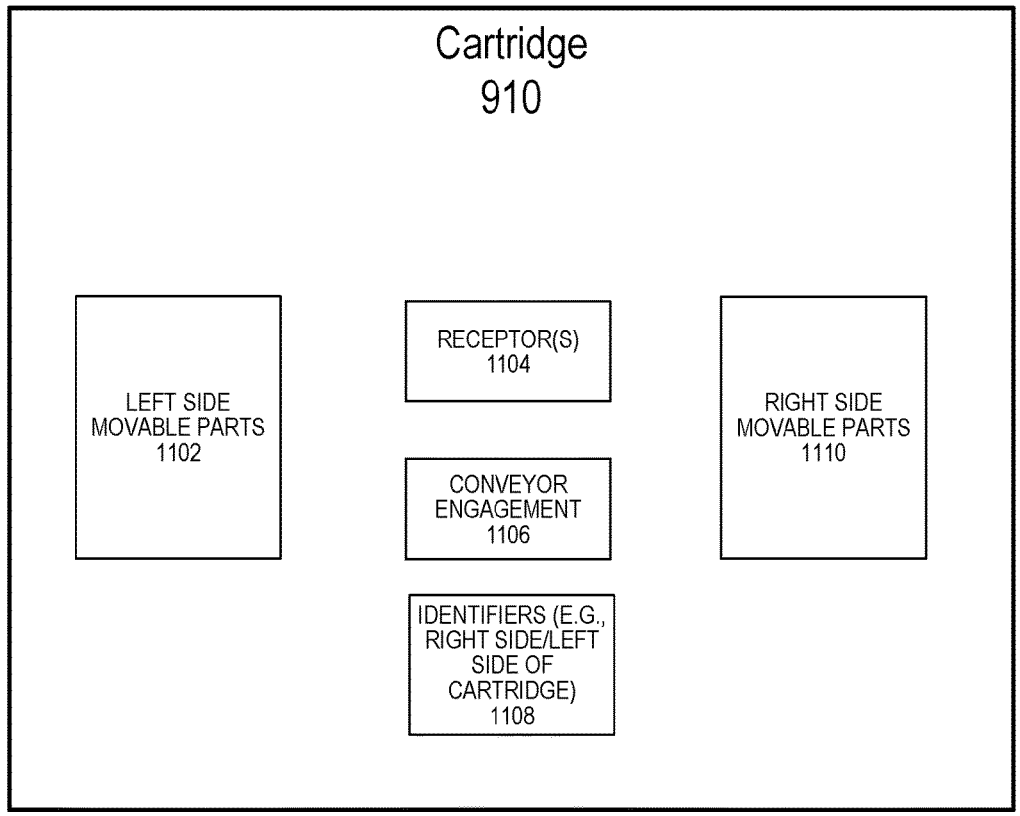
FIG. 11 illustrates a block diagram of the cartridge.

FIG. 11 illustrates a block diagram of the cartridge 910. As discussed above, the cartridge may include multiple parts, such as a left part (e.g., a left arm configured to hold one end of the cable) and a right part (e.g., a right arm configured to hold another end of the cable). In this regards, cartridge 910 may include left side movable parts 1102 and right side movable parts 1110. In one implementation, left side movable parts 1102 and right side movable parts 1110 are configured to perform one or both of the following: (i) hold one end of the cable; and (ii) move the end of the cable in one or more directions. As discussed above, various structures may hold an end of the cable, such as rollers 110, 140 and pincers 112, 142. Further various structures may move the end of the cable in various directions, such as longitudinally, rotationally, etc. In addition, cartridge 910 may include one or more receptor(s) 1104 configured to interface or receive a force applied (e.g., an external force applied by an actuator or a modular machine). As one example, the grip 106,136 may be configured to receive a force, thereby sliding left cable holder movable portion 107 and right cable holder movable portion 137, respectively. Alternatively, an external force may be applied directly to the cable, such as by using tool 602 on cable 101, as illustrated in FIGS. 6A-C.

Cartridge 910 may further include conveyor engagement 1106. As discussed above, cartridge 910 may move along a conveyor, such as conveyor 920. Cartridge 910 may connector or engage with the conveyor via conveyor engagement 1106. As discussed above, conveyor engagement 1106 may be via one or more connection points.

Cartridge 910 may further include one or more identifiers 1108. The identifier may comprise a passive identifier (which does not generate a signal) or an active identifier (which does generate a signal). In one implementation, the passive identifier may comprise a barcode or other type of optical machine-readable representation of data. The bar code may comprise a one-dimensional bar code. Alternatively, the bar code may comprise a data matrix code, which is a two-dimensional bar code. In practice, a machine, such bar code reader 904, may shine a light on the passive identifier in order to read the passive identifier. In an alternate implementation, the active identifier may comprise a radio-frequency identification (RFID) tag or other device that uses electromagnetic fields to automatically identify and track objects. In this regard, in the event that cartridge 910 uses RFID tags, an RFID reader may be used instead of bar code reader 904.

Figure 12:
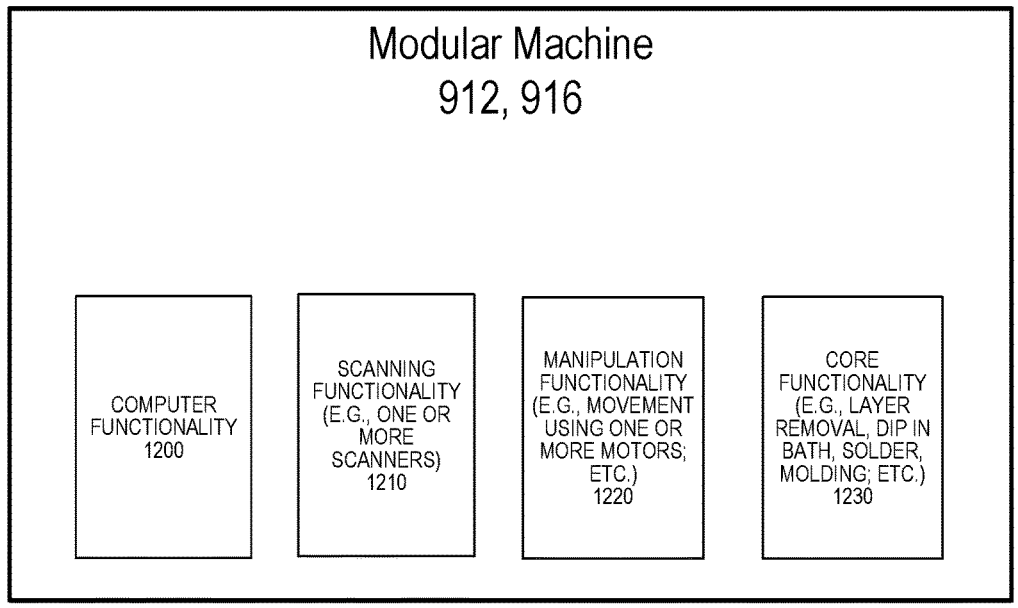
FIG. 12 illustrates a block diagram of the modular machine.

FIG. 12 illustrates a block diagram of the modular machine 912, 916. Modular machine 912, 916 may perform one or more operations, with the operations divided amongst different machines. In this instance, the system include multiple modular machines, with one, some, or all of the multiple modular machines comprising different types of machines. Types of machines include, but are not limited to: a pre-feeding machine; a cut & strip machine; a cable coiler machine; a layer remove machine; a wire sort machine; a tin bath machine; a wire solder machine; and a molding machine. The above-list are merely examples. Other types of machines are contemplated. Further, any combination of types of machines are contemplated.

In this regard, the modular machines 912, 916 perform various operations, such as pre-feeding, cutting/stripping, cable coiling, layer removal, wire sorting, edge coating, soldering, and molding. The system may perform any combination or all of these operations in any conceivable order using a cartridge moving from station to station. Optionally, mechanical assembly of the connector may be performed using the same cartridge that moves from station to station to perform the listed operations. Alternatively, the cable can be processed in a first type of cartridge to perform any combination of pre-feeding, cutting/stripping, cable coiling, layer removal, wire sorting, edge coating, soldering, and molding. Thereafter, the cable may be removed from the first type of cartridge and inserted into a second type of cartridge in order to perform the mechanical assembly of the connector.

The layer remove machine is configured to remove one or more layers of the cable. For example, the layer remove machine may be configured to remove any one, any combination, or all of the following: cable PVC; foil; and cellophane layers. For example, the layer remove machine may be configured for a multi-layer process in a single operation. Further, the layer remove machine may include one or more machine-vision devices (such as a scanner in order to control the cut accuracy and the damage detection) and one or more cutting devices (such as a laser for precise cutting). The layer remove machine may be used in an assembly line (such as depicted in FIG. 9) or as a stand-alone solution.

The wire sort machine is configured to sort one or more wires of the cable. For example, the wire sort machine may be configured for automatic sorting of internal cable wires in preparation for placement on the connector pads or pins for subsequent processing at other machines along the assembly line. As part of the sorting, the wire sort machine may use one or more machine-vision devices (such as a scanner) to identify the wires of the cable, which may be, prior to scanning, in an indeterminate or random order. Further, the wire sort machine may use one or more grippers in order to grab and move the one or more wires onto the wire holder. In this way, the wire sort machine may place one or more of the wires on the wire holder, such as a comb depicted in FIGS. 7A-C. In one implementation, the wire sort machine may include an automatic exchangeable head for handling different processes, such as sorting, filler cutting, opening of twisted pairs and wire stripping.

In one implementation, the wire sort machine may include any one, any combination, or all of the following: mechanic stripper; mechanic cutter; thermal stripper; pick and place device; and unraveling pairs device. In operating as a mechanic stripper, a mechanic cutter, or a thermal stripper, the wire sort machine may include a trash funnel. In operating as a mechanic stripper or a mechanic cutter, the wire sort machine may include functionality to dispense pressurized air (with an air pressure entrance). In operating as a thermal stripper, the wire sort machine may use a vacuum system (with a vacuum entrance). Finally, in operating as a pick and place device, the wire sort machine may include a feeder (with a feeder entrance).

The wire solder machine is configured to solder one or more wires of the cable. In particular, the wire solder machine may be configured to automatically perform wire to pad soldering. The wire solder machine may be configured to accept tin pre-coated wires and pads. In one implementation, the wire solder machine may include a machine-vision device (such as a scanner) in order to measure the accuracy and success of the soldering process. Further, the wire solder machine may be used in an assembly line (such as depicted in FIG. 9) or as a stand-alone solution.

Modular machine 912, 916 may include computer functionality 1200. As discussed above, central controller 902 may include computer functionality as discussed with reference to FIG. 10. Similarly, modular machine 912, 916 may include the various computer functionality, embodied as computer functionality 1200, as discussed with reference to FIG. 10. For example, modular machine 912, 916 may include a controller (e.g., a processor) that is configured to perform and/or control the various functionality ascribed to the modular machine 912, 916. Modular machine 912, 916 may further include scanning functionality 1210. Scanning functionality 1210 may comprise one or more scanning device and obtain information in one or both of the following: (1) information regarding the cartridge (e.g., such as embodied in a bar code or an RFID tag); and (2) information regarding the cable (e.g., such as the position of one or more wires in the cable). As one example, modular machine 912, 916 may scan an identifier, such as a bar code, in order to obtain information regarding the cartridge 910. Alternatively, in the instance of an active identifier, such as an RFID tag, modular machine 912, 916 may include an RFID reader in order to read the information from the RFID tag. As another example, modular machine 912, 916 may scan part of the cable, such as end 116, 146 in order to determine the orientation of the wires (such as the positioning of various colors of wires). Based on the determined orientation, the modular machine 912, 916 may send a command to modify the orientation of the wires, as discussed further below. Thus, in one implementation, scanning functionality 1210 may comprise a camera and associated circuitry to analyze the image generated by the camera to determine location of wires, etc.

Modular machine 912, 916 may further include manipulation functionality 1220. As discussed above, various aspects of the cartridge may be manipulated via an external force or an external device. In one implementation, one or more actuators 906, 914 may apply the external force, as discussed further below. As one example, the actuator(s) 906, 914 may include a piston (or the like) that applies a force to move the grip 106, 136. As another example, the actuator(s) 906, 914 may apply a force (such as via a piston) to lever 108, 138 in order to release rollers 110, 140. As still another example, the actuator(s) 906, 914 may include motorized roller 402 that applies a force to one or more of rollers 110, 140 in order to retract or extend an end 116, 146 of cable 101. As yet another example, the actuator(s) 906, 914 may include tool 602 that applies a force to a part of cable 101 in order to rotate an end. As another example, the actuator(s) 906, 914 may include a piston (or the like) that applies a force to an underside of base 120 in order to tilt cartridge 910 along an axis of rotation, such as illustrated in FIG. 5A.

In an alternative implementation, one or more modular machines 912, 916 may apply the external force to manipulate various aspects of the cartridge. In this alternative implementation, the modular machine(s) 912, 916 may be configured to perform any one, any combination, or all of the following: include a piston to apply a force to lever 108, 138 in order to release rollers 110, 140; include motorized roller 402 that applies a force to one or more of rollers 110, 140 in order to retract or extend an end 116, 146 of cable 101; include tool 602 that applies a force to a part of cable 101 in order to rotate an end; and include a piston (or the like) that applies a force to an underside of base 120 in order to tilt cartridge 910 along an axis of rotation, such as illustrated in FIG. 5A. In still an alternate implementation, both the actuator(s) 906, 914 and the modular machines 912, 916 may apply the external force to the cartridge 910 such as discussed herein.

Modular machine 912, 916 may further include core functionality 1230. As discussed above, the modular machine may perform one or more functions, such as layer removal, applying tin or other fluid, wire solder, molding or the like. In this regard, core functionality 1230 comprises the function(s) to be performed by the modular machine 912, 916, such as layer removal, dipping the end(s) of the cable in a bath, soldering, and molding.

Figure 13:
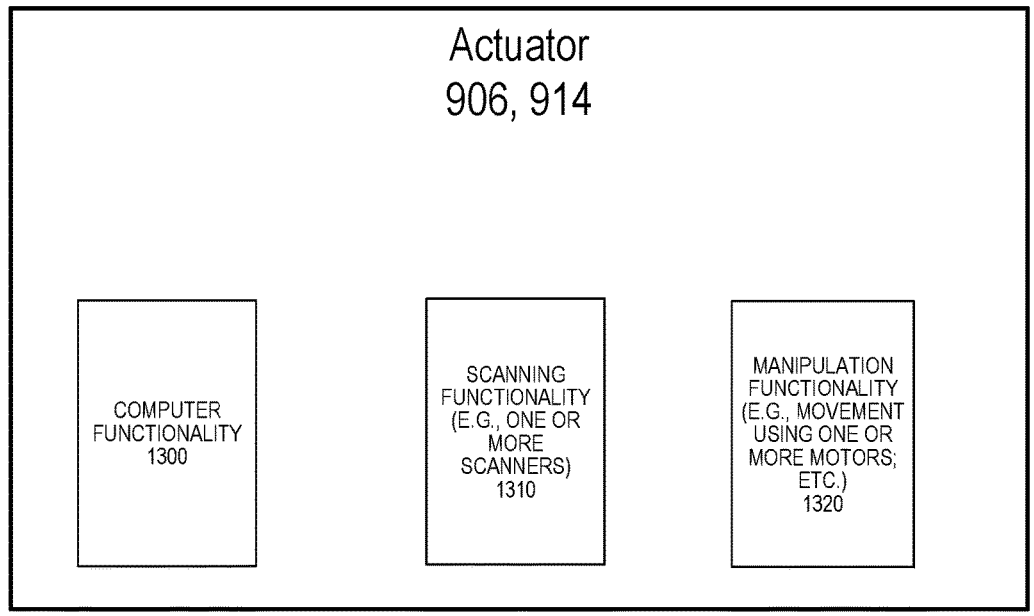
FIG. 13 illustrates a block diagram of the actuator.

FIG. 13 illustrates a block diagram of actuator 906, 914. Actuator 906, 914 may include computer functionality 1300. As discussed above, central controller 902 may include computer functionality as discussed with reference to FIG. 10. Similarly, actuator 906, 914 may include the various computer functionality, embodied as computer functionality 1300, as discussed with reference to FIG. 10. Actuator 906, 914 may further include scanning functionality 1310. Similar to scanning functionality 1210, scanning functionality 1310 may obtain information in one or both of the following: (1) information regarding the cartridge (e.g., such as embodied in a bar code or an RFID tag); and (2) information regarding the cable (e.g., such as the position of one or more wires in the cable). Finally, actuator 906, 914 may further include manipulation functionality 1320. As discussed above, actuator 906, 914 may be configured to perform any one, any combination, or all of the following: include a piston to apply a force to lever 108, 138 in order to release rollers 110, 140; include motorized roller 402 that applies a force to one or more of rollers 110, 140 in order to retract or extend an end 116, 146 of cable 101; include tool 602 that applies a force to a part of cable 101 in order to rotate an end; and include a piston (or the like) that applies a force to an underside of base 120 in order to tilt cartridge 910 along an axis of rotation, such as illustrated in FIG. 5A.

FIG. 9 illustrates separate elements of the actuator 906, 914 and the modular machine 912, 916. In this way, the functions performed by the actuator 906, 914 may be in a machine that is separate from the machine that performs the functions for modular machine 912, 916. In an alternate implementation, the functions of the actuator may be included in the modular machine. For example, various functions of the actuator, such as moving various aspects of the cartridge or the edge of the cable held by the cartridge, may be performed within a single machine that also performs the functions for the modular machine.

Figure 14:
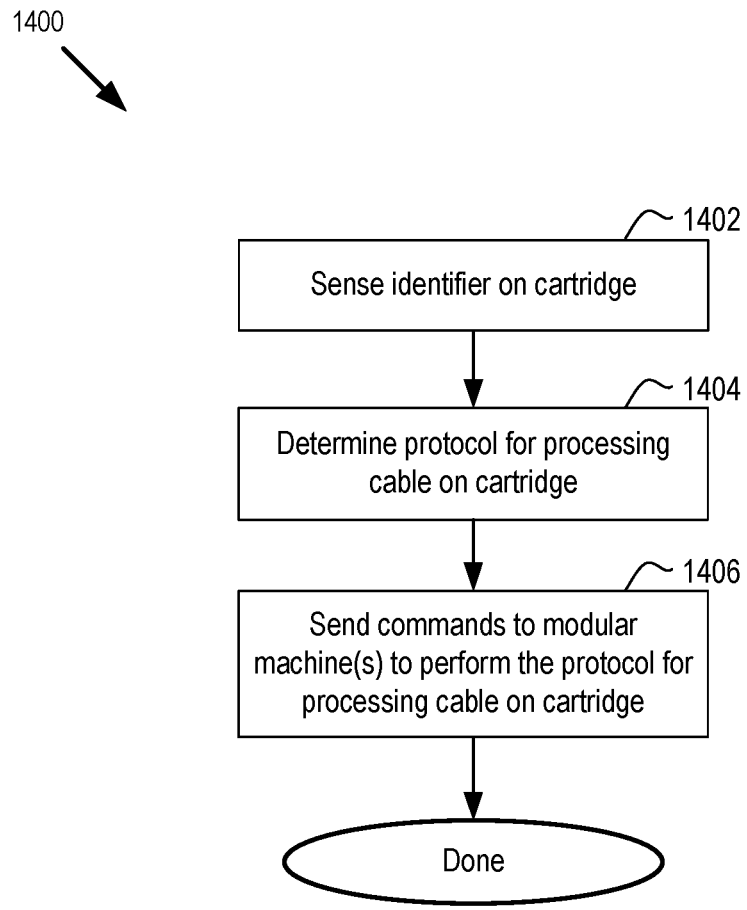
FIG. 14 is a flow chart for sensing an identifier (e.g., a barcode or RFID) on the cartridge and the processing of the cable on the cartridge based on the sensed identifier.

FIG. 14 is a flow chart 1400 for sensing an identifier (e.g., a barcode or RFID) on the cartridge and the processing of the cable on the cartridge based on the sensed identifier. At 1402, the identifier is sensed on the cartridge. For example, bar code reader 904 may sense a bar code on the cartridge. After which, the sensed bar code may be transmitted to another device, such as central controller 902. At 1404, the protocol for processing the cable on the cartridge is determined. For example, responsive to receipt of the bar code, the central controller 902 may determine the protocol for processing the cable on the cartridge. The protocol may comprise commands for one or more of the modular machines 912, 916. At 1406, the commands are send to the modular machine(s) in order to perform the protocol for processing the cable on the cartridge. For example, the central controller 902 may send a first command to modular machine 912 in order for the modular machine 912 to perform an operation on the cable. Alternatively, or in addition, the central controller 902 may send a second command to actuator 906 in order for the actuator 906 to perform an operation on the cable or on a part of the cartridge (such as moving an arm of the cartridge in order to move the cable toward the modular machine).

Figure 15A:
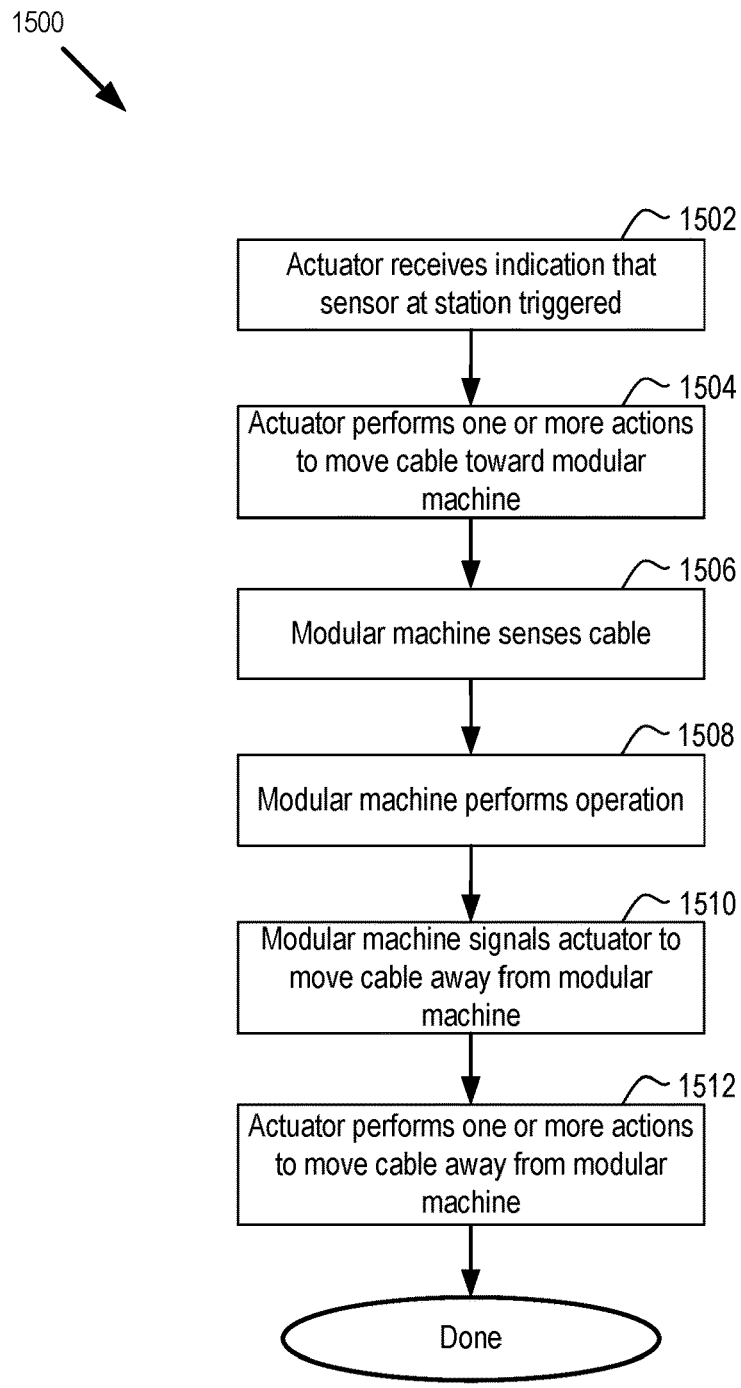
FIG. 15A is a first flow chart for the interaction between the actuator and the modular machine when the sensor indicates that the cartridge is at the station for processing.

As discussed above, sensor 922, 924 may indicate that the cartridge is at a particular stage or a particular station of the conveyor. This indication may trigger the processing at the particular stage or the particular station. In a first implementation, the actuator receives the output from sensor 922, 924, and thereafter begins the processing. An example of the first implementation is illustrated in FIG. 15A, which is a first flow chart 1500 for the interaction between the actuator and the modular machine when the sensor indicates that the cartridge is at the station for processing. For example, at 1502, the actuator receives the indication that the sensor at the station was triggered. At 1504, the actuator performs one or more actions to move the cable toward the modular machine. As discussed above, the actuator may move an arm of the cartridge, such as left cable holder 102 or right cable holder 130, toward the modular machine. In this way, the end of the cable, held by the arm of the cartridge, moves toward the modular machine. As another example, the actuator may move the end of the cable toward the modular machine by spooling the end toward the modular machine (such as by releasing pincers 112 and spooling rollers 110 to move end 116 toward the modular machine).

At 1506, the modular machine may sense the cable. As one example, the modular machine may include a sensor, such as a sensor positioned at an opening or in an interior of the modular machine, that detects a part of the cable proximate to the sensor. At 1508, the modular machine may perform an operation. As discussed above, the modular machine may perform a variety of operations, such as stripping an outer layer, sensing wire positioning, placing wires on a comb, soldering, molding, or the like. At 1510, after completing the performing of the operation, the modular machine signals the actuator to move the cable away from the modular machine. Responsive to the signal sent from the modular machine, at 1512, the actuator performs one or more actions to move the cable away from the modular machine. For example, the modular machine may command the actuator to move the arm of the cartridge, such as left cable holder 102 or right cable holder 130, away the modular machine. As another example, the modular machine may command the actuator to spooling the end of the cable away the modular machine.

Figure 15B:
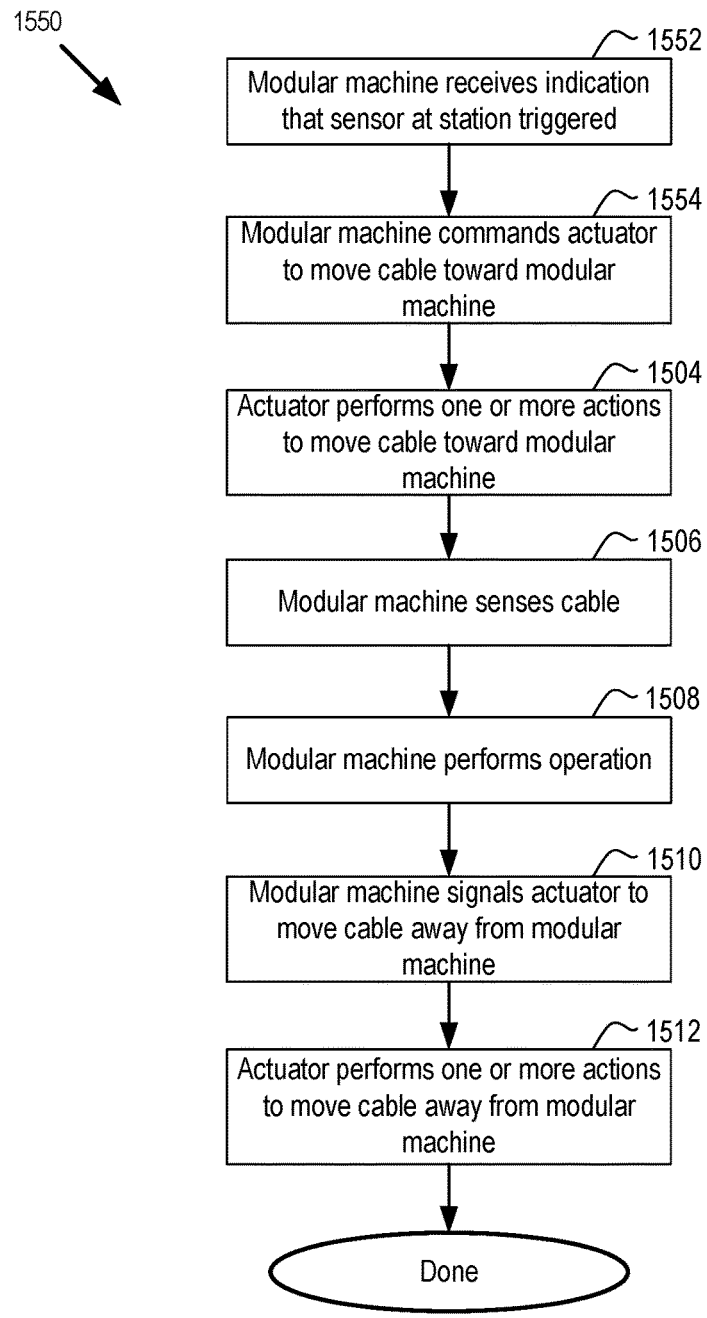
FIG. 15B is a second flow chart for the interaction between the actuator and the modular machine when the sensor indicates that the cartridge is at the station for processing.

In a second implementation, the modular machine receives the output from sensor 922, 924, and thereafter begins the processing. An example of the second implementation is illustrated in FIG. 15B, which is a second flow chart 1550 for the interaction between the actuator and the modular machine when the sensor (indicating the cartridge is at the station for processing). At 1552, the modular machine receives the indication that the sensor at the station was triggered. At 1554, the modular machine commands the actuator to move the cable toward the machine. In response to the command, at 1556, the actuator performs one or more actions to move the cable toward the modular machine (e.g., moving an arm of the cartridge towards the modular machine or spooling the cable toward the modular machine).

Similar to FIG. 15A, at 1506, the modular machine may sense the cable, at 1508, the modular machine performs the operation, at 1510, after completing the performing of the operation, the modular machine signals the actuator to move the cable away from the modular machine, and at 1512, the actuator performs one or more actions to move the cable away from the modular machine.

Figure 16A:
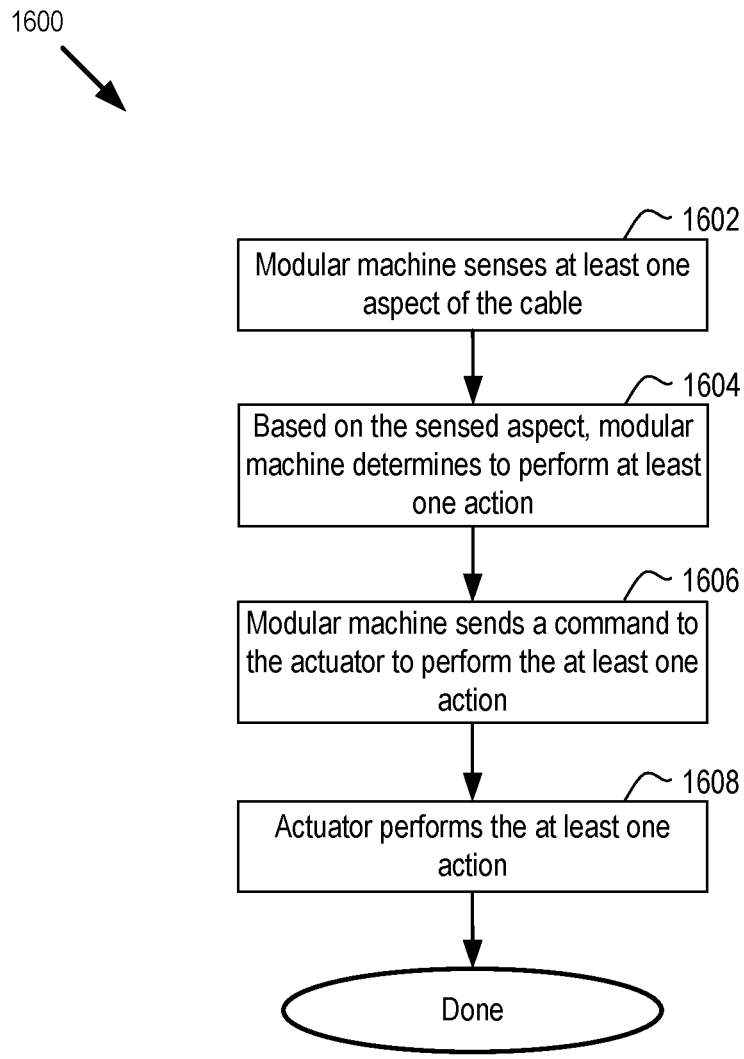
FIG. 16A is a first flow chart for the modular machine to sense an aspect of the cable and command the actuator to accordingly perform an action.

FIG. 16A is a first flow chart 1600 for the modular machine to sense an aspect of the cable and command the actuator to accordingly perform an action. At 1602, the modular machine senses at least one aspect of the cable. The aspect may comprise the placement of the wires in the cable, such as discussed below with regard to FIG. 16B. At 1604, the modular machine may determine at least one action to perform based on the sensed aspect of the cable. The action may comprise commanding the actuator to move the cable in a predetermined manner. At 1606, the modular machine sends a command to the actuator to perform the at least one action. At 1608, responsive to receipt of the command, the actuator performs the at least one action.

As discussed above, a part of the cable, such as the wires for an end of the cable, may be in a certain position in the cartridge. The wires may have one or more identifiers. As one example, the wires may be identified based on color (e.g., the insulator for one wire is red, the insulator for one wire is yellow, the insulator for one wire is white, the insulator for one wire is green, etc.). As another example, the wires may be identified based on alphanumeric markings associated with the wire (e.g., the wire has a particular number or a particular letter combination). Further, a part of the cable, such as the wire locations, may be random or in unknown locations. The modular machine may use scanning functionality 1210 (e.g., one or more cameras) in order to analyze the position of one wire, some wires, or all wires at the end of the cable. For example, the scanning functionality 1210 may use an algorithm in combination with one or more color filters in order to identify the colors of the wires in the scan and in turn determine the position of one, some or all of the wires at the end of the cable. As another example, the scanning functionality 1210 may use optical character recognition (OCR) in order to identify the numbers or letters of the wires in the scan and in turn to determine the position of one, some or all of the wires at the end of the cable.

Regardless of the device that makes the determination to perform the rotation movement, the determination may be make in one of several ways. In one way, the device (e.g., the modular machine 912, 916 and/or the central controller 902) may compare the position of one, some or all of the wires at the end of the cable with a predetermined (or desired) position of one, some or all of the wires at the end of the cable. The position of one, some or all of the wires at the end of the cable may be determined as discussed above. The predetermined (or desired) position of one, some or all of the wires at the end of the cable may be determined by accessing a predetermined configuration of at least a part of the cable (e.g., accessing the predetermined configuration in a memory of modular machine). In one implementation, the pre-determined configuration may comprise a pre-determined location of one wire, a plurality of wires, or all of the wires within the cable.

In a first specific implementation, the cable includes 4 wires with one of the wires being a certain color (e.g., one wire has an insulator that is the color red). In this first specific implementation, the predetermined configuration is that the wire of a certain color is at a predetermined location (e.g., 12:00 or pointing straight upward). The device (e.g., the modular machine) may compare the position of the wire of a certain color with the predetermined position and determine whether or not (and optionally how much) to rotate the end of the cable. For example, the modular machine may determine that the red color wire is at 9:00 (pointing to the left). The modular machine may further compare the determined position of the red color wire at 9:00 with the predetermined position of the red color wire at 12:00 to determine to rotate the cable end by 90° clockwise (or to rotate the cable end by 270° counterclockwise).

In a second specific implementation, the cable includes 8 wires with one of the wires having a certain marking (e.g., one wire has an indicator that it is #2 wire). In this second specific implementation, the predetermined configuration is that the wire having a certain marking is at a predetermined location (e.g., 6:00 or pointing straight downward). It is also known that when the wire with the certain marking is in the predetermined location, other wires in the cable will generally be in another predetermined location. The device (e.g., the modular machine) may compare the position of the wire with the certain marking with the predetermined position and determine whether or not (and optionally how much) to rotate the end of the cable. For example, the modular machine may determine that the wire with the #2 marking is at 12:00 (pointing upward). The modular machine may further compare the determined position of the wire with the #2 at 12:00 with the predetermined position of the wire with the #2 at 6:00 to determine to rotate the cable end by 180°

(either clockwise or counterclockwise). In this way, the wires may be moved so that they are closer to the predetermined position (as opposed to the position without rotation).

The predetermined position may be selected so that an operation performed by the modular machine may be more easily performed. As one example, the predetermined position in a two wire cable (e.g., one yellow wire and one white wire) is for the yellow wire to be positioned on the right and the white wire to be positioned on the left. This is due to the modular machine being tasked with placing the yellow wire on the right in comb and placing the white wire on the left in comb. The modular machine may determine that the actual positions of the wires is that the yellow wire is on the left and the white wire is on the right. Faced with these actual positions and faced with the desired positions, the modular machine may in one implementation rotate the cable so that the yellow wire is on the right and the white wire is positioned on the left, thereby making it easier to place the respective wires on the comb (e.g., yellow wire on the right side of the comb and white wire on the left side of the comb).

Figure 16B:
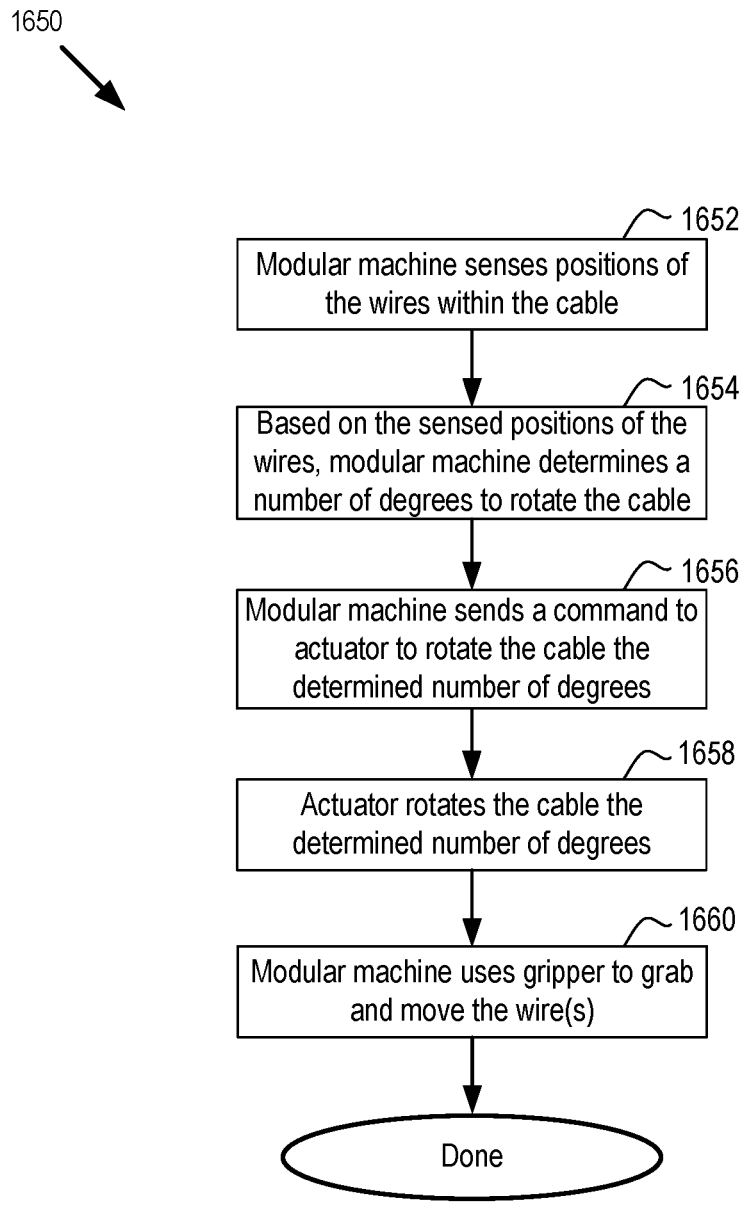
FIG. 16B is a second flow chart for the modular machine to sense positions of the wires in the cable and to command the actuator to rotate the cable a predetermined number of degrees.

FIG. 16B is a second flow chart 1650 for the modular machine to sense positions of the wires in the cable and to command the actuator to rotate the cable a predetermined number of degrees. At 1652, the modular machine senses the position(s) of one or more wires within the cable. The determination to perform the rotation movement may be made one of several different devices within the system. In one implementation, the modular machine (such a modular machine 912, 916) may make the determination whether to perform the rotation movement and may command the rotation movement of another device (such as actuator 906, 914). In another implementation, a central controlling device (such as central controller 902) may make the determination whether to perform the rotation movement and may command the rotation movement of another device (such as actuator 906, 914).

At 1654, based on the sensed positions, the modular machine determines the number of degrees to rotate the cable. As one example, the modular machine may determine to rotate the cable a predetermined amount, such as 45° or 90°. At 1656, the modular machine sends a command to the actuator to rotate the cable the determined number of degrees. At 1658, responsive to receiving the command, the actuator rotates the cable the determined number of degrees. For example, actuator may use tool 602 to rotate the end 116 of cable 101 the determined number of degrees. After which, at 1660, the modular machine may use a gripper to move the wire(s) of the cable. In this regard, rather than the modular machine itself rotating the wires, the modular machine commands another machine (e.g., the actuator) in order to move the wires in preparation for gripping the wires to move the wires (such as to place the wires onto comb 114).

In practice, the wires may be rotated one or more times during the electrical connection operations. For example, the modular machine may command rotation of the wires prior to the modular machine grips the wires, as illustrated in FIG. 16B. Thus, the modular machine may initially scan or sense the location of the wires (such as sensing the colors of the wires). Based on the sensed location of the wires, the modular machine may send a command to rotate. In one implementation, the command to rotate comprises a direction of rotation (e.g., indicative of clockwise or counterclockwise) and an amount indicative of a number of degrees to rotate. In one implementation, the rotational functionality described in FIGS. 6A-C and 16 may be used in combination with the arm movement functionality described in FIGS. 3A-D or the cable movement functionality described in FIGS. 4A-B. In an alternate implementation, the system includes the arm movement functionality described in FIGS. 3A-D or the cable movement functionality described in FIGS. 4A-B without the rotational functionality described in FIGS. 6A-C and 16. In still an alternate implementation, the system includes the rotational functionality described in FIGS. 6A-C and 16 without the arm movement functionality described in FIGS. 3A-D or the cable movement functionality described in FIGS. 4A-B.

Figure 17:
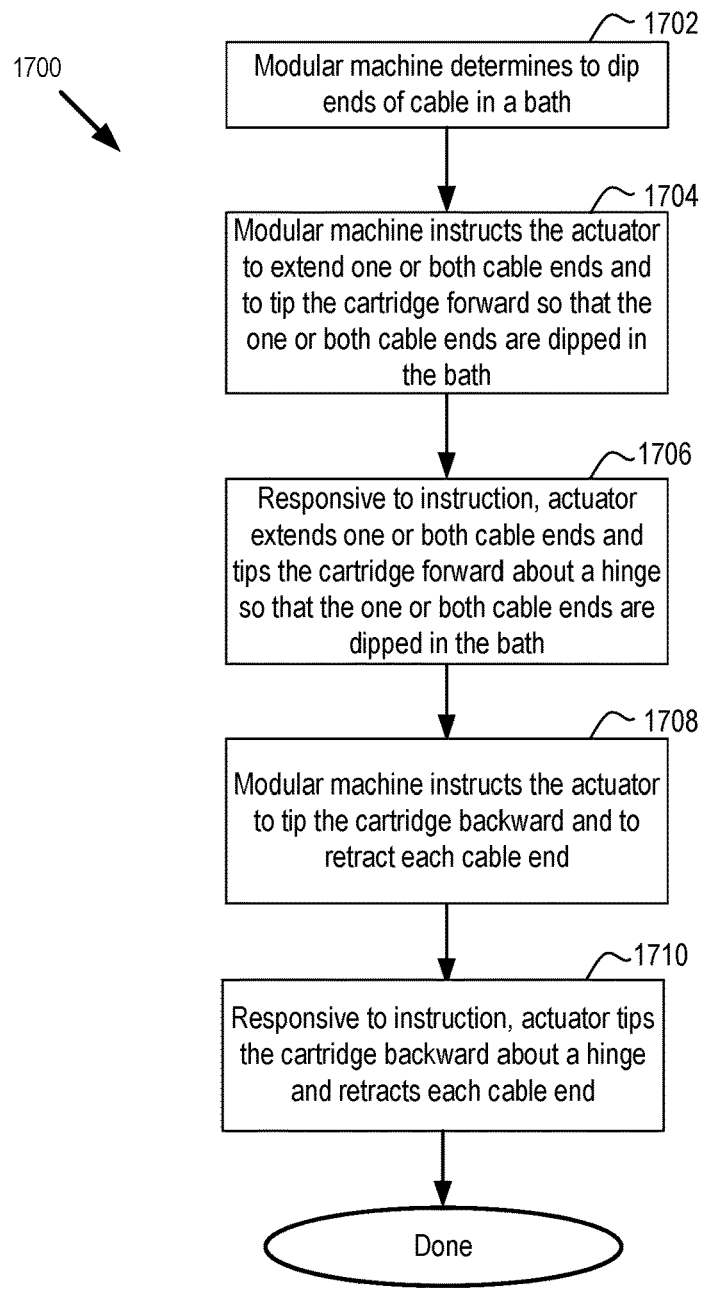
FIG. 17 is a flow chart for the modular machine to command the actuator to move the cartridge about a hinge in order to dip the ends of the cable into a bath.

FIG. 17 is a flow chart 1700 for the modular machine to command the actuator to move the cartridge about a hinge in order to dip the ends of the cable into a bath. At 1702, the modular machine determines to dip one or both ends of the cable in the bath. At 1704, the modular machine instructs the actuator to extend one or both of the cable ends and to tip the cartridge forward so that the cable end(s) are dipped in the bath. At 1706, responsive to the instruction, the actuator extends one or both of the cable ends and tips the cartridge forward so that the cable end(s) are dipped in the bath. At 1708, the modular machine instructions the actuator to tip the cartridge backward and to retract one or both of the cable ends. At 1710, responsive to the instruction, the actuator tips the cartridge backward and to retracts one or both of the cable ends.

As discussed above, one or more indicia may be resident on the cartridge. As one example, a first indicia (such as a bar code or RFID tag) on the cartridge may be read in order to determine the protocol for processing the cable, including the designated operations at the stations designated in the protocol. The protocols may determine the designated operations for one or both ends of the cable. As discussed above, one end 146 of the cable 101 may be held in right cable holder 130, and another end 116 of the cable 101 may be held in left cable holder 102. The modular machine may determine whether the one end 146 (held in right cable holder 130) or the another end 116 (held in left cable holder 102) is inserted into the modular machine in one of several ways. As shown in FIG. 9, the cartridge 910 may travel along conveyor 920, and may be in various stations or stages. At a respective station, the cartridge 910 may initially be positioned (either by the conveyor 920 or by actuator 906) so that right cable holder 130 is positioned in line with or in front of an entrance to modular machine 912. After the right cable holder 130 is positioned in line with or in front of an entrance to modular machine 912, actuator 906 may move end 146 into the entrance of modular machine 912 (such as by spooling end 146 into entrance of the modular machine and/or by moving right cable holder movable portion 137 (which holds end 146) toward the entrance of the modular machine so that the end is inserted into the entrance of the modular machine). After modular machine completes its operation on end 146, modular machine may send an indication to actuator of completion of its operation on end 146.

In response to the modular machine's sending the indication of completion of its operation on end 146, actuator may move cartridge so that left cable holder 102 is positioned in line with or in front of an entrance to modular machine 912. After the left cable holder 102 is positioned in line with or in front of an entrance to modular machine 912, actuator 906 may move end 116 into the entrance of modular machine 912 (such as by spooling end 116 into entrance of the modular machine and/or by moving left cable holder movable portion 107 (which holds end 116) toward the entrance of the modular machine so that the end is inserted into the entrance of the modular machine). After modular machine completes its operation on end 116, modular machine may send an indication to actuator of completion of its operation on end 116. In response to the modular machine's sending the indication of completion of its operation on end 146, actuator may send cartridge to the next station.

Figure 18:
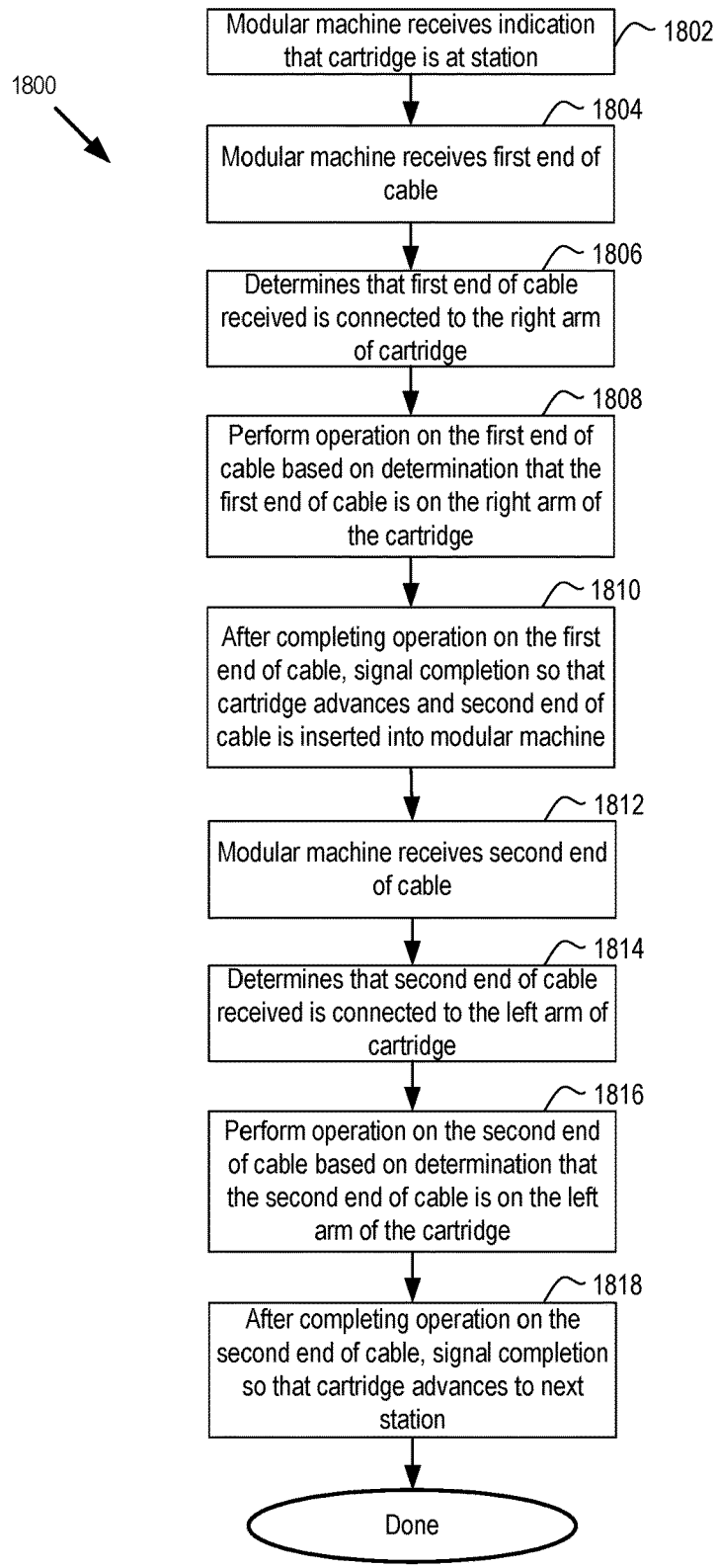
FIG. 18 is a flow chart for the modular machine to determine whether the cable end is from the right or left side of the cartridge.

Thus, because the actuator follows a predetermined sequence of first inserting the right end (end 146) into modular machine, and after completion of operation on the right end, thereafter inserting the left end (end 116) into the modular machine, modular machine may determine which end is being inserted therein. FIG. 18 is a flow chart 1800 of one example for the modular machine to determine whether the cable end is from the right or left side of the cartridge. At 1802, the modular machine receives an indication that the cartridge is at the station. As discussed above, the modular machine may determine whether the cartridge is at the station in one of several ways, such as by being notified of sensor 922, 924 (e.g., see FIG. 15A). Alternatively, modular machine may determine whether the cartridge is at the station by sensing a part of the cable being inserted into the modular machine (e.g., see FIG. 15B). In this implementation, step 1802 is not present. Regardless, at 1804, the modular machine receives a first end of the cable. As discussed above, in one implementation, the actuator positions the cartridge at the station so that the first end of the cable inserted into the modular machine is held by right cable holder 130. In this regard, the modular machine is pre-programmed so that after the cartridge is initially positioned at the station, the first cable inserted is connected to the right arm of the cartridge. Given this, at 1806, responsive to receiving the first end of the cable, the modular machine determines that the first end of the cable (which was received at 1804) is connected to the right arm of the cartridge. At 1808, the modular machine performs the operation on the first end of the cable based on the determination that the first end of the cable is on the right arm of the cartridge. As discussed above, in one implementation (where the ends of the cable are for different types of connectors), the modular machine may be notified that the right end of the cable is to have a first operation, and the left end of the cable is to have a second operation. In another implementation (where the ends of the cable are for the same type of connector), the modular machine may be notified that the right end of the cable is to have a first operation, and the left end of the cable is to have the first operation. Regardless, the modular machine is notified as to the operation to be performed on the right end of the cable and the left end of the cable.

After completing operation on the first end of cable, at 1810, the modular machine signals completion so that cartridge advances and second end of cable is inserted into modular machine. For example, the modular machine may signal actuator so that actuator moves the cartridge so that the left cable holder 102 is positioned in line with or in front of an entrance to modular machine 912. After positioning the left cable holder 102 is positioned in line with or in front of an entrance to modular machine 912, actuator 906 may move end 116 into the entrance of modular machine 912. Thus, at 1812, modular machine receives the second end of the cable. As discussed above, because of the predetermined sequence, the modular machine is preprogrammed to determine that the second end received after the cartridge is initially positioned at the station is connected to the left arm of the cartridge. Given this, at 1814, the modular machine determines that second end of cable received is connected to the left arm of cartridge. At 1816, the modular machine performs an operation on the second end of cable based on determination that the second end of cable is on the left arm of the cartridge (based on the modular machine being notified as to the operation to be performed on the left end of the cable). After completing the operation on the second end of cable, the modular machine signals completion so that cartridge is advanced to next station.

As discussed above, various methods and apparatuses are disclosed. One method is for controlling a cartridge, the cartridge configured to hold a cable and to interface with a machine in order to process the cable, the cartridge comprising a first movable portion configured to hold a first cable end and a second movable portion configured to hold a second cable end, wherein the first cable end and the second cable end are two ends of the cable, the method comprising: receiving a first motive force, the first motive force causing movement of at least a part of the first movable portion such that the first cable end moves toward the machine; and receiving a second motive force, the second motive force causing movement of at least a part of the second movable portion such that the second cable end moves toward the machine. In this method, the first movable portion comprises a first arm; the second movable portion comprises a second arm; the first motive force moves the first arm, while the first arm is holding the first end of the cable, such that both the first arm and the first end of the cable move toward the machine; and the second motive force moves the second arm, while the second arm is holding the second end of the cable, such that both the second arm and the second end of the cable move toward the machine. Further, in this method, the first motive force and the second motive force is received from a piston; the first arm includes a first grip that receives the first motive force from the piston in order to move the first arm toward the machine; and the second arm includes a second grip that receives the second motive force from the piston in order to move the second arm toward the machine. Further, in this method, the cartridge further includes a base; the first arm and the second arm are connected to the base; the first motive force slides the first arm along a first channel in order to move toward the machine; and the first motive force slides the second arm along a second channel in order to move toward the machine. In this method, the first motive force is a first rotation force that is applied to the first arm in order to rotate the first end of the cable; and the second motive force is a second rotation force that is applied to the second arm in order to rotate the second end of the cable. This method further comprises connecting a base of the cartridge to a conveyor in order to move the cartridge along the conveyor. In this method, the first motive force causes movement of the first movable portion, which in turn moves that the first end of the cable toward the machine without any part of the first movable portion moving toward the machine; and the second motive force causes movement of the second movable portion, which in turn moves that the second end of the cable toward the machine without any part of the second movable portion moving toward the machine. In this method, the first movable portion comprises a first set of one or more rollers; the second movable portion comprises a second set of one or more rollers; the first motive force moves the first set of one or more rollers such that the first end of the cable moves toward the machine without the first set of one or more rollers moving toward the machine; and the second motive force moves the second set of one or more rollers such that the second end of the cable moves toward the machine without the second set of one or more rollers moving toward the machine. This method further comprises:

receiving a third motive force, responsive to the machine issuing a first command, the third motive force moving at least a part of the first movable portion such that the first cable end moves away the machine; and receiving a fourth motive force, responsive to the machine issuing a second command, the fourth motive force moving at least a part of the second movable portion such that the second cable end moves away the machine.

Another method is for controlling a cartridge, the cartridge configured to hold a cable and to interface with a machine in order to process the cable, the cartridge comprising a first portion configured to hold a first cable end and a second portion configured to hold a second cable end, the method comprising: applying a rotating force to at least a part of the cable, the rotating force moving at least one of the first end of the cable or the second end of the cable. In this method, the at least a part of the cable sits on a rolling structure; and the rotating force applies a force so that both the at least a part of the cable and the rolling structure rotate. In this method, the rolling structure comprises a first roller and a second roller; a first part of the cable proximate to the first cable end sits on the first roller; and a second part of the cable proximate to the second cable end sits on the second roller. In this method, the first portion moves the cable along a first axis; the first cable end rotates about the first axis; the second portion moves the cable along a second axis; and the second cable end rotates about the second axis. In this method, the first portion comprises a first hold mechanism that holds a portion proximate to the first cable end; and the second portion comprises a second hold mechanism that holds a portion proximate to the second cable end. This method further comprises: applying a first force to the first hold mechanism, thereby releasing the portion proximate to the first cable end; and applying a second force to the second hold mechanism, thereby releasing the portion proximate to the second cable end. In this method, the first hold mechanism comprises a first set of rollers; and the second hold mechanism comprises a second set of rollers. In this method, the first hold mechanism comprises first pincers; and the second hold mechanism comprises second pincers.

Another method is for controlling a cartridge, the cartridge configured to hold a cable and to interface with a machine in order to process the cable, the cartridge comprising a first structure, a second structure, and a hinge, the first structure configured to hold a first cable end and a second cable end, wherein the first cable end and the second cable end are two ends of the cable, the hinge connecting the first structure and the second structure, the method comprising: applying a force such that the first structure moves about the hinge so that an angle formed between the first structure and the second structure is 45° or more. In this method, the first structure moves about the hinge so that the angle is formed between the first structure and the second structure is at least 90°. In this method, the second structure engages with a conveyor; and the first structure comprises: at least one base; a first movable portion that holds the first cable end; and a second movable portion that holds the second cable end; and further comprises: receiving a first motive force so that the first movable portion causes the first cable end to move toward the machine; and receiving a second motive force so that the second movable portion causes the second cable end to move toward the machine.

Still another method is for controlling a cartridge, the cartridge configured to hold a cable and to interface with a machine in order to process the cable, the cartridge comprising: a first movable portion configured to move a first cable end, the first cable end comprising a plurality of wires; a first comb structure configured to hold the plurality of wires of the first cable end; a second movable portion configured to move a second cable end, the first cable end comprising the plurality of wires, wherein the first cable end and the second cable end are two ends of the cable; and a second comb structure configured to hold the plurality of wires of the second cable end, the method comprising: moving, via the first movable portion, the cable through a plane defined by the first comb structure; and moving, via the second movable portion, the cable through a plane defined by the second comb structure. In this method, a platform is configured to connect to a conveyor; the first comb structure consists of a single comb; the second comb structure consists of a single comb; the first comb structure is between the platform and the first cable end; and the second comb structure is between the platform and the second cable end. In this method, the first comb structure comprises a first set of combs; the second comb structure comprises a second set of combs; the first set of combs sandwiches the first cable end; and the second set of combs sandwiches the second cable end.

One apparatus is an actuator that is configured to control a cartridge in order for a cable held by the cartridge to be processed by a machine, the actuator comprising: a cable end movement device configured to move an end of the cable toward the machine in a first direction and away from the machine in a second direction, the second direction opposite from the first direction; and a controller in communication with the cable end movement device. The controller is configured to: receive a first signal; responsive to receiving the first signal, control the cable end movement device so that the end of the cable moves in the first direction toward the machine; receive a second signal from the machine, the signal indicative that the machine has completed a process on an end of the cable held by a part of the cartridge; and responsive to receiving the second signal, control the cable end movement device so that the end of the cable moves in the second direction away the machine. In this actuator, the cable end movement device comprises a piston configured to interface with a part of the cartridge; the controller, responsive to receiving the first signal, is configured to control the piston in order for the piston to move the part of the cartridge in the first direction toward the machine; and the controller, responsive to receiving the second signal, is configured to control the piston in order for the piston to move the part of the cartridge in the second direction away the machine. In this actuator, the part of the cartridge comprises an arm of the cartridge configured to move in along a channel of the cartridge. In this actuator, the cable end movement device is configured to spool the end of the cable toward the machine in the first direction and away from the machine in the second direction. In this actuator, the cable end movement device comprises one or more rollers configured to interface with one or more cartridge rollers; the controller, responsive to receiving the first signal, is configured to control the one or more rollers to move the one or more cartridge rollers to spool the end of the cable toward the machine in the first direction; and the controller, responsive to receiving the second signal, is configured to control the one or more rollers to move the one or more cartridge rollers to spool the end of the cable away the machine in the second direction. In this actuator, the first signal is indicative of a sensor at a station on a conveyor.

Another apparatus is an actuator configured to control a cartridge in order for a cable held by the cartridge to be processed by a machine, the actuator comprising: a cable end movement device configured to move an end of the cable toward the machine in a first direction; a roller; a movement roller device configured to move the roller into contact with at least a part of the cable in the cartridge; and a controller in communication with the cable end movement device, the roller, and the movement roller device. The controller is configured to: receive a signal from the machine, the signal indicative of the machine commanding a rotational movement of the at least a part of the cable in a rotational direction along an axis defined by the first direction; responsive to receiving the signal from the machine, control the movement roller device so that the roller moves into contact with the at least a part of the cable; and after controlling the movement roller device so that the roller moves into contact with the at least a part of the cable, control the roller in order to move the roller, thereby rotating the at least a part of the cable in the rotational direction along the axis defined by the first direction. In this actuator, after controlling the roller in order to move the roller so that the at least a part of the cable rotates in the rotational direction defined by the first direction, the controller is further configured to: control the movement roller device so that the roller loses contact with the at least a part of the cable; and send a signal to the machine indicative to the machine that the at least a part of the cable was rotated. This actuator further comprises a cable release device; and the controller is further configured to: responsive to receiving the signal from the machine, activate the cable release device such that the cable, being held in the cartridge, is released by the cable release device. In this actuator, the cable release device comprises a force configured to release one or more rollers on the cartridge that are holding the cable. In this actuator, the cable release device comprises a force configured to release one or more pincers on the cartridge that are holding the cable. In this actuator, the signal from the machine is indicative of a number of degrees; and the controller is configured to control the roller such that the at least a part of the cable rotates along the axis by the number of degrees. In this actuator, the cable end movement device comprises a piston configured to move an arm of the cartridge forward and backward in the first direction. In this actuator, the cable end movement device comprises one or more rollers configured to spool the end of the cable forward and backward in the first direction.

Yet another apparatus is an actuator configured to control a cartridge in order for a cable held by the cartridge to be processed by a machine, the actuator comprising: a cartridge tipping device configured to move at least a part of the cartridge along a hinge; and a controller in communication with the cartridge tipping device. The controller is configured to: receive a signal from the machine, the signal indicative of the machine commanding movement of the at least a part of the cartridge along the hinge; responsive to receiving the signal from the machine, control the cartridge tipping device so that the at least a part of the cartridge moves along the hinge in a first direction; and after controlling the cartridge tipping device so that the at least a part of the cartridge moves along the hinge in the first direction, control the cartridge tipping device so that the at least a part of the cartridge moves along the hinge in a second direction, the second direction opposite to the first direction. In this actuator, the cartridge comprises a platform and a base; and the cartridge tipping device moves the base along the hinge so that at least a 45° angle is formed between the platform and the base. In this actuator, the cartridge tipping device moves the base along the hinge so that at least a 90° angle is formed between the platform and the base. In this actuator, the signal indicative of the machine commanding movement of the at least a part of the cartridge along the hinge is indicative of moving the base along the hinge so that at least a 45° angle is formed between the platform and the base; and the controller is further configured to receive a second signal, the second signal is indicative of moving the base along the hinge so that at least a 0° angle is formed between the platform and the base. In this actuator, the cartridge tipping device comprises a robotic arm. In this actuator, the cartridge tipping device comprises a rotating gripper. This actuator further comprises a cable end movement device configured to move both ends of the cable; and the controller is further configured to command the cable end movement device in order to move both ends of the cable prior to controlling the cartridge tipping device so that the at least a part of the cartridge moves along the hinge in a first direction.

Yet another apparatus is a machine configured to control operation of a cartridge in order to automatically assemble a cable held in the cartridge, the machine comprising: a scanning device configured to scan a plurality of wires at an end of the cable held in the cartridge; and a controller in communication with the scanning device. The controller configured to: receive, from the scanning device, the scan of the plurality of wires at the end of the cable held in the cartridge; analyze the scan in order to determine location of one or more of the plurality of wires; based on the analysis of the scan, send a command, the command indicative of commanding a movement of at least a part of the cartridge in order to rotate the end of the cable held in the cartridge; and after sending the command, perform an operation on at least one of the plurality of wires. In this machine, the command is indicative of rotating the end of the cable by a predetermined number of degrees. In this machine, the command is indicative of rotating the end of the cable in a clockwise or counterclockwise direction. In this machine, the operation comprises placing the at least one of the plurality of wires on a comb in order to hold the at least one of the plurality of wires. In this machine, the comb is on the cartridge. The machine may further comprise the comb. In this machine, the scanning device comprises a camera.

Still another apparatus is a machine configured to control operation of a cartridge in order to automatically assemble a cable held in the cartridge, the machine comprising: a cable assembly device configured to perform at least one operation on an end of the cable in order to assemble the cable held in the cartridge; and a controller in communication with the cable assembly device. The controller is configured to: receive an indication that an end of the cable is in an interior of the machine; responsive to receiving the indication, command the cable assembly device to perform the at least one operation on the end of the cable; and command movement of the cartridge in order for the end of the cable to move to an exterior of the machine. This machine further comprises a sensor, the sensor configured to generate the indication that the end of the cable is in the interior of the machine. In this machine, the indication is received from a device external to the machine. In this machine, the command for movement of the cartridge comprises a command in order to activate a piston to move an arm of the cartridge holding the end of the cable away from the machine. In this machine, the command for movement of the cartridge comprises a command in order to spool the end of the cable away from the machine.

Still another method is disclosed for a machine to perform an operation on a cable, the cable held in a cartridge, the method comprising: determining whether the cartridge has interfaced with the machine, at least a part of the cartridge holding at least a part of the cable; determining, by the machine, whether to perform an operation on an end of the cable; issuing, based on the determination whether to perform the operation on the end of the cable, a first command, the first command configured to control the cartridge in order to move the end of the cable toward the machine; performing the operation on the end of the cable; and issuing a second command, the second command configured to control the cartridge in order to move the end of the cable away the machine. In this method, the first command is configured to move the at least a part of the cartridge holding the cable toward the machine. In this method, the at least a part of the cartridge holding the cable comprises an arm configured to slide toward and away from the machine. In this method, the first command is configured to spool an end of the cable toward the machine.

Yet another method is disclosed for a machine to perform an operation on a cable, the cable held in a cartridge, the method comprising: determining whether the cartridge has interfaced with the machine; analyzing an end of the cable; issuing a command, based on analyzing the end of the cable, to move the end of the cable in order to perform an operation; and after issuing the command, performing the operation on the cable. In this method, the end of the cable comprises a plurality of wires; analyzing the end of the cable comprises analyzing an orientation of the plurality of wires; and issuing the command comprises issuing a rotation command configured to rotate the end of the cable.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A cable processing system comprising:
  a cartridge configured to hold a cable and to interface with a machine at a station in order to process the cable, the cartridge comprising:
    a base structure comprising a connector configured to connect to a conveyor in order to move the cartridge to the station, a first slide mating portion and a second slide mating portion;
    a first movable portion comprising a first sliding member, a first holder, and a first section, wherein the first sliding member is configured to mate with the first slide mating portion in order for the first movable portion to slide, relative to the base structure, in a direction toward the machine or away from the machine, wherein the first holder is configured to hold the cable proximate to a first end of the cable and wherein the first section is shaped to receive a first external motive force, the first external motive force being generated external to the cartridge; and
    a second movable portion comprising a second sliding member, a second holder, and a second section, wherein the second sliding member is configured to mate with the second slide mating portion in order for the second movable portion to slide, relative to the base structure, in the direction toward the machine or away from the machine, wherein the second holder is configured to hold the cable proximate to a second end of the cable and wherein the second section is shaped to receive a second external motive force, the second external motive force being generated external to the cartridge, wherein the first end and the second end are two ends of the cable; and
  an actuator in fixed relation to the station and comprising at least one motive force device configured to generate the first external motive force and the second external motive force;
  wherein, responsive to receiving the first external motive force at the first section, the first movable portion is configured to slide, via the first sliding member, in the direction toward or away from the machine; and
  wherein, responsive to receiving the second external motive force at the second section, the second movable portion is configured to slide, via the second sliding member, in the direction toward or away from the machine.

2. The cable processing system of claim 1, wherein the first movable portion comprises a first arm;
  wherein the second movable portion comprises a second arm;
  wherein the first external motive force is configured to move the first arm, while the first holder of the first arm is holding the cable proximate to the first end of the cable, such that both the first arm and the first end of the cable move toward the machine; and
  wherein the second external motive force is configured to move the second arm, while the second holder of the second arm is holding the cable proximate to the second end of the cable, such that both the second arm and the second end of the cable move toward the machine.

3. The cable processing system of claim 2, wherein the actuator comprises a piston;
  wherein the first arm includes a first grip configured to receive the piston in order to move the first arm toward the machine; and
  wherein the second arm includes a second grip configured to receive the piston in order to move the second arm toward the machine.

4. The cable processing system of claim 3,
  wherein the first arm and the second arm are connected to the base structure;
  wherein the first arm is configured to slide along a first channel in order to move toward the machine; and
  wherein the second arm is configured to slide along a second channel in order to move toward the machine.

5. The cable processing system of claim 4, wherein the first arm is further configured to receive a first rotation motion to rotate the first end of the cable; and
  wherein the second arm is further configured to receive a second rotation motion to rotate the second end of the cable.

6. The cable processing system of claim 1, wherein the first holder comprises pincers configured to pinch the cable; and
  wherein the pincers are configured to receive a tool such that the tool pries the pincers apart in order to release the cable.

7. The cable processing system of claim 6, wherein the pincers comprise a groove shaped to mate with the cable.

8. The cable processing system of claim 6, wherein, after the tool pries the pincers apart in order to release the cable, the first movable portion is configured to receive an applied external force to move the first end of the cable toward the machine without any part of the first movable portion moving toward the machine.

9. The cable processing system of claim 6, wherein the first movable portion is configured to receive the applied external force from a roller;
   wherein a first direction of rotation of the roller results in the first end of the cable moving toward the machine; and
   wherein a second direction of rotation of the roller results in the first end of the cable moving away the machine, the second direction of rotation being opposite to the first direction of rotation.

10. The cable processing system of claim 1, wherein the actuator comprises one or more motors or pistons configured to generate the first external motive force and the second external motive force; and
   wherein the cartridge consists of passive elements incapable of independently generating a force.

11. The cable processing system of claim 10, wherein the actuator comprises at least one rolling tool, the at least one rolling tool including a roller;
   wherein the actuator controls the one or more motors or pistons in order to move the at least one rolling tool and the cartridge relative to one another in order for the roller to contact at least a part of the cartridge or at least a part of the cable held by the cartridge; and
   wherein the actuator is configured to control the one or more motors or pistons in order for the roller to roll, thereby imparting motion to the at least a part of the cartridge or the at least a part of the cable held by the cartridge in order to move a respective end of the cable relative to the machine.

12. The cable processing system of claim 11, wherein the actuator is configured to control the one or more motors or pistons in order for the roller to roll, thereby imparting motion in order to spool the respective end of the cable toward or away from the machine without moving either of the first sliding member or the second sliding member.

13. The cable processing system of claim 12, wherein the actuator is configured to control the one or more motors or piston to modify a position of the first holder in order to release the hold of the cable proximate to the first end of the cable; and
   wherein the actuator is configured, after the hold of the cable proximate to the first end of the cable is released, to control the roller in order to spool the respective end of the cable toward or away from the machine without moving the first sliding member.

14. The cable processing system of claim 11, wherein the direction toward or away from the machine defines a longitudinal axis; and
   wherein the actuator is configured to control the roller to impart motion in order to move the respective end of the cable rotationally about the longitudinal axis.

15. The cable processing system of claim 11, wherein the roller comprises a first roller; and
   wherein a part of the cable is sandwiched between at least two rollers such that the rolling of the first roller imparts the motion to move the respective end of the cable relative to the machine.

16. The cable processing system of claim 15, wherein one of the at least two rollers comprises a second roller; and
   wherein the second roller is a passive element and moves responsive to the first roller imparting motion.

17. The cable processing system of claim 16, wherein the actuator is configured to control the one or more motors or piston in order for the first roller to physically contact a part of the cable; and
   wherein, after physical contact of the first roller with the part of the cable, the actuator is configured to control the first roller in order to impart the motion to move the respective end of the cable.

18. The cable processing system of claim 16, wherein the cartridge comprises the second roller.

19. The cable processing system of claim 18, wherein the first movable portion includes the second roller.

20. The cable processing system of claim 16, wherein the first roller and the second roller are configured to spool a respective end of the cable toward or away from the machine.

21. The cable processing system of claim 16, wherein the direction toward or away from the machine defines a longitudinal axis; and
   wherein the first roller and the second roller are configured to move a respective end of the cable rotationally about the longitudinal axis.

* * * * *